United States Patent
Filardo

(10) Patent No.: US 8,432,057 B2
(45) Date of Patent: Apr. 30, 2013

(54) PLIANT OR COMPLIANT ELEMENTS FOR HARNESSING THE FORCES OF MOVING FLUID TO TRANSPORT FLUID OR GENERATE ELECTRICITY

(75) Inventor: Benjamin Pietro Filardo, New York, NY (US)

(73) Assignee: Pliant Energy Systems LLC, New York, NY (US)

( * ) Notice: Subject to any disclaimer, the term of this patent is extended or adjusted under 35 U.S.C. 154(b) by 633 days.

(21) Appl. No.: 12/617,618

(22) Filed: Nov. 12, 2009

(65) Prior Publication Data

US 2010/0078941 A1 Apr. 1, 2010

Related U.S. Application Data

(63) Continuation-in-part of application No. 12/242,144, filed on Sep. 30, 2008, now Pat. No. 7,696,634, which is a continuation of application No. 12/150,910, filed on May 1, 2008, which is a continuation-in-part of application No. 12/569,762, filed on Sep. 29, 2009, now Pat. No. 7,839,007, which is a continuation-in-part of application No. 12/575,434, filed on Oct. 7, 2009, now Pat. No. 7,863, 768.

(60) Provisional application No. 61/227,279, filed on Jul. 21, 2009, provisional application No. 60/926,984, filed on May 1, 2007.

(51) Int. Cl.
*H02P 9/04* (2006.01)
(52) U.S. Cl.
USPC ........................................................... 290/54

(58) Field of Classification Search .................... 290/43, 290/54
See application file for complete search history.

(56) References Cited

U.S. PATENT DOCUMENTS

| | | | |
|---|---|---|---|
| 2,436,517 | A | 2/1948 | Lewis |
| 3,190,618 | A | 6/1965 | Raphael |
| 3,301,195 | A | 1/1967 | Streeter |

(Continued)

FOREIGN PATENT DOCUMENTS

| | | |
|---|---|---|
| AU | 2006203202 | 2/2007 |
| CA | 2 554 316 | 1/2007 |

(Continued)

OTHER PUBLICATIONS

International Search Report and Written Opinion, mailed May 8, 2012 for PCT International Application No. PCT/US12/20836, filed Jan. 10, 2012.

(Continued)

*Primary Examiner* — Tulsidas C Patel
*Assistant Examiner* — Viet Nguyen
(74) *Attorney, Agent, or Firm* — Chadbourne & Parke LLP

(57) ABSTRACT

Pliant, or compliant mechanisms for extracting electrical energy or useful work from a moving fluid are described. Persistent deformations in flexible elements are maintained with deformation retaining, or restraining components. The deformation retaining components may, in various embodiments, include rigid or tensile members, elastic coils, and/or the like. The deformations of the mechanisms may be configured so as to receive forces from moving fluid and transfer those forces in a variety of ways so as to pump fluid or generate electricity from this pumped fluid, or to generate electricity from material strains induced by moving fluid.

40 Claims, 45 Drawing Sheets

U.S. PATENT DOCUMENTS

| | | | |
|---|---|---|---|
| 3,467,013 | A | 9/1969 | Conner |
| 3,623,566 | A | 11/1971 | Orloff et al. |
| 3,816,774 | A | 6/1974 | Ohnuki et al. |
| 3,942,465 | A | 3/1976 | Bouix |
| 3,961,863 | A | 6/1976 | Hooper, III |
| 4,056,742 | A | 11/1977 | Tibbetts |
| 4,164,383 | A | 8/1979 | French |
| 4,257,640 | A | 3/1981 | Wiley |
| 4,269,906 | A | 5/1981 | Schmechtig |
| 4,310,264 | A | 1/1982 | Brownlee |
| 4,370,107 | A | 1/1983 | Landis et al. |
| 4,371,788 | A | 2/1983 | Smith |
| 4,375,151 | A | 3/1983 | French |
| 4,387,318 | A | 6/1983 | Kolm et al. |
| 4,448,020 | A | 5/1984 | Wood et al. |
| 4,469,596 | A | 9/1984 | Kantor |
| 4,488,854 | A | 12/1984 | Miller |
| 4,498,850 | A | 2/1985 | Perlov et al. |
| 4,544,329 | A | 10/1985 | O'Boyle |
| 4,558,954 | A | 12/1985 | Barr |
| 4,830,315 | A | 5/1989 | Presz et al. |
| 5,152,674 | A | 10/1992 | Marx |
| 5,192,197 | A * | 3/1993 | Culp ............ 417/322 |
| 5,230,656 | A | 7/1993 | Paterson et al. |
| 5,458,471 | A | 10/1995 | Ni |
| 5,611,666 | A | 3/1997 | Au et al. |
| 5,820,342 | A | 10/1998 | Au et al. |
| 5,826,535 | A | 10/1998 | Shaw |
| 5,950,726 | A | 9/1999 | Roberts |
| 5,961,289 | A | 10/1999 | Lohmann |
| 5,961,298 | A | 10/1999 | Bar-Cohen et al. |
| 5,975,865 | A | 11/1999 | Manabe |
| 6,024,345 | A | 2/2000 | Nishio |
| 6,069,420 | A | 5/2000 | Mizzi et al. |
| 6,079,214 | A | 6/2000 | Bishop |
| 6,106,249 | A | 8/2000 | Barak |
| 6,109,888 | A | 8/2000 | Marshall |
| 6,153,944 | A | 11/2000 | Clark |
| 6,250,585 | B1 | 6/2001 | Pell |
| 6,327,994 | B1 | 12/2001 | Labrador |
| 6,357,997 | B1 | 3/2002 | Rosefsky |
| 6,361,284 | B2 * | 3/2002 | Drevet ............ 417/240 |
| 6,411,015 | B1 | 6/2002 | Toda |
| 6,424,079 | B1 | 7/2002 | Carroll |
| 6,431,926 | B1 | 8/2002 | Rosefsky |
| 6,435,849 | B1 | 8/2002 | Guilmette |
| 6,579,068 | B2 | 6/2003 | Bridger et al. |
| 6,628,040 | B2 | 9/2003 | Pelrine et al. |
| 6,911,764 | B2 | 6/2005 | Pelrine et al. |
| 6,948,910 | B2 | 9/2005 | Polacsek |
| 6,952,058 | B2 | 10/2005 | McCoin |
| 7,034,432 | B1 | 4/2006 | Pelrine et al. |
| 7,052,594 | B2 | 5/2006 | Pelrine et al. |
| 7,064,472 | B2 * | 6/2006 | Pelrine et al. ............ 310/324 |
| 7,148,579 | B2 | 12/2006 | Pinkerton et al. |
| 7,166,952 | B2 | 1/2007 | Topliss et al. |
| 7,196,450 | B2 | 3/2007 | Pinkerton |
| 7,204,731 | B2 | 4/2007 | Gusler et al. |
| 7,229,029 | B2 | 6/2007 | Windham |
| 7,244,151 | B2 | 7/2007 | Gusler et al. |
| 7,258,347 | B2 | 8/2007 | Keefe et al. |
| 7,300,323 | B1 | 11/2007 | Bandyopadhyay et al. |
| 7,352,073 | B2 | 4/2008 | Ames |
| 7,353,747 | B2 | 4/2008 | Swayze et al. |
| 7,357,684 | B2 | 4/2008 | Gusler |
| 7,362,032 | B2 | 4/2008 | Pelrine et al. |
| 7,387,179 | B2 | 6/2008 | Anhalt |
| 7,470,086 | B2 | 12/2008 | Jennings et al. |
| 7,492,054 | B2 | 2/2009 | Catlin |
| 7,493,759 | B2 | 2/2009 | Bernitsas et al. |
| 7,573,143 | B2 | 8/2009 | Frayne |
| 7,696,634 | B2 | 4/2010 | Filardo |
| 7,823,380 | B2 * | 11/2010 | Ghouse ............ 60/499 |
| 2001/0010348 | A1 | 8/2001 | Bilanin et al. |
| 2002/0146333 | A1 | 10/2002 | Drevet |
| 2003/0102411 | A1 | 6/2003 | Kota et al. |
| 2004/0008853 | A1 | 1/2004 | Pelrine et al. |
| 2004/0043677 | A1 | 3/2004 | Yamamoto |
| 2004/0197519 | A1 | 10/2004 | Elzey et al. |
| 2006/0172629 | A1 | 8/2006 | Gusler |
| 2006/0192389 | A1 | 8/2006 | Perry et al. |
| 2006/0258912 | A1 | 11/2006 | Belson et al. |
| 2007/0031667 | A1 | 2/2007 | Hook et al. |
| 2007/0222344 | A1 | 9/2007 | Kornbluh |
| 2008/0035788 | A1 | 2/2008 | Kothera et al. |
| 2008/0087762 | A1 | 4/2008 | Holloman et al. |
| 2008/0128560 | A1 | 6/2008 | Hyde |
| 2008/0132881 | A1 | 6/2008 | Wood et al. |
| 2008/0229745 | A1 | 9/2008 | Ghouse |
| 2009/0058095 | A1 | 3/2009 | McClintic |
| 2009/0134623 | A1 | 5/2009 | Krouse |
| 2010/0026003 | A1 | 2/2010 | Filardo |
| 2010/0045036 | A1 | 2/2010 | Filardo |
| 2010/0078941 | A1 | 4/2010 | Filardo |
| 2010/0084871 | A1 | 4/2010 | Filardo |
| 2010/0133387 | A1 | 6/2010 | Wood et al. |
| 2010/0133848 | A1 | 6/2010 | Piasecki |

FOREIGN PATENT DOCUMENTS

| | | |
|---|---|---|
| CA | 2510171 A1 | 1/2007 |
| DE | 102005046516 A1 | 4/2007 |
| EP | 0322899 A2 | 7/1989 |
| EP | 1219834 A1 | 7/2002 |
| EP | 1783743 A2 | 5/2007 |
| GB | 2081816 A | 2/1982 |
| GB | 2129059 A | 5/1984 |
| RU | 2347944 C2 | 2/2009 |
| WO | WO0202309 A1 | 1/2002 |
| WO | 2004109817 A2 | 12/2004 |
| WO | WO 2007/029275 | 3/2007 |

OTHER PUBLICATIONS

European Search Report, mailed Jun. 20, 2012 for EP Application No. 09847665.8, filed Nov. 12, 2009.

"Anaconda wave-power generator snakes into next stage of production," by Alok Jham, http://www.guardian.co.uk/environment/2009/may/06/anaconda-wave-power, May 6, 2009 (printed Jun. 4, 2009) (also see video embedded in the article).

"Checkmate Seaenergy are proud to present the Anaconda Wave Energy Converter," Introduction page, http://www.checkmateuk.com/seaenergy/introduction.html (printed Jun. 4, 2009).

"Checkmate Seaenergy are proud to present the Anaconda Wave Energy Converter," The Anaconda System page, http://www.checkmateuk.com/seaenergy/system.html (printed Jun. 4, 2009).

"Checkmate Seaenergy are proud to present the Anaconda Wave Energy Converter," Economics page, http://www.checkmateuk.com/seaenergy/economics.html (printed Jun. 4, 2009).

"Checkmate Seaenergy are proud to present the Anaconda Wave Energy Converter," Technology page, http://www.checkmateuk.com/seaenergy/technology.html (printed Jun. 4, 2009).

"Checkmate Seaenergy are proud to present the Anaconda Wave Energy Converter," Wave Energy Potential page, http://www.checkmateuk.com/seaenergy/potential.html (printed Jun. 4, 2009).

"Checkmate Seaenergy are proud to present the Anaconda Wave Energy Converter," The Anaconda Team page, http://www.checkmateuk.com/seaenergy/team.html (printed Jun. 4, 2009).

"Checkmate Seaenergy are proud to present the Anaconda Wave Energy Converter," Downloads and Links page, http://www.checkmateuk.com/seaenergy/links.html (printed Jun. 4, 2009).

"Checkmate Seaenergy are proud to present the Anaconda Wave Energy Converter," Project News page, http://www.checkmateuk.com/seaenergy/news.html (printed Jun. 4, 2009).

"VIVACE (Vortex Induced Vibrations Aquatic Clean Energy)," Technology page, http://www.vortexhydroenergy.com/html/technology.html (printed Jun. 10, 2009).

"Harnessing river whirlpools puts energy on tap," by Jim Giles, http://www.newscientist.com/article/mg19826516.200-harnessing-river-...1, Apr. 11, 2008 (printed Jun. 10, 2009).

PCT International Search Report and Written Opinion dated Aug. 1, 2008 (PCT/US08/05605).

PCT International Search Report and Written Opinion dated Dec. 24, 2009 (PCT/US09/62257).

PCT International Search Report and Written Opinion dated Jan. 27, 2010 (PCT/US09/64241).

Gatti, "Introducing a Biomimetic Solution for Renewable Wave Energy," www.windwavesandsun.com/WaveBianket_INCEED2005.htm, captured Nov. 20, 2008; printed Nov. 29, 2012.

"Introducing WaveBlanket: Thin-Membrane Ocean Power System," www.windwavesandsun.com, captured Apr. 11, 2009; printed Nov. 29, 2012.

* cited by examiner

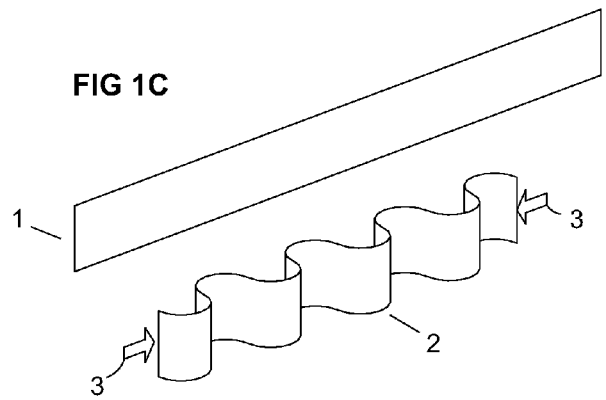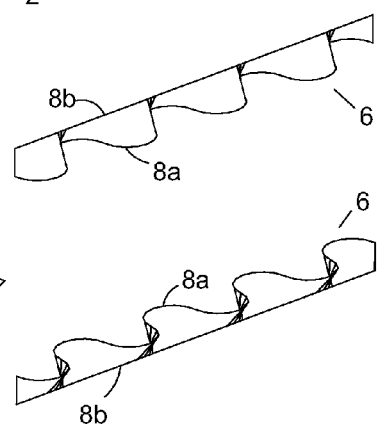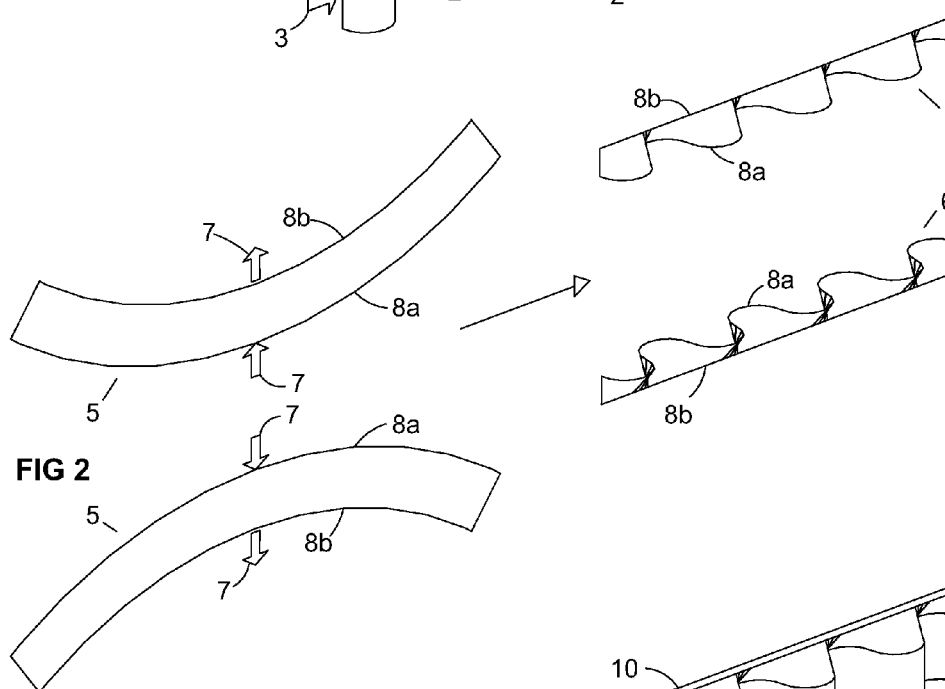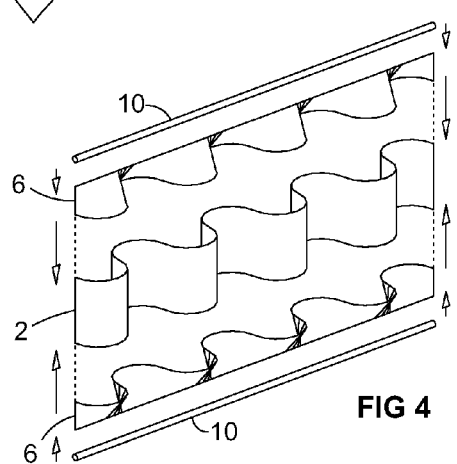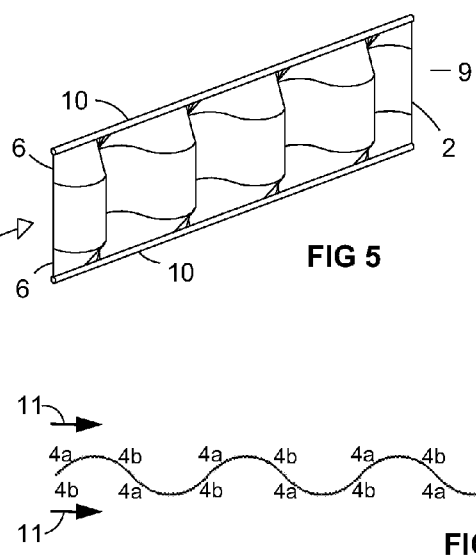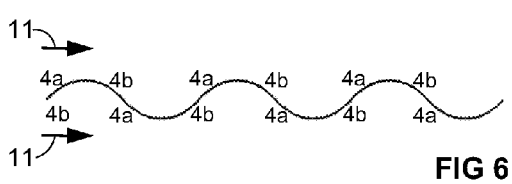

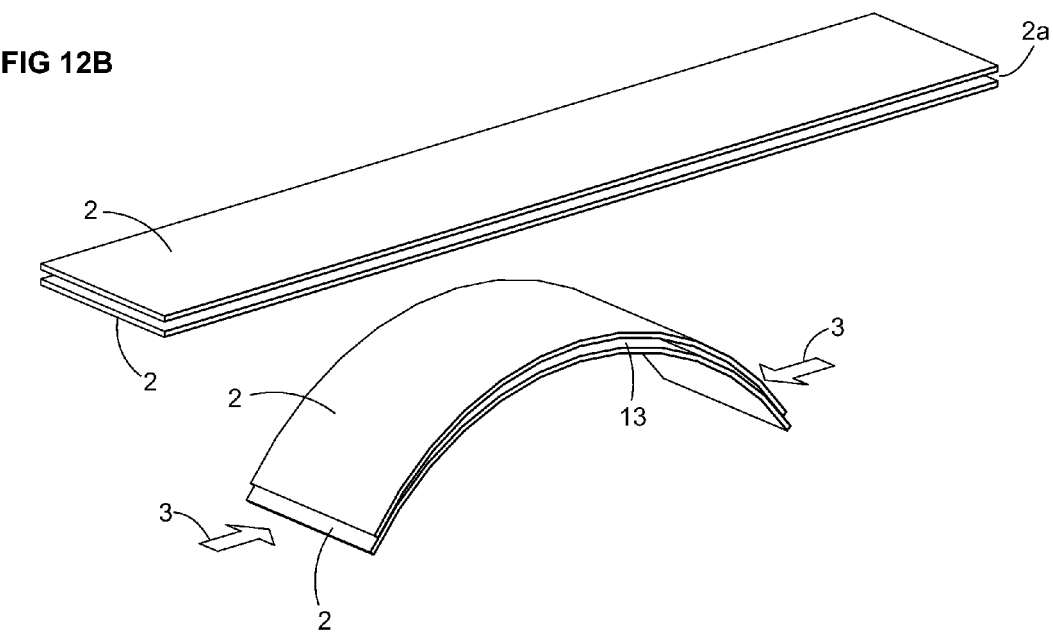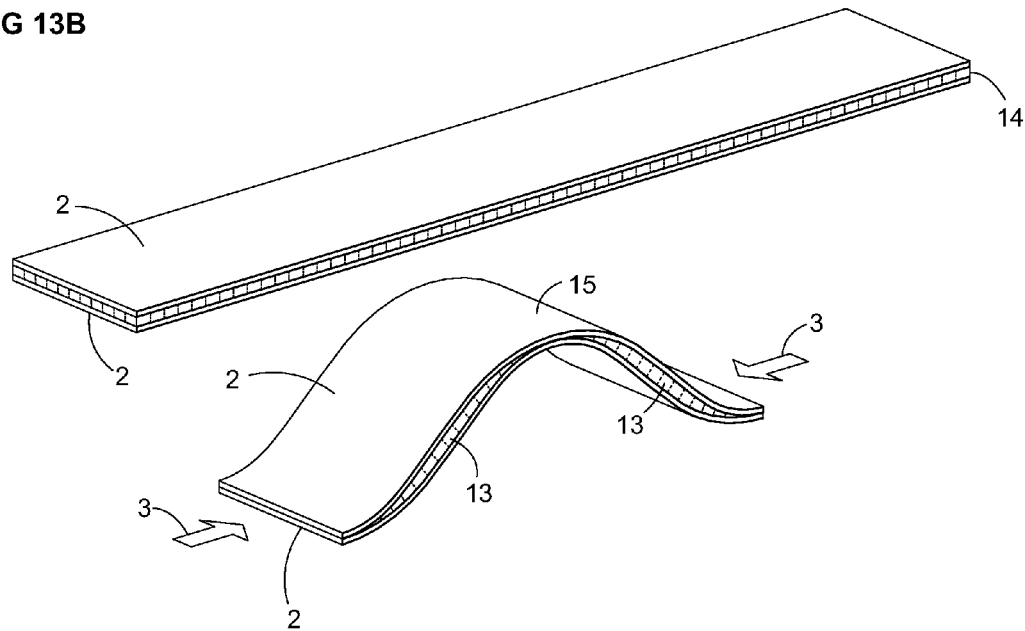

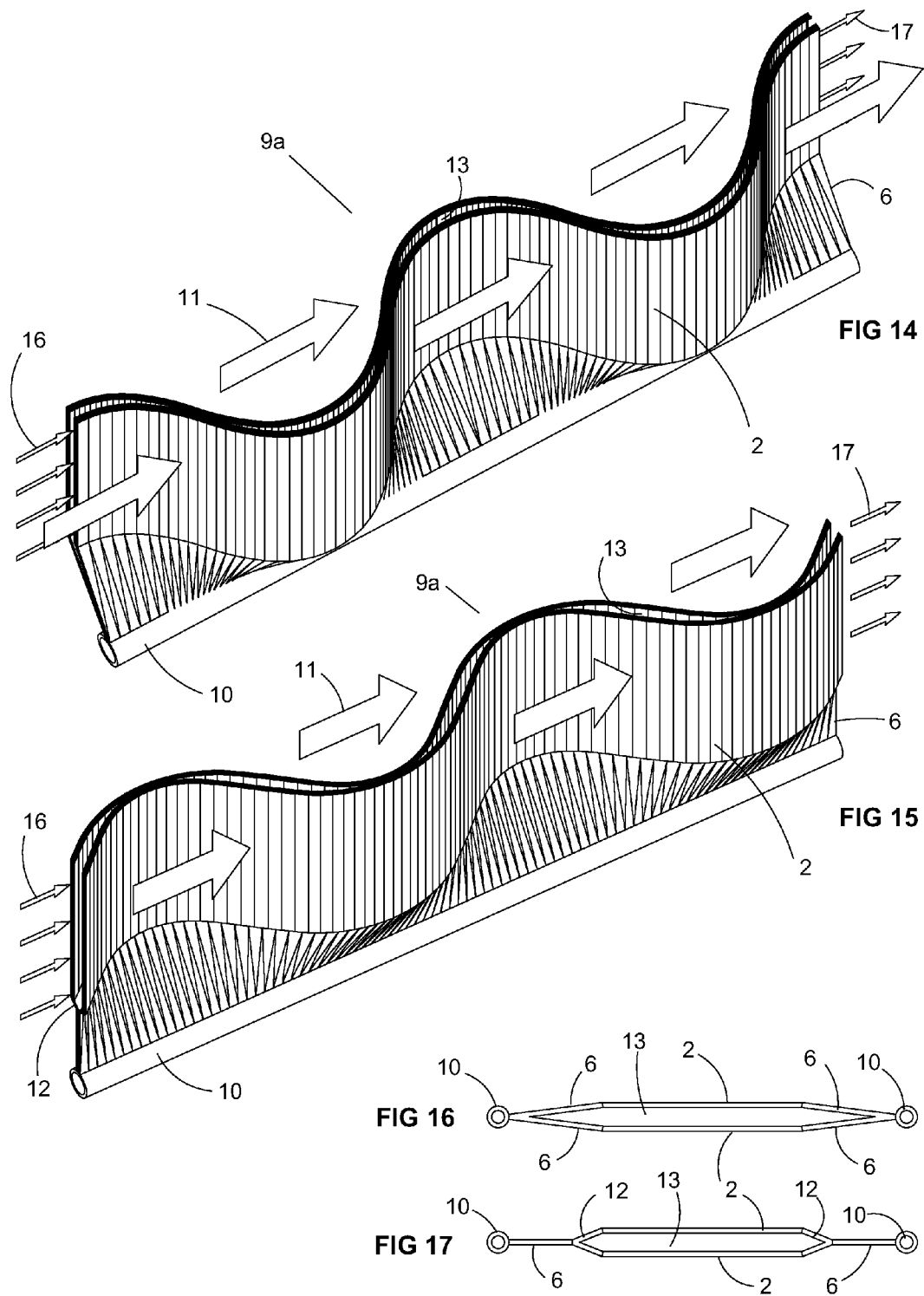

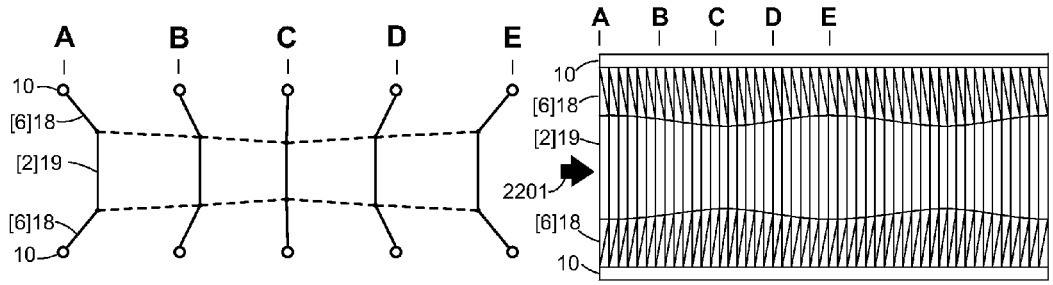
FIGs. 18 A-E
FIG. 22A
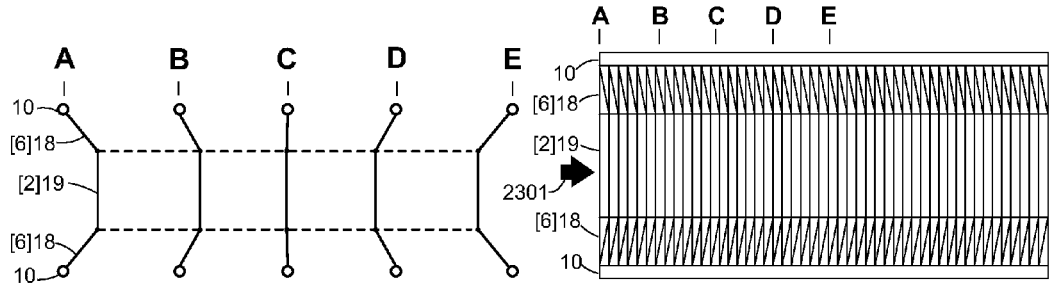
FIGs. 19 A-E
FIG. 23A
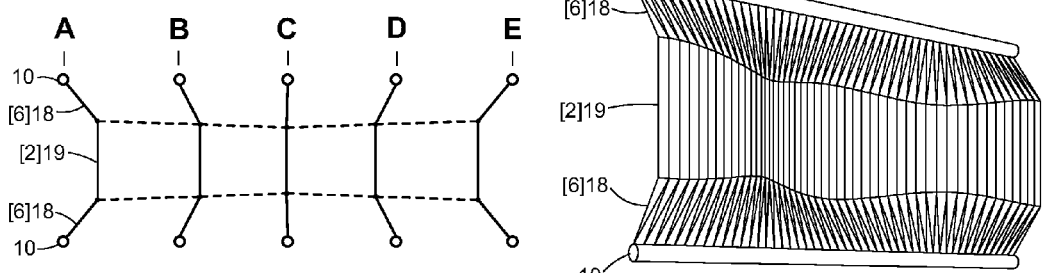
FIGs. 20 A-E
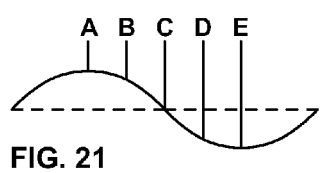
FIG. 21
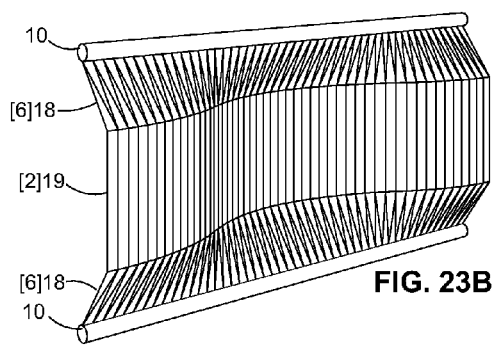
FIG. 22B
FIG. 23B

FIG. 24 A-C

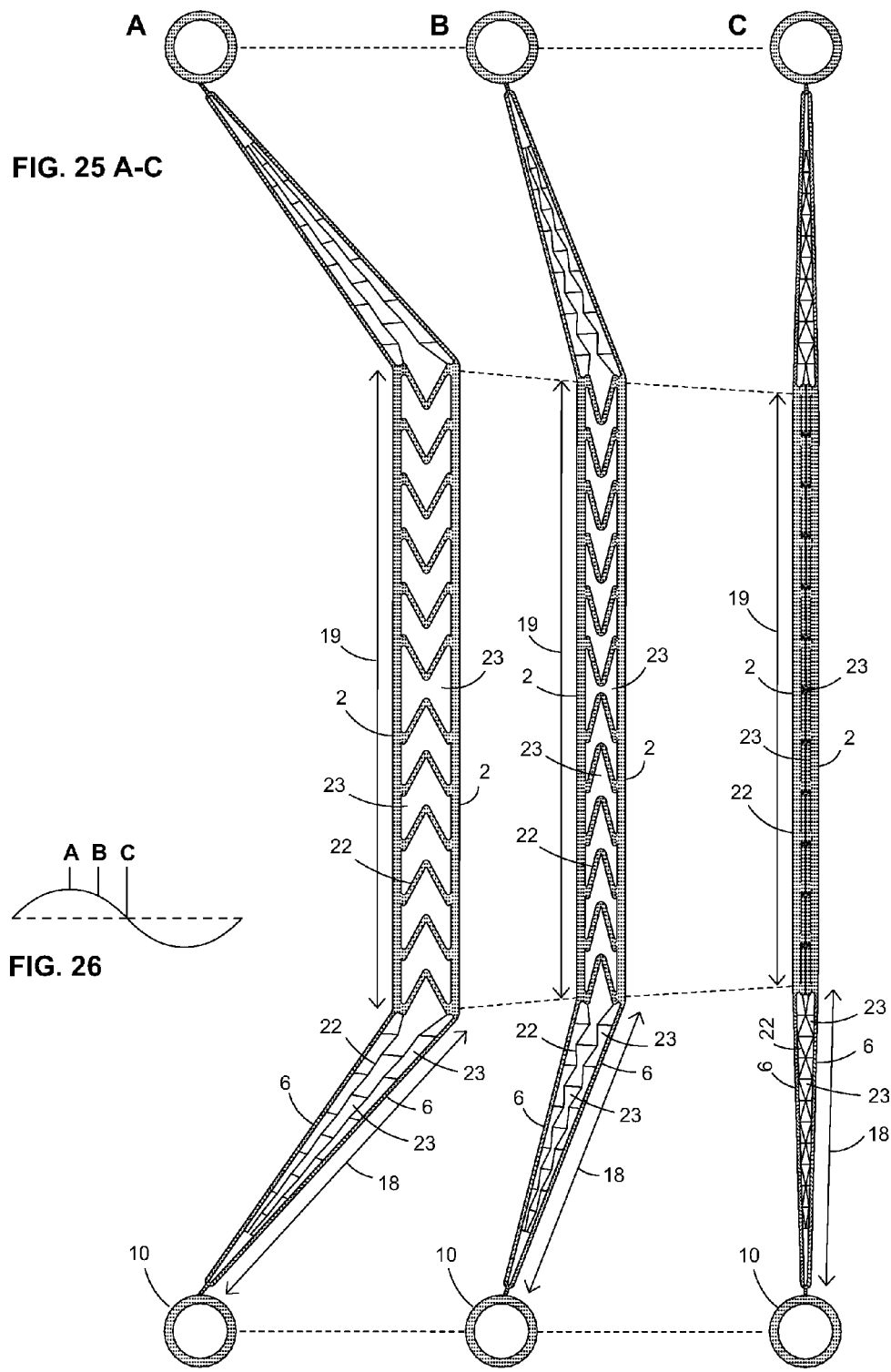

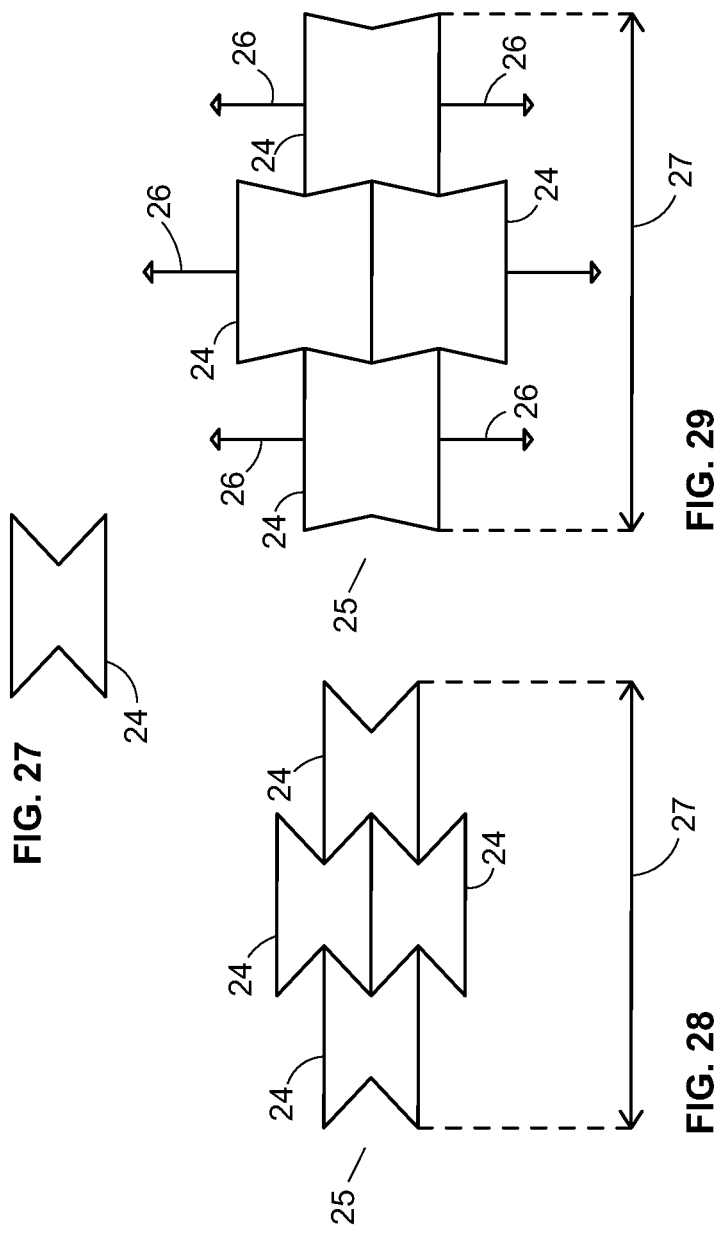

FIG. 30A-C

FIGs 31 A-D
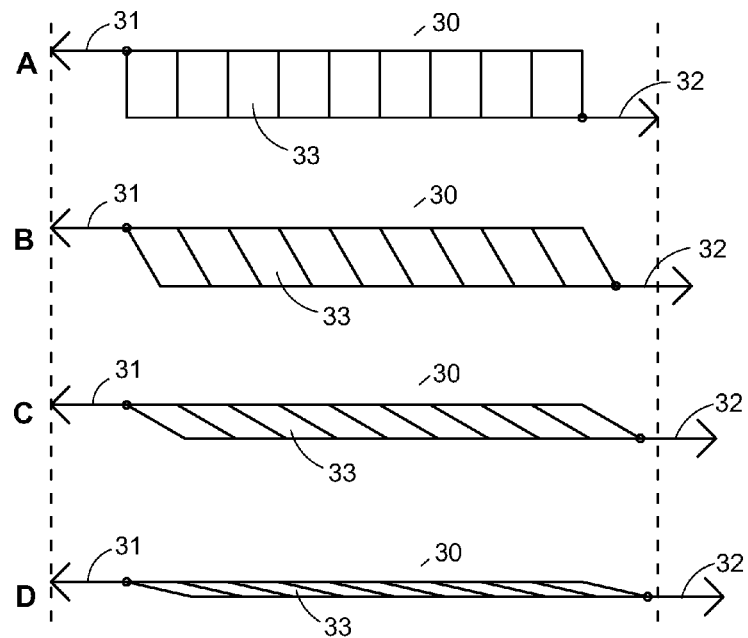
FIG 32
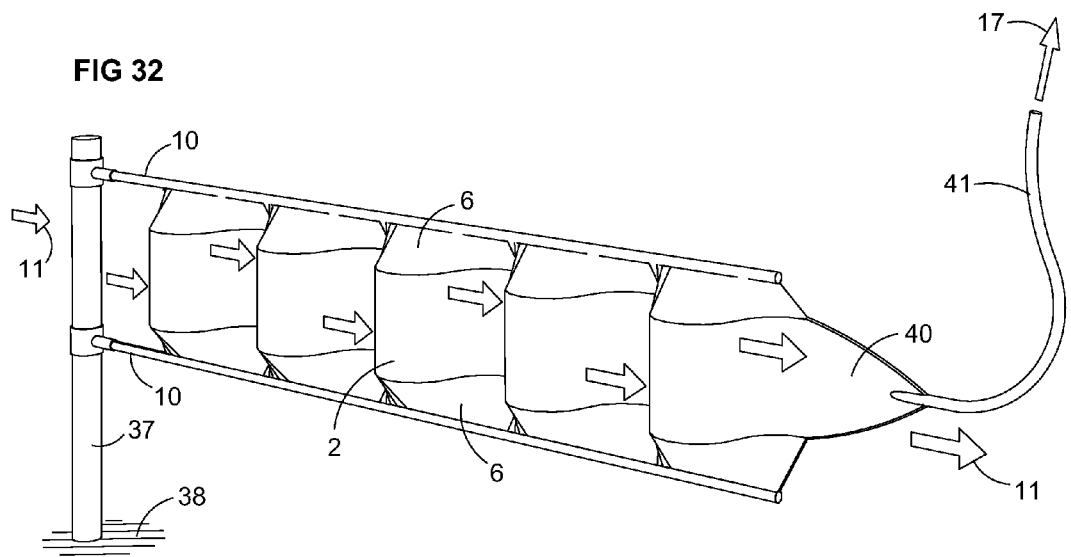

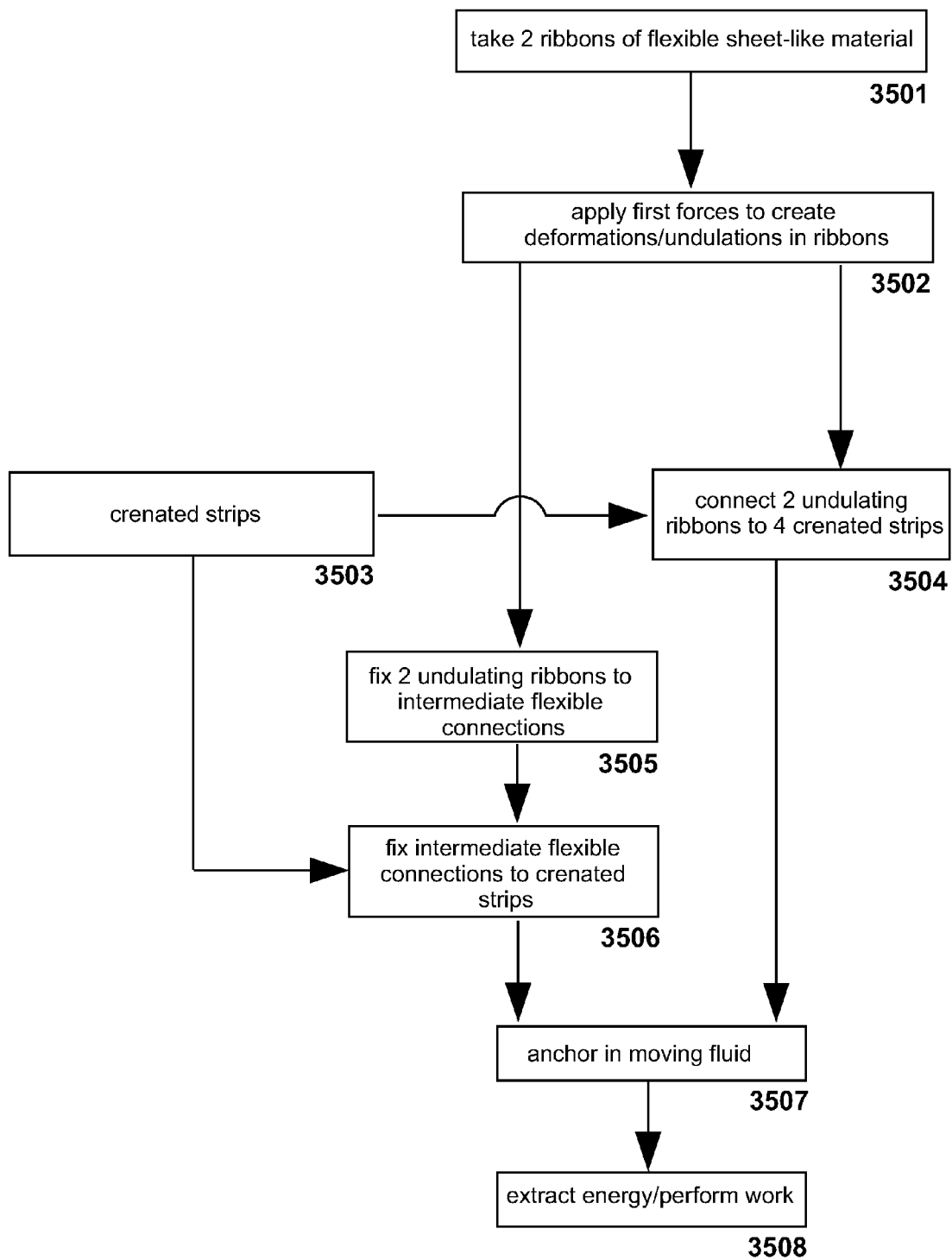

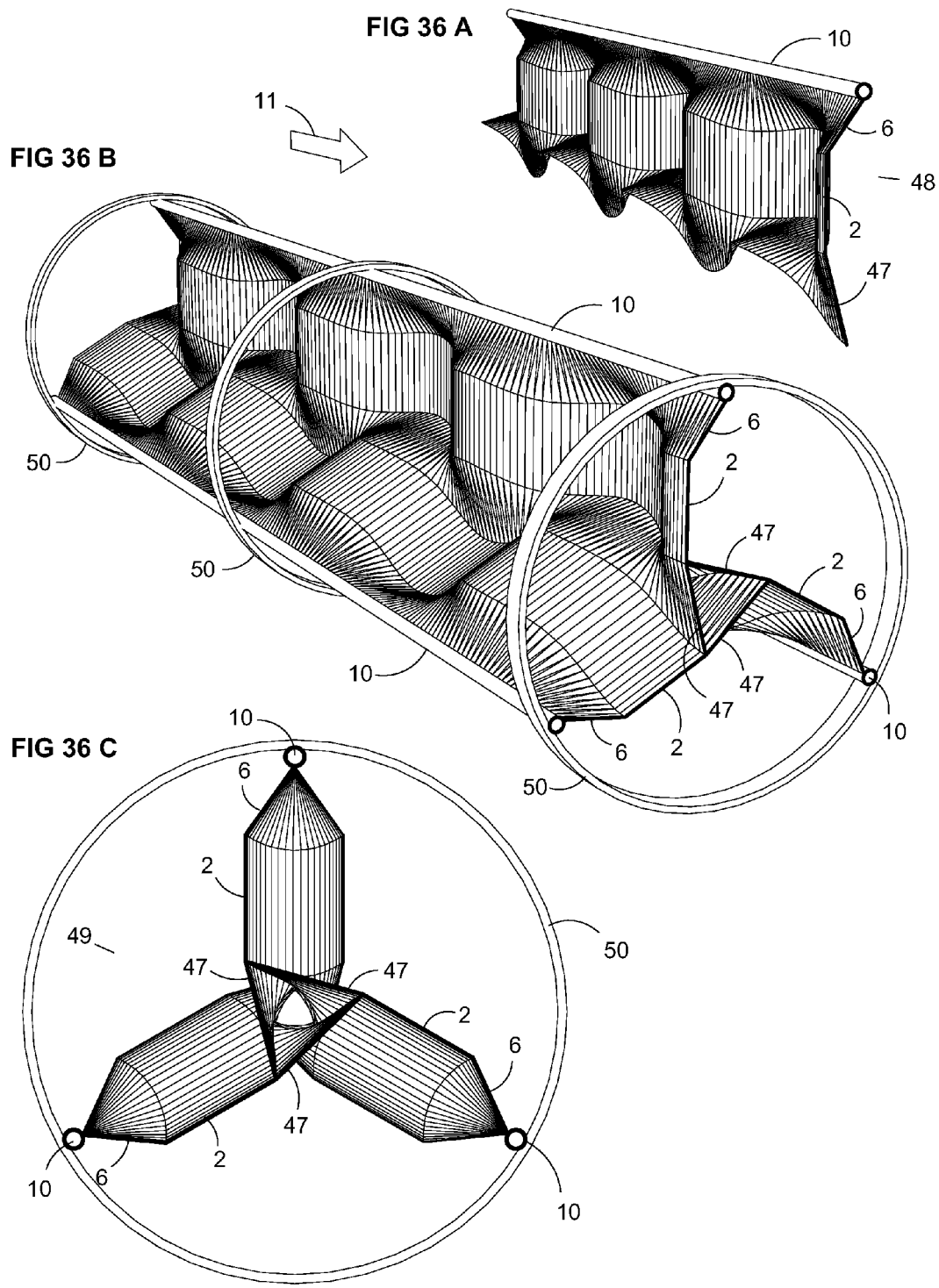

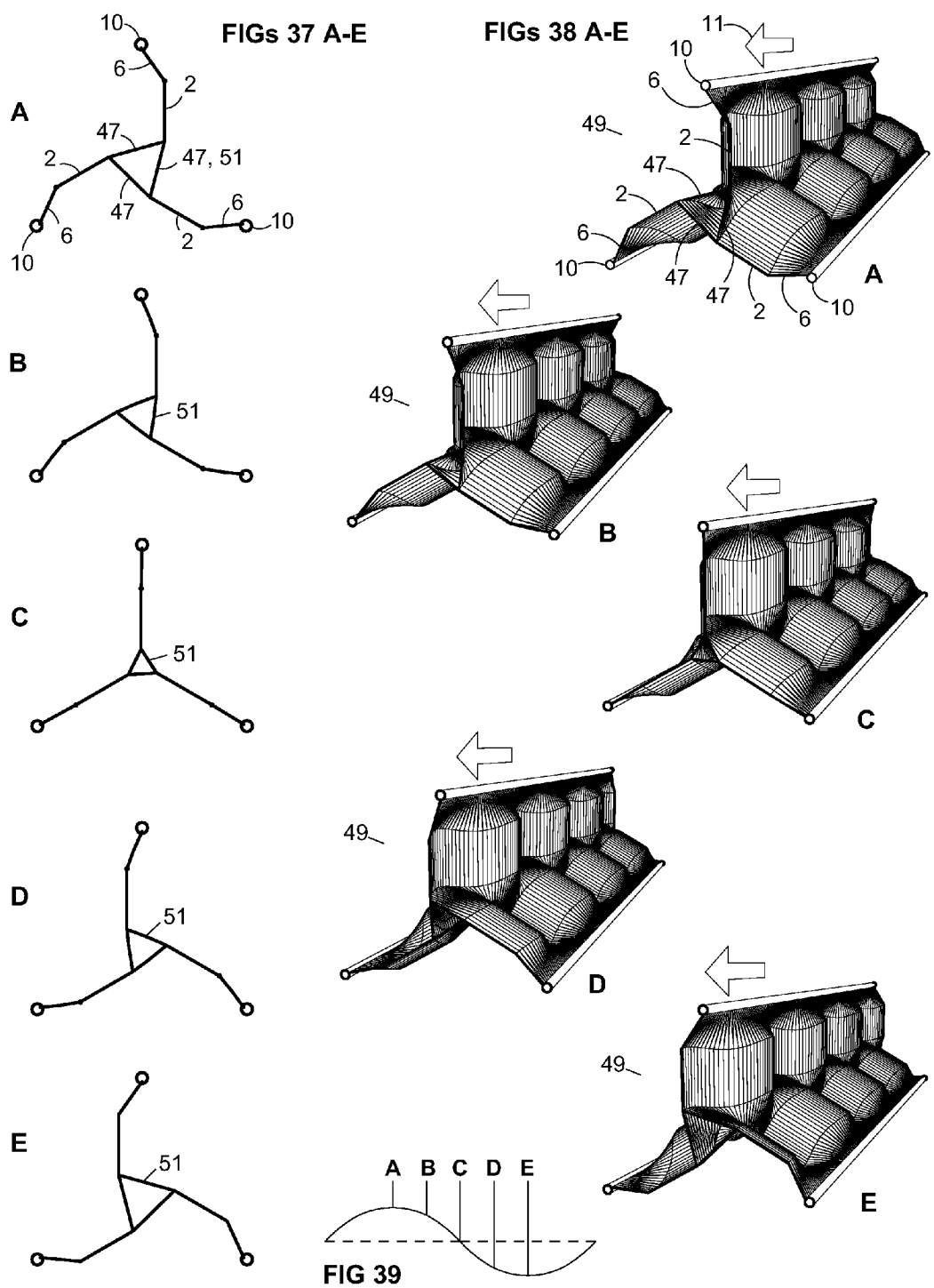

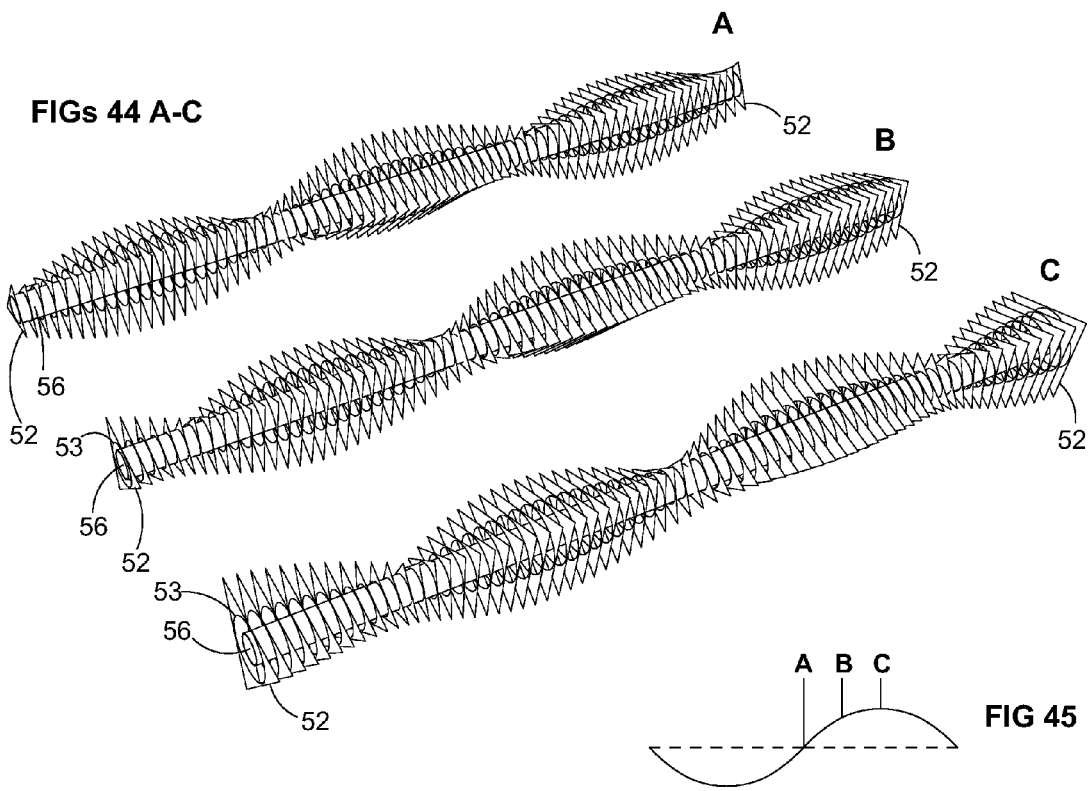
FIGs 44 A-C
FIG 45
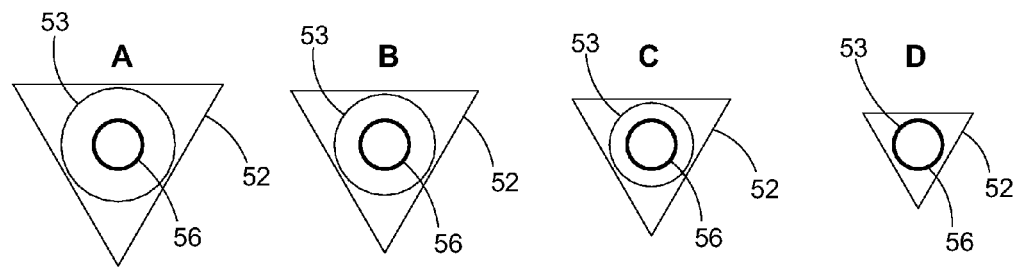
FIGs 46 A-D
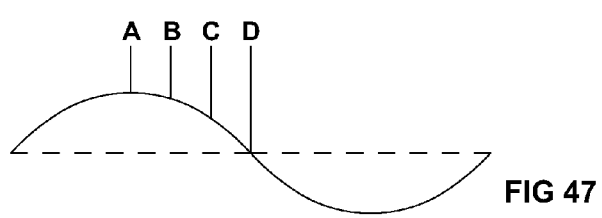
FIG 47

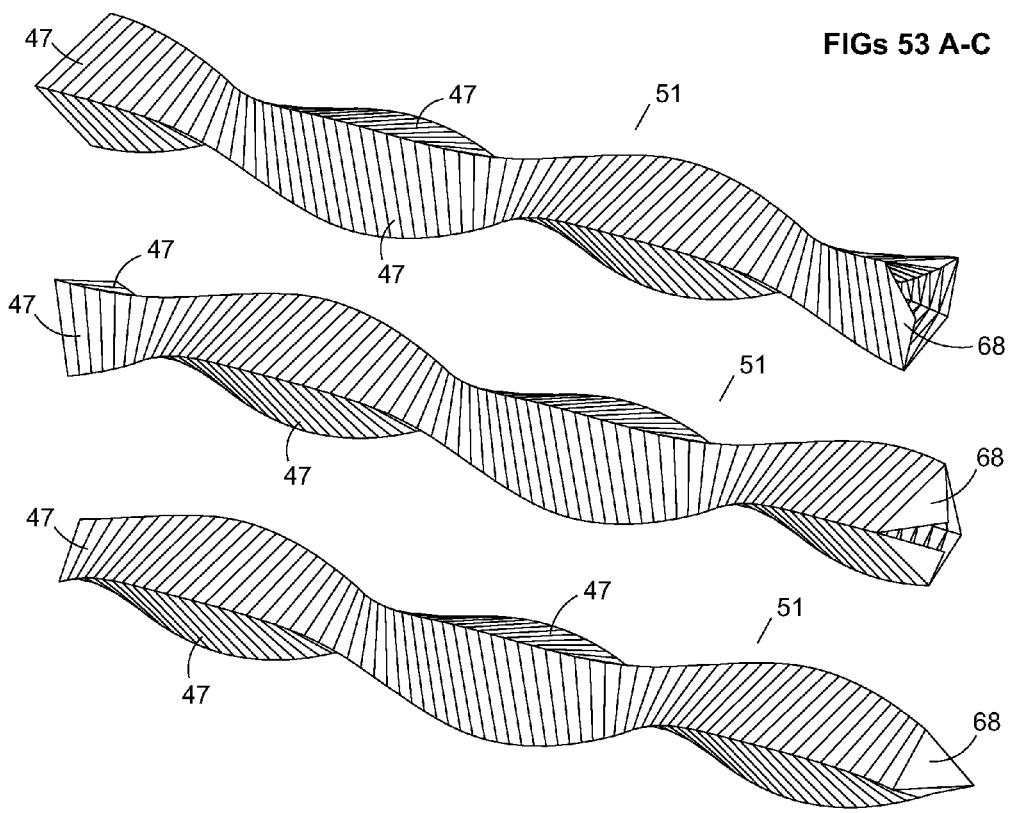
FIGs 53 A-C
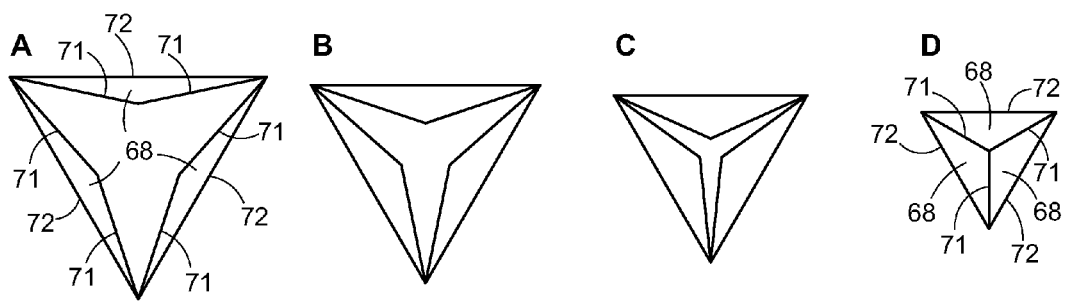
FIGs 54 A-D
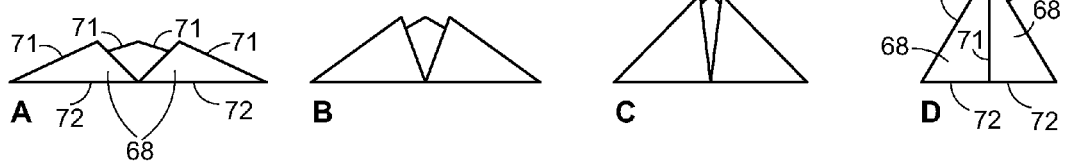
FIGs 55 A-D

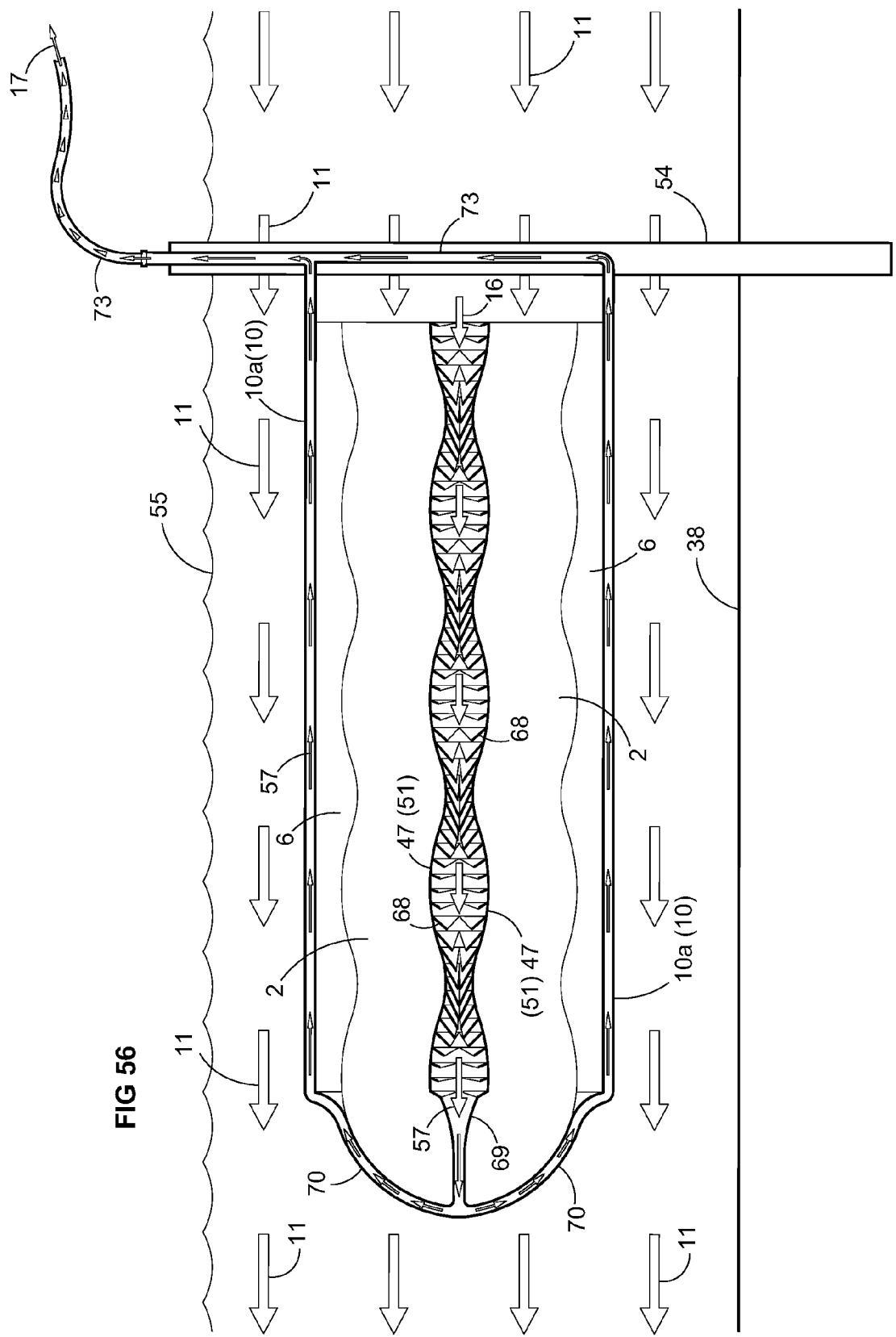

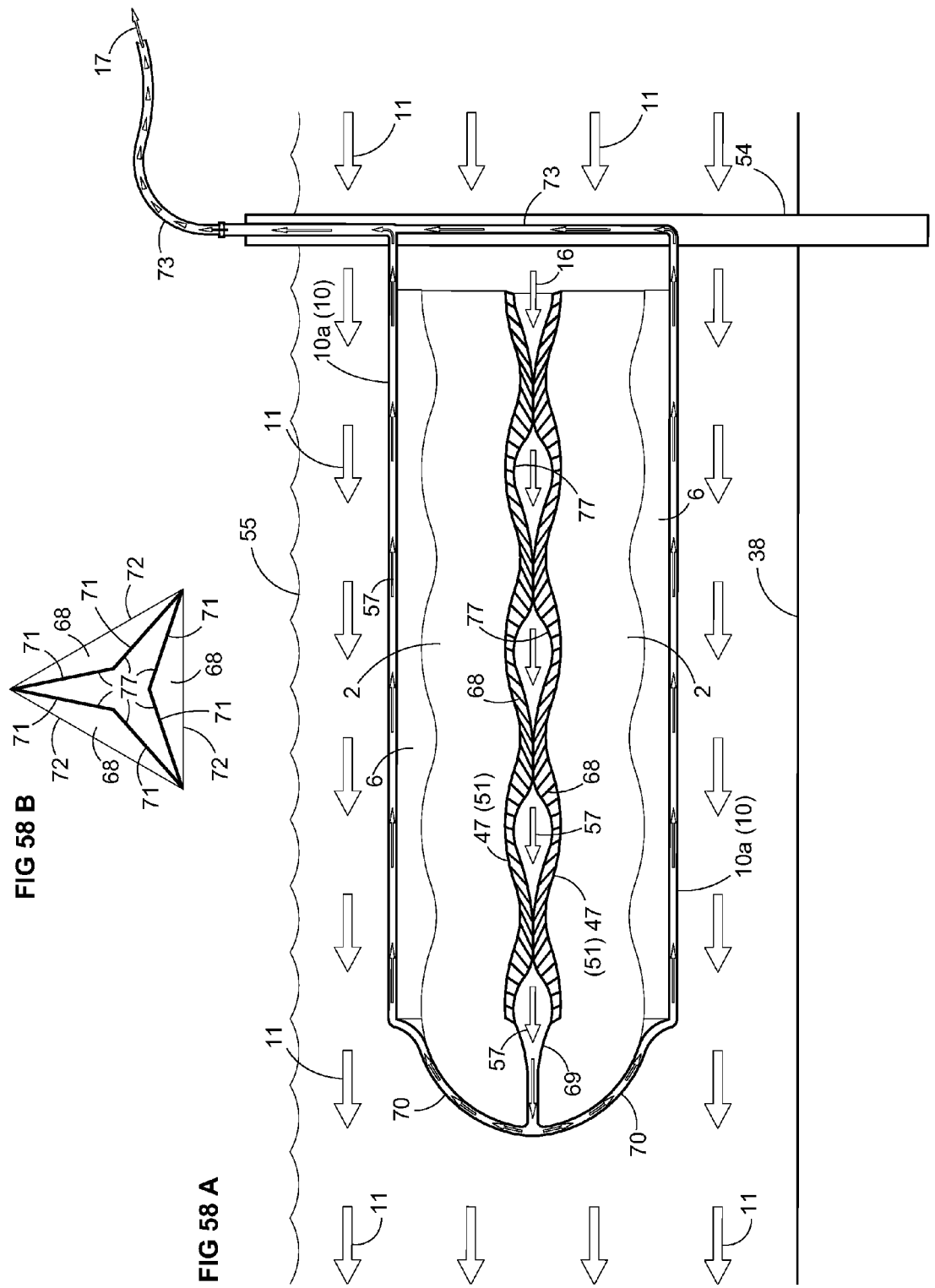

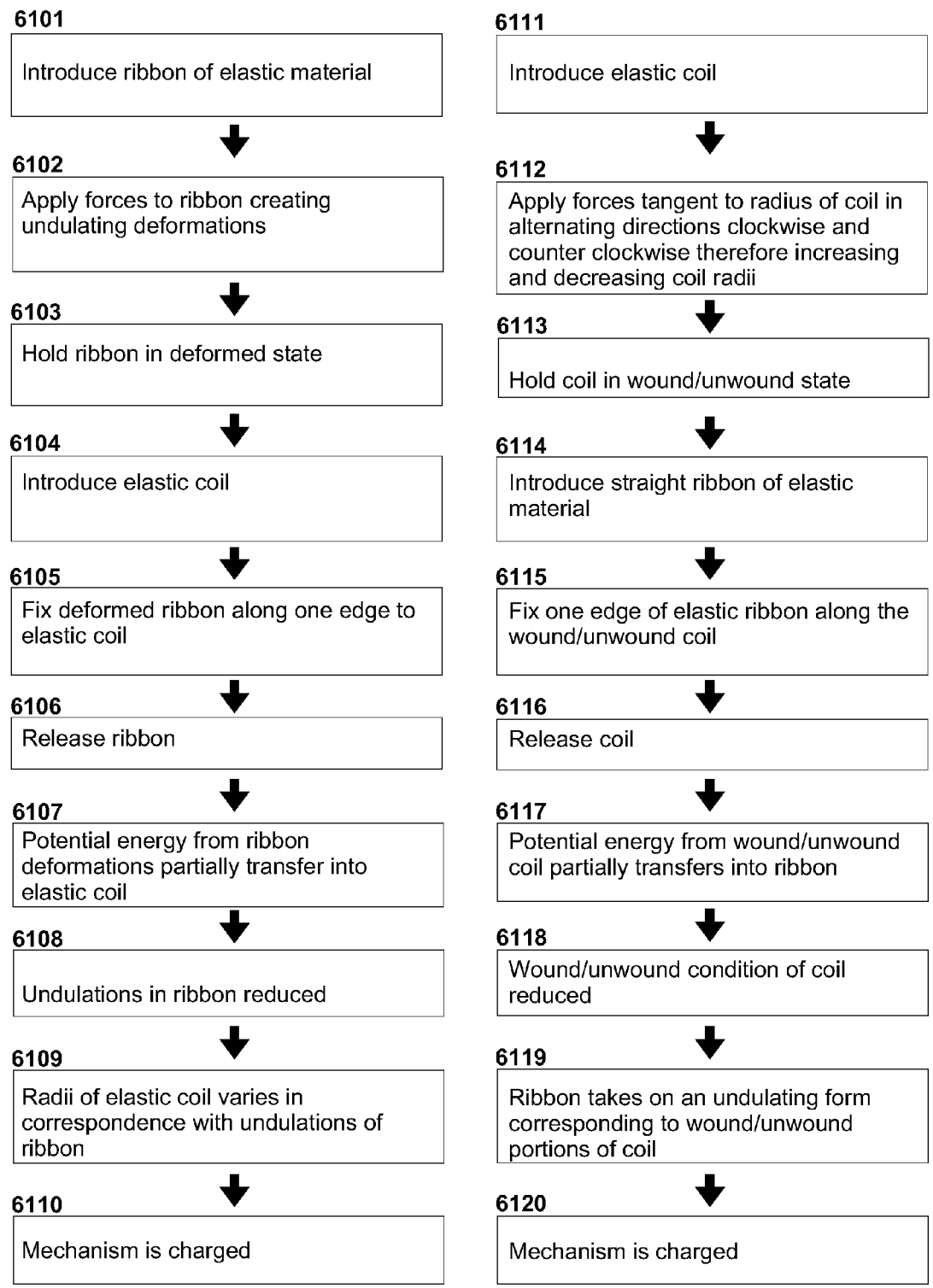

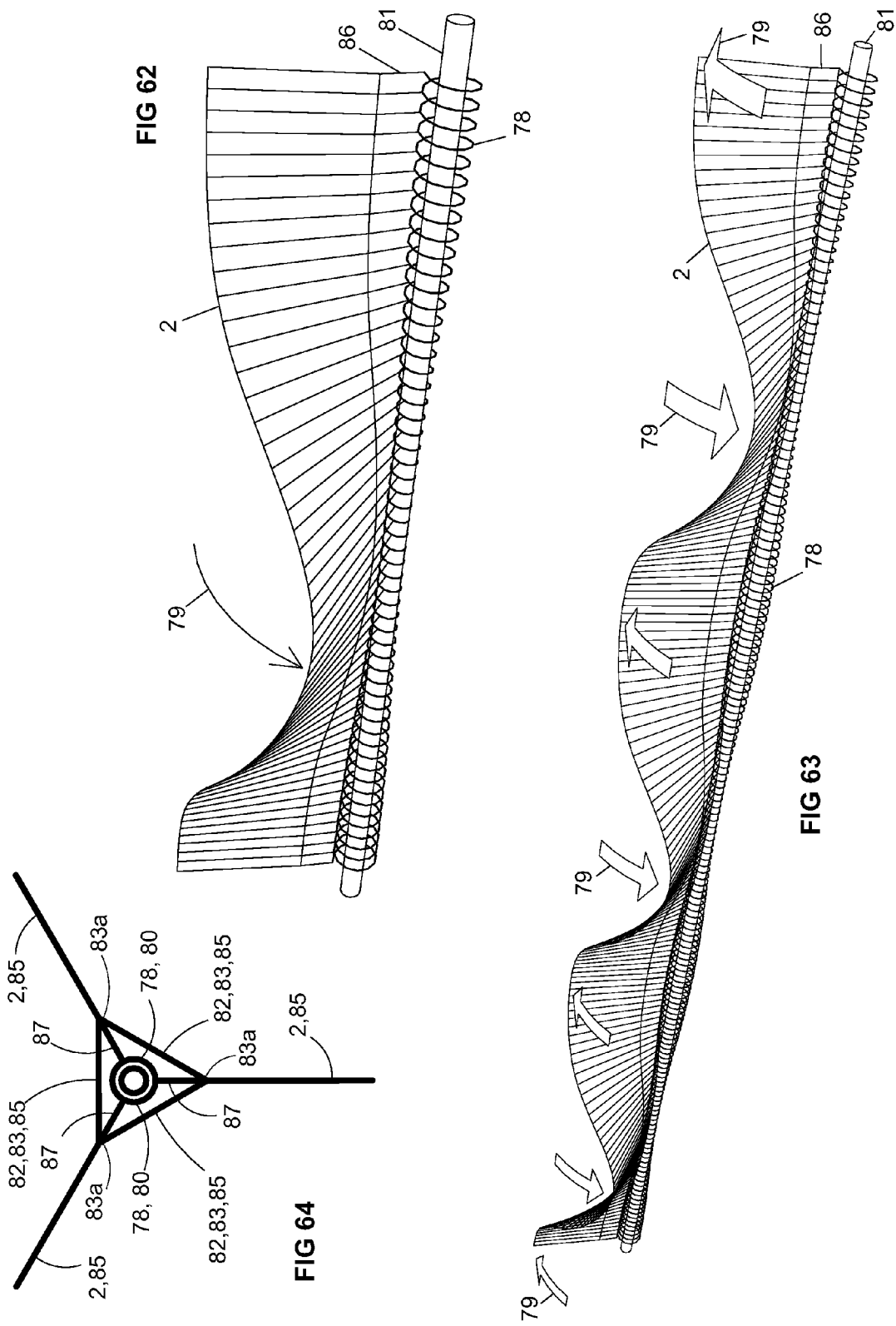

FIGs 65 A-E
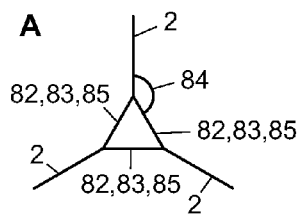
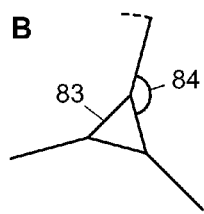
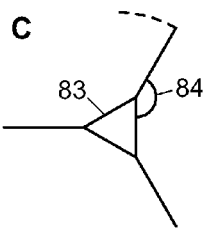
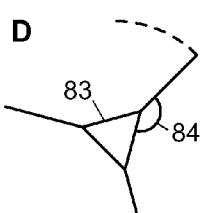
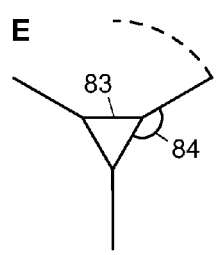
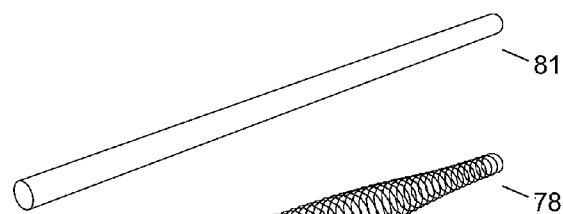
FIG 66
FIG 67
FIG 68
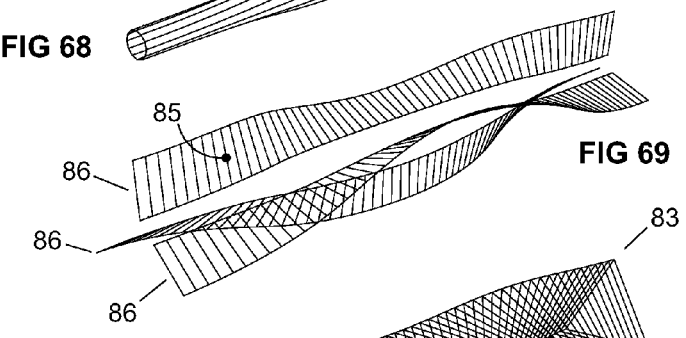
FIG 69
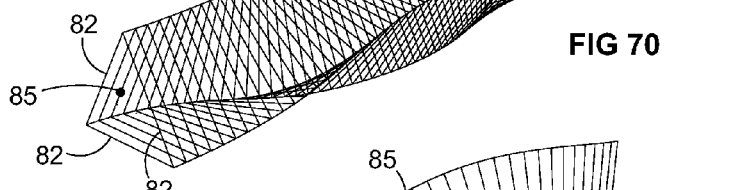
FIG 70
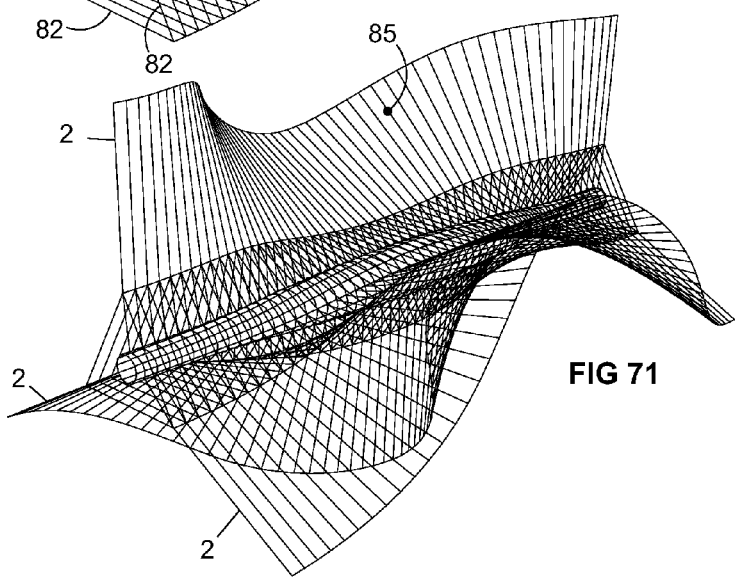
FIG 71

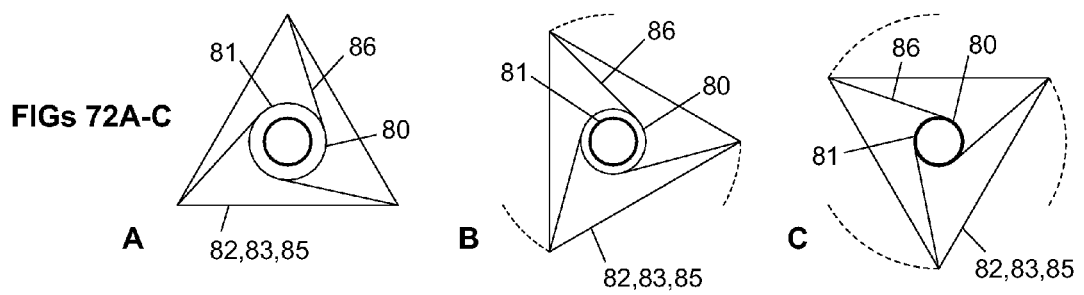
FIGs 72A-C
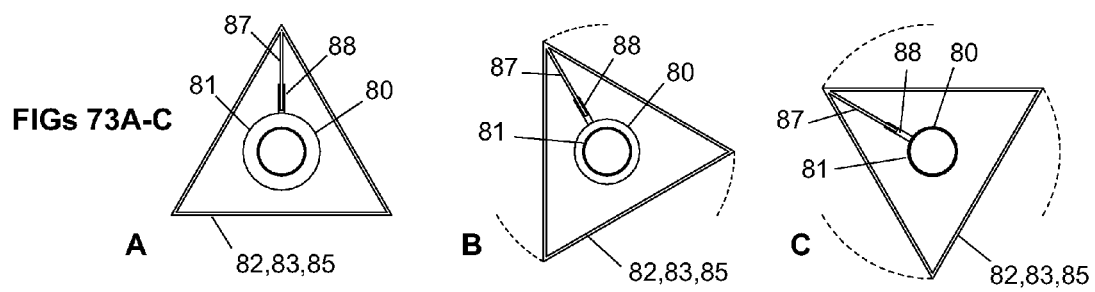
FIGs 73A-C
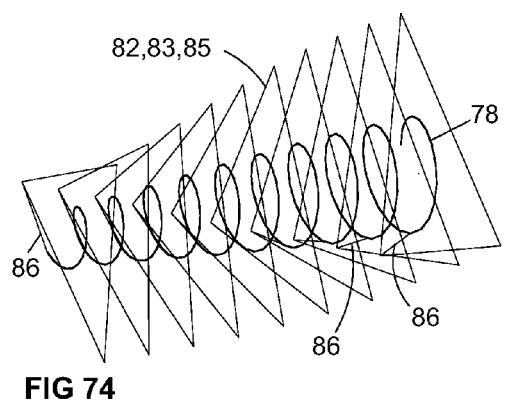
FIG 74
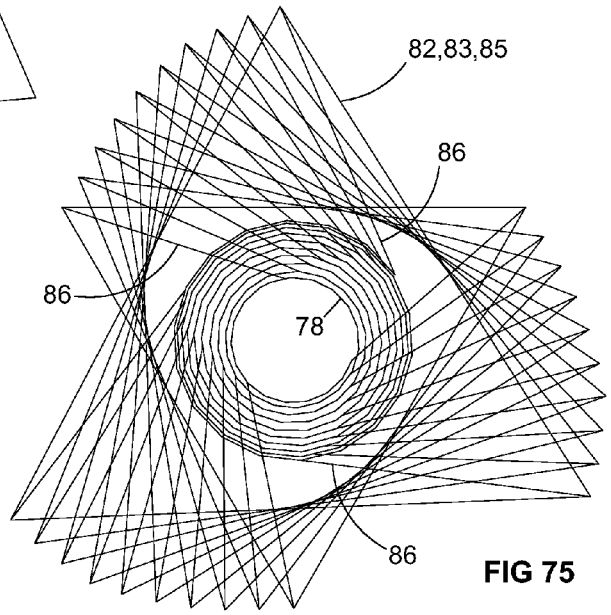
FIG 75

PLIANT OR COMPLIANT ELEMENTS FOR HARNESSING THE FORCES OF MOVING FLUID TO TRANSPORT FLUID OR GENERATE ELECTRICITY

PRIORITY CLAIM AND RELATED APPLICATIONS

This application is a Non-Provisional of prior U.S. provisional patent application Ser. No. 61/227,279 entitled, "Compliant Elements," filed Jul. 21, 2009, to which priority under 35 U.S.C. §119 is claimed.

This application is also a Continuation-In-Part of and claims priority under 35 U.S.C. §120 to prior U.S. non-provisional patent application Ser. No. 12/242,144 entitled, "PLIANT MECHANISMS FOR EXTRACTING POWER FROM MOVING FLUID," filed Sep. 30, 2008 now U.S. Pat. No. 7,696,634, which in turn is a Continuation of and claims priority under 35 U.S.C. §120 to U.S. non-provisional patent application Ser. No. 12/150,910 entitled, "Power generator for extracting power from fluid motion," filed May 1, 2008, which in turn is a Non-Provisional of and claims priority under 35 U.S.C. §119 to U.S. provisional patent application Ser. No. 60/926,984 filed May 1, 2007.

This application is also a Continuation-In-Part of and claims priority under 35 U.S.C. §120 to prior U.S. non-provisional patent application Ser. No. 12/569,762 entitled, "Pliant Mechanisms for Extracting Power from Moving Fluid," filed Sep. 29, 2009 now U.S. Pat. No. 7,839,007, which in turn is a Continuation of and claims priority under 35 U.S.C. §120 to prior U.S. non-provisional patent application Ser. No. 12/242,144 entitled, "PLIANT MECHANISMS FOR EXTRACTING POWER FROM MOVING FLUID," filed Sep. 30, 2008, which in turn is a Continuation of and claims priority under 35 U.S.C. §120 to U.S. non-provisional patent application Ser. No. 12/150,910 entitled, "Power generator for extracting power from fluid motion," filed May 1, 2008, which in turn is a Non-Provisional of and claims priority under 35 U.S.C. §119 to U.S. provisional patent application Ser. No. 60/926,984 filed May 1, 2007.

This application is also a Continuation-In-Part of and claims priority under 35 U.S.C. §120 to prior U.S. non-provisional patent application Ser. No. 12/575,434 entitled, "Pliant Mechanisms for Extracting Power from Moving Fluid," filed Oct. 7, 2009 now U.S. Pat. No. 7,863,768, which in turn is a Continuation of and claims priority under 35 U.S.C. §120 to prior U.S. non-provisional patent application Ser. No. 12/242,144 entitled, "PLIANT MECHANISMS FOR EXTRACTING POWER FROM MOVING FLUID," filed Sep. 30, 2008, which in turn is a Continuation of and claims priority under 35 U.S.C. §120 to U.S. non-provisional patent application Ser. No. 12/150,910 entitled, "Power generator for extracting power from fluid motion," filed May 1, 2008, which in turn is a Non-Provisional of and claims priority under 35 U.S.C. §119 to U.S. provisional patent application Ser. No. 60/926,984 filed May 1, 2007.

All of the aforementioned applications are expressly incorporated herein by reference.

BACKGROUND

The kinetic energy of a moving current of fluid has been harnessed by mankind for thousands of years. The first such mechanisms were used to perform kinetic energy-intensive tasks such as grinding grain or raising water from a river. Since the invention of the electromagnetic generator, this kinetic energy of moving fluid has been converted into electrical energy, for distribution and consumption by all manner of electrical-energy-powered devices.

The raising of water from a river to a higher elevation for human consumption or for the irrigation of fields is one of the oldest recorded uses of hydrokinetic energy. One such ancient mechanism is known as a noria, in which jugs or buckets are fixed to a water wheel. The jugs fill when submerged, and then empty into an aqueduct near the uppermost position along the wheel's rotation. In such a device, the river provides both the water and the energy required to move the water to a desired location.

Other methods for moving water have been developed over the centuries such as the hydraulic ram and wind-powered pumps, but today pumps powered by an electric motor or internal combustion engine usually perform such functions.

SUMMARY

Compliant or "pliant" elements of the embodiments described herein may be assembled with force-induced deformations in the form of planar perturbations analogous to degenerate energy states. FIG. 1A illustrates how aspects of some elements of implementations may be created via force-induced deformations in the form of planar perturbations in one embodiment. The mechanisms may be created by applying force to a flexible article comprised substantially of elastic material to create deformations in the material 1001 into which these forces are locked-in as potential energy in the deformations 1002. The mechanisms may be anchored in moving fluid 1003 whereupon the energy in the moving fluid excites the deformations in the elastic material 1004. The energy transferred from the moving fluid into excitations in the elastic material may be harnessed to perform work such as pumping or generating electricity 1005.

While the term "elastic" may be used to describe the material properties of elements of the flexible articles in these disclosures, flexible articles may, in another embodiment, be comprised primarily of rigid but articulated materials, such as may have a substantially continuous contact surface.

Aspects of the various implementations described herein facilitate the pumping of fluid from source to destination using the kinetic energy available in the fluid source itself, so long as the fluid source is moving. Compliant, or pliant elements may also have several advantages over, for example, a traditional noria that include at least potentially greater efficiency and less expense, and in some implementations the absence of any articulated moving parts, resistance to impact damage from water-born objects, resistance to becoming tangled in plants or other water-born objects, and a more gentle physical interaction with fish and other aquatic animals.

The pumping mechanisms of compliant elements can also be configured to generate electricity, whereby the kinetic energy of the fluid flowing through the pump is harnessed by an electromagnetic generator. Similar advantages of the compliant electricity generation elements of this invention exist as those which apply to the pump implementations. In addition, the electricity generation elements are suitable for "free-flow" hydro applications which do not require the costly and environmentally impactful construction of dams across waterways.

The various compliant elements described herein may be configured to perform work such as to pump fluid for the purpose of moving it from one place to another, or pump fluid for the purpose of generating electricity. The energy to power these pumps may be provided by the kinetic energy of the moving fluid in which these elements are secured.

According to one implementation, pliant elements or mechanisms are fabricated from deformed flexible ribbons of material configured so as to change shape under forces exerted by the flow of fluid moving across or through the mechanisms. One or more undulations are created in the flexible material during fabrication. The undulations may be created by taking a ribbon of flexible material, and applying a force to create undulations in the material, and then using at least one restraining component, or deformation-retention component, to prevent the ribbon from returning to its original unstrained state. The ribbons are secured to these restraining components via crenated strips which exhibit hyperbolic geometry.

In an implementation, the undulations of the mechanisms run parallel to the flow of the current in the moving fluid and the mechanisms are secured to a substrate or other immovable object preventing them from being carried away with the current. Fluid moving past or through the mechanisms exerts forces on the undulations of the ribbons, exciting the undulations and/or causing the undulations to travel down the ribbon in the direction of the moving current. Through a variety of means described below, the traveling undulations of the ribbons are converted into pumping action on fluid captured in the mechanisms.

According to an implementation, pliant mechanisms are comprised of a double layer of flexible ribbon material placed with planes parallel to one another and fixed to each other longitudinally but with a space between the two layers, which may be referred to as the interstitial space. A force is applied to the double ribbon to form undulations as above. The undulations cause the respective layers of the double-layered ribbon to be closer together or further apart in a periodic manner that corresponds with the positions of the undulations, creating pockets along the interstitial space. As the undulations move along the length of the double ribbon under the forces of the moving fluid, the pockets of interstitial space move with them.

In a pump implementation, the upstream end of the double-layered ribbon is open to incoming ambient fluid allowing fluid to enter the interstitial space where it becomes enclosed in an interstitial pocket and transported along the length of the double-layered ribbon. A reservoir at the downstream end of the double-layered ribbon collects the pockets of fluid as they arrive and diverts the fluid along at least one hollow conduit.

In a generator implementation, the upstream end of the double ribbon is closed to ambient fluid but open to at least one conduit filled with fluid in a closed-loop system. Fluid from the conduit fills the first pocket of interstitial space at the upstream end of the double ribbon and exits through a reservoir at the downstream end of the double ribbon, to be transported via at least one conduit back to the upstream pocket of interstitial space, and so on. A turbine may be placed at a location along the conduit to extract power from the moving fluid cycling through the conduit.

In another set of implementations, three or more undulating single-layered or double-layered ribbons, which are each attached along their outer edges to a rigid restraining member via crenated strips, are attached to each other along their inner edges via an inner connecting strip so that the three respective inner crenated strips form a triangle in cross section (where three undulating ribbons are utilized). As the waves undulate in unison, the triangle rotates partially clockwise and counterclockwise, and the triangle expands and contracts in area, which is to say that the summed lengths of the sides of the triangle increase and decrease. Through a variety of valve mechanisms described herein, the expansion and contraction of the triangles creates a peristaltic pump action which transports fluid, either for the purpose of drawing in ambient fluid and pumping it to a desired location in open-loop implementations, or for the purpose of powering an electromagnetic generator in closed-loop implementations.

In another implementation, two, three or more, undulating ribbons are connected longitudinally along their inner edges to a central elastic coil. An implementation using three undulating ribbons is described herein for illustrative purposes only and it is to be understood that other configurations with more or less than three ribbons are possible. If a restrained coil is twisted in the rotational direction of the spiral of the coil, the coil will become shorter in length and/or narrower in diameter, depending on how the coil is restrained. Likewise, if the coil is twisted in a direction opposite to the rotational direction of the spiral or coil, the coil will lengthen and/or increase in diameter, depending on how the coil is restrained. The three undulating ribbons in the implementation are affixed to a central coil so that as the undulations travel along the length of the mechanism parallel to the flow of fluid, the central coil will be twisted clockwise and counterclockwise, causing its diameter to increase and decrease, creating a peristaltic effect which moves fluid along a central core, for the purpose of pumping ambient fluid in an open-loop system, or for the purpose of powering a turbine to generate electricity.

It is to be understood that the elements described herein facilitate significant implementation flexibility/customization depending on a variety of factors including the requirements of a particular application. Furthermore, the various implementations described can function individually or be affixed to one another in scalable multiple arrays. In the pliant generating elements, the pumping action of multiple arrays can be summed to create higher fluid pressures more suitable for powering conventional turbines. Accordingly, a large area of fluid interacts with large areas of flexible ribbons which are the kinetic energy-receiving components of the mechanisms. Therefore, these mechanisms take energy dispersed in a relatively large volume of moving ambient fluid and concentrate that energy into a small volume of moving fluid at increased speed or pressure relative to the flowing ambient fluid.

For the sake of brevity and to facilitate visualization and comprehension of particular implementations and embodiments of the mechanisms described, the word "water" is used in the detailed description of these disclosures instead of the word "fluid". It is to be understood that all implementations utilizing the mechanisms described herein are operable to transport and/or be driven by a wide variety of liquids, gases or any other substances exhibiting fluidic behavior.

BRIEF DESCRIPTION OF THE FIGURES

FIG. 1C illustrates how a single layered flexible ribbon may be formed in an embodiment;

FIGS. 2-3 illustrate how a crenated strip may be formed in an embodiment;

FIGS. 4-5 illustrate how a frond may be combined with crenated strips, in an embodiment;

FIG. 6 illustrates a pressure differential across wave undulations under operation of a frond in an embodiment;

FIGS. 12A and 12B illustrate how pockets may be created by deforming double layers of flexible ribbon in elevation and perspective respectively in an embodiment;

FIGS. 13A and 13B illustrate an alternative way pockets may be created by deforming double layers of flexible ribbon which are affixed to one another in another embodiment;

FIG. 14 illustrates a longitudinal cross section through a double layered frond implementation under operation;

FIG. 15 illustrates a longitudinal cross section through another double layered frond implementation under operation utilizing connecting strips;

FIG. 16 illustrates a schematic cross section through the double layered frond implementation illustrated in FIG. 14;

FIG. 17 illustrates a schematic cross section through the double layered frond implementation illustrated in FIG. 15;

FIGS. 18A-E illustrate cross section cuts through a double layered frond implementation with crenated strips that are substantially fixed in their cross-sectional dimensions under operation;

FIGS. 19A-E illustrate cross section cuts through a double layered frond implementation in which the crenated strips are substantially elastic in their cross-sectional dimension and the ribbons are substantially fixed in their cross-sectional dimension under operation;

FIGS. 20A-E illustrate cross section cuts through a double layered frond implementation where the cross-sectional dimensions of the ribbons and crenated strips both vary under operation;

FIG. 21 illustrates positions within the cycle of operation that the section cuts of FIGS. 18A-E, FIGS. 19A-E and FIGS. 20A-E are taken in one implementation;

FIG. 22A illustrates the double layered frond implementation of FIGS. 18A-E in elevation;

FIG. 22B illustrates a perspective view of FIG. 22A;

FIG. 23A illustrates the double layered frond implementation of FIGS. 19A-E in elevation;

FIG. 23B illustrates a perspective view of FIG. 23A;

FIGS. 24A-C illustrate cross-section cuts through a double-layered frond implementation during one quarter of a cycle of operation;

FIGS. 25A-C illustrate cross-section cuts through a double layered frond implementation with an auxetic interstitial structure, during one quarter of a cycle of operation;

FIG. 26 illustrates the locations within the cycle of operation at which the section cuts of FIGS. 25A-C are taken in one implementation;

FIG. 27 illustrates an auxetic hexagon in one implementation;

FIGS. 28-29 illustrate behavior of an auxetic hexagon structure in one implementation;

FIGS. 30A-C illustrate cross section cuts through a double layered frond implementation in which ribbons are substantially non-elastic in cross-sectional dimension and remain constant in cross-sectional dimension under operation with an extruded parallelepiped-like interstitial structure;

FIGS. 31A-D illustrate aspects of a double layered frond implementation whereby the second interstitial structure will decrease in one direction when forces are exerted upon it in another direction;

FIG. 32 illustrates a double-layered frond pump implementation secured in a flowing stream of water in one embodiment;

FIG. 35 illustrates methods for assembling and implementing the double-layered frond mechanisms in some implementations;

FIG. 36A illustrates an asymmetric frond in an embodiment;

FIGS. 36B-C illustrate an asymmetric frond unit implementation;

FIGS. 37A-E schematically illustrate a sequence of end-on views of an asymmetric frond unit during one half of a cycle of operation in an embodiment;

FIGS. 38A-E illustrate the sequence illustrated in FIGS. 37A-E from a perspective view showing the entire asymmetric frond unit in an embodiment;

FIG. 39 illustrates the positions that the downstream-ends of the asymmetric fronds take within the wave bulge undulation cycle as shown in FIGS. 37A-E and FIGS. 38A-E in one implementation;

FIGS. 44A-C illustrate the behavior in a single-layered frond implementation of elastic triangular membranes at three moments of time correlating to three positions within one quarter of a wave bulge cycle in one embodiment;

FIG. 45 illustrates three points in one quarter of a wave bulge cycle that correspond with FIGS. 44 A-C in one implementation;

FIGS. 46A-D illustrate four cross-sectional views of a triangular core and membrane in one single-layered frond implementation;

FIG. 47 illustrates the corresponding positions within one quarter of a wave undulation cycle that the cross-sections of FIGS. 46 A-D were taken in one implementation;

FIGS. 53A-C illustrate a first triangular core incorporating a triangular valve mechanism in one single-layered frond implementation;

FIGS. 54A-D illustrate end-on views of a triangular valve mechanism at four points in time under operation in one single-layered frond implementation;

FIGS. 55A-D illustrate side-on views of a triangular valve mechanism at the corresponding four points in time under operation illustrated in FIGS. 54A-D in one single-layered frond implementation;

FIG. 56. schematically illustrates a single-layered frond pump implementation in operation utilizing a triangular valve mechanism in one embodiment;

FIG. 58A illustrates another single-layered-frond pump implementation similar in design and operation to the third single-layered-frond pump implementation illustrated in FIG. 56 but utilizing inner connecting strips in one embodiment;

FIG. 58B is a view of the first triangular core looking down its longitudinal axis illustrating how the inner connecting strips form an inverted hexagon in one implementation;

FIG. 61 illustrates two examples of methods for the fabrication of the spiral valve implementations in some embodiments;

FIG. 62 illustrates an aspect of one spiral valve implementation whereby one or more undulating ribbons are secured to a coil in one embodiment;

FIG. 63 illustrates an aspect of a spiral valve implementation whereby the coil is sequentially wound and unwound by applied forces in one embodiment;

FIG. 64 illustrates a schematic cross-section through an implementation utilizing a spiral valve mechanism;

FIG. 65A-E illustrate schematic cross-sections through an implementation utilizing a spiral valve mechanism at different moments during operation;

FIGS. 66-70 illustrate various components of a spiral valve implementation;

FIG. 71 illustrates a spiral valve implementation incorporating the various components illustrated in FIGS. 66-70 with flexible ribbons;

FIGS. 72A-C illustrate a spiral valve implementation with internal radial fins or arms attached to the elastic coil at points tangent to the circumference of the elastic coil;

FIGS. 73A-C illustrate a spiral valve implementation with radial rigid arms secured via rigid sliding connections to the triangular core;

FIG. 74 is a wire-frame illustration of a component of a spiral valve implementation utilizing radial fins or arms to connect the second triangular core to the elastic coil;

FIG. 75 is a wire-frame illustration of a component of a spiral valve implementation looking down the center of the longitudinal axis of a length of second triangular core utilizing radial fins or arms connecting the second triangular core to the elastic coil;

DETAILED DESCRIPTION

Pliant, or "compliant" elements or mechanisms extract energy from a moving body of water and use that energy to do work such as pump water from the moving body of water, or to pump water through a closed-loop system to power an electric generator. In the descriptions herein for various embodiments and/or implementations, numerous specific details are provided, such as examples of components, elements and/or mechanisms, to provide a thorough understanding of implementations described herein. However, it is to be understood that embodiments/implementations may be practiced without one or more of the specific details, through interchanging aspects of the illustrated implementations/embodiments, or with other apparatuses, systems, assemblies, methods, components, materials, parts, and/or the like.

At least three groups of pliant elements are described herein for illustrative purposes. The first group includes mechanisms incorporating double-layered fronds; the second group includes mechanisms comprised of single-layered fronds; and the third group includes mechanisms incorporating spiral valves.

Double-Layered-Frond Mechanisms.

Figure 1A:
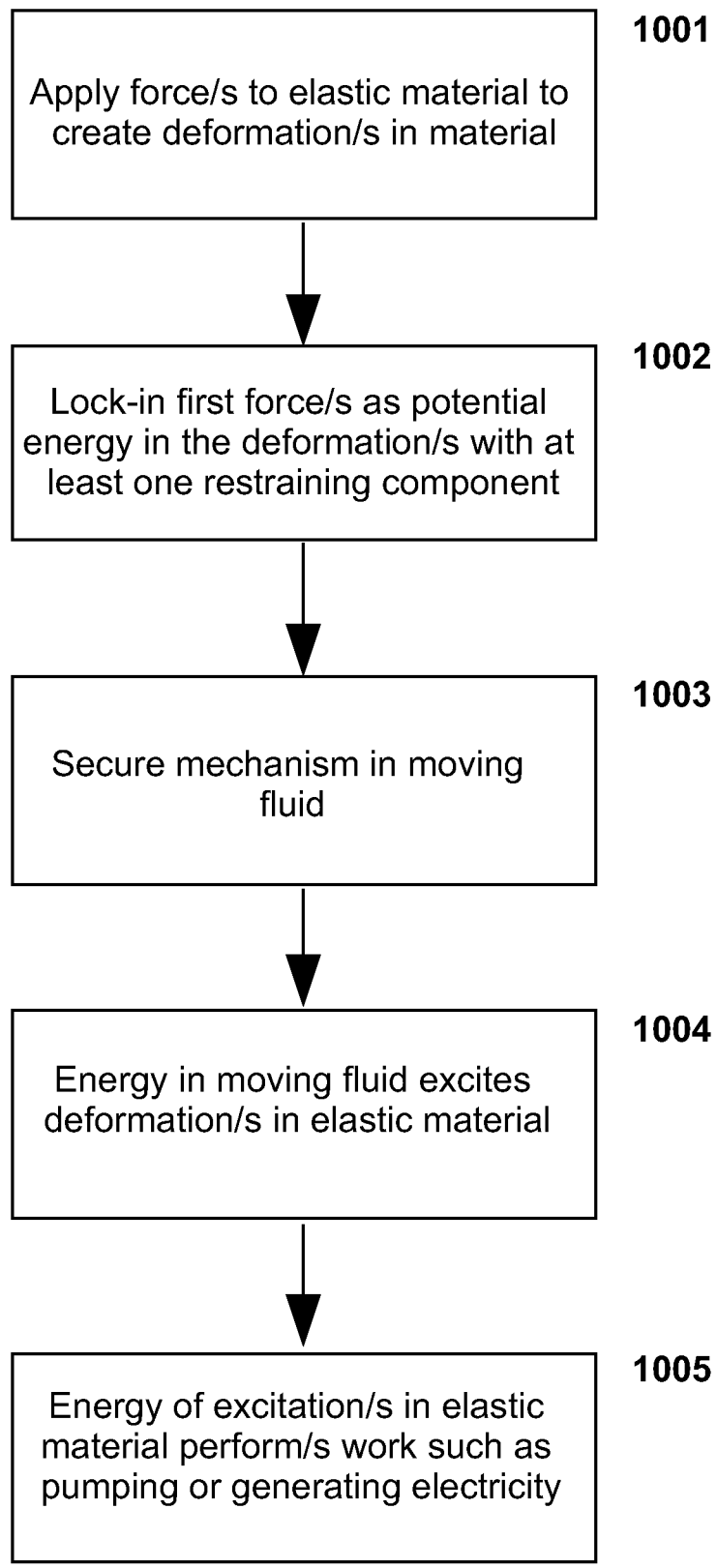
FIG. 1A illustrates how aspects of some characteristics of some elements of implementations may be created via force-induced deformations in the form of planar perturbations in one embodiment.

FIG. 1C illustrates aspects of creating a component common to several implementations described herein, namely the flexible deformed ribbon 2. The flexible ribbon is straight in its relaxed state 1. At least a first force 3 is applied to the ribbon in a manner so as to create one or a series of undulations along its length. The deformations are the result of the internal energy state of the material imposed by this first force 3.

FIGS. 2-3 illustrate aspects of creating another component common to many of the implementations described herein, the crenated strip 6. One method for creating a crenated strip with the described morphology and internal energy state is as follows: An arc-shaped piece of flexible or elastic sheet-like material 5 is deformed with at least a second force 7 until the outer arc of the strip 8a and the inner arc of the strip 8b become equal in length, at which point the inner arc 8b of the strip is in tension, and the outer arc 8a of the strip is in compression causing the strip to take on a hyperbolic geometry with a "crenated", or ruffled appearance.

Figure 1B:
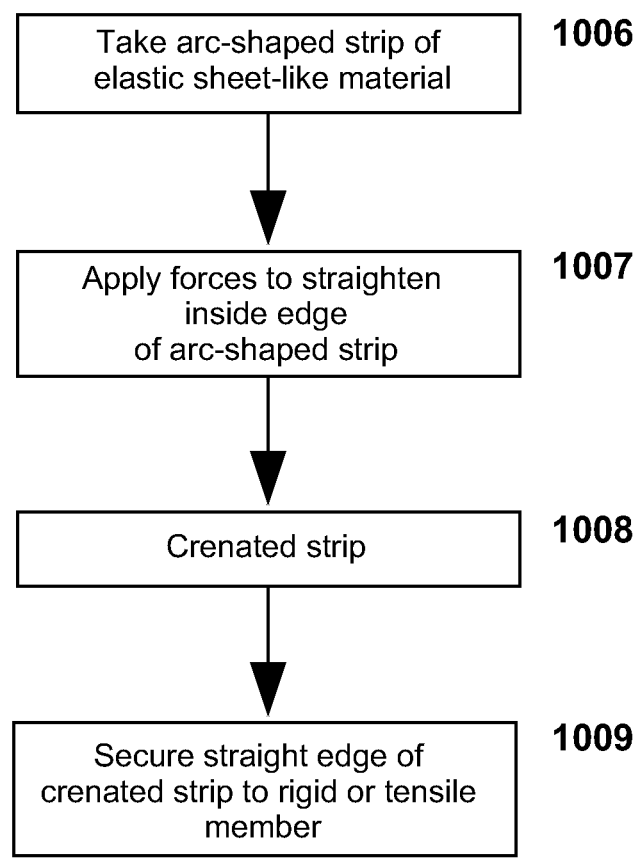
FIG. 1B illustrates one method for assembling a crenated strip in one embodiment.
Figure 7:
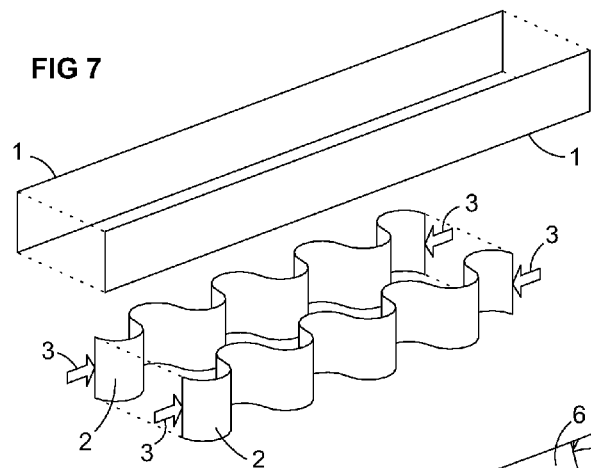
FIG. 7 illustrates the how a double layered ribbon may be formed in an embodiment.
Figure 9:
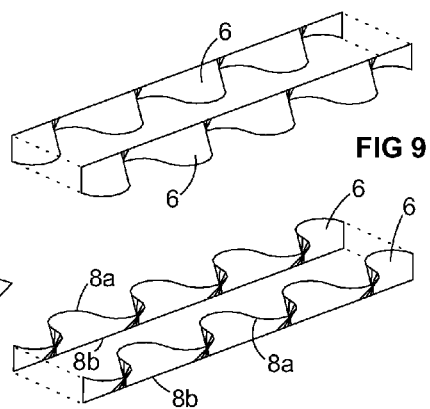
FIGS. 8-9 illustrate a method of forming double crenated strips in an embodiment.
Figure 8:
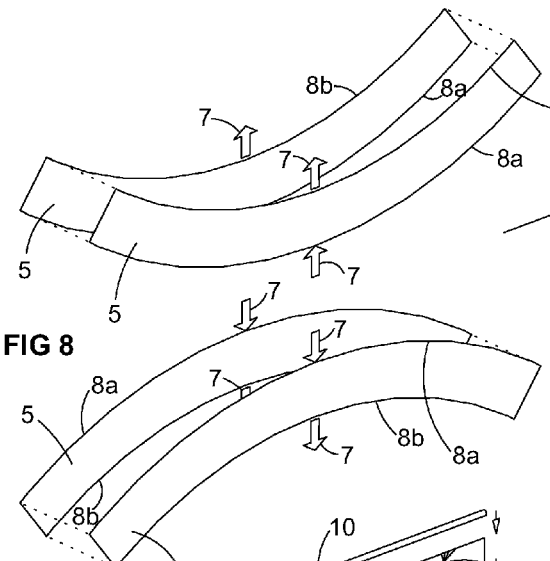
Figure 11:
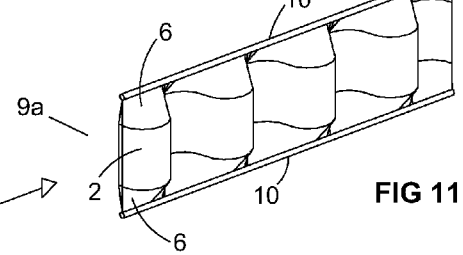
FIGS. 10-11 illustrate how a double-layered frond unit may be formed in an embodiment.
Figure 10:
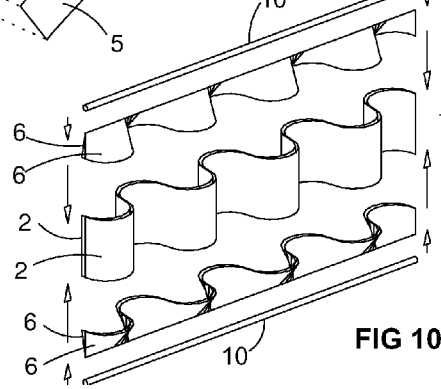

FIG. 1B illustrates one method for assembling a crenated strip in an implementation whereby an arc-shaped strip of elastic sheet-like material 1006 has forces applied to it 1007 so that the inside edge of the arch-shaped strip is straightened, creating a crenated strip 1008. The straight edge of the crenated strip may be secured to a rigid or tensile member 1009 to lock-in the applied forces as potential energy.

A deformed ribbon 2 is fixed to two crenated strips 6 along its outer longitudinal edges creating a frond 9. The first force 3, which has been applied to the ribbon 1 and the second force 7, which has been applied to the pre-strained crenated strips 5, are held as potential energy within the frond 9 by the first restraining, or deformation-retention components 10, such as rigid tubes or members FIGS. 4-5. The frond 9 is now in its strained or "charged" state. The undulations are expressions of the internal energy state of the frond, so will remain as long as the first restraining components, or deformation-retention components 10 remains affixed to the frond 9. Therefore, additional forces applied to the frond 9 can change the relative positions of the undulations within the frond 9 but not the presence of the undulations in some position within the frond 9.

When the frond 9 is secured in a moving stream of fluid so that the frond is fixed in place and does not travel with the fluid, and so that the length of the frond 9 runs substantially parallel to the direction of moving fluid 11, the pressure of the fluid adjacent to portions of the frond that face obliquely upstream 4a will be greater than the pressure of the fluid adjacent to portions of the frond that face obliquely downstream 4b, FIG. 6. These pressure differentials cause the positions of the undulations to move along the length of the frond in the direction of the moving fluid 11. The kinetic energy of the moving water is therefore transferred into the movement of undulations down along the frond 9. Work is extracted from the movement of the undulations to power the mechanisms embodied herein. The number of undulations is a property of the way the material receives strains and the internal energy state of the frond 9. Therefore, if the kinetic energy of the moving water 11 pushes an undulation off of one end of the frond 9, another undulation will form at the opposite end of the frond 9.

In several implementations, the flexible ribbon 2 may be configured as a double-layer, with the respective layers being connected to each other longitudinally but with interstitial space 2a in between the two layers. In these double-layered frond 9a implementations, the flexible ribbons 2 may be connected to each other indirectly via crenated strips 6 to the first restraining components 10, or may be connected to each other directly via intermediate flexible connections 12 (FIG. 17), which in turn connect to a crenated strip 6, which in turn is connected to the first restraining components 10. FIGS. 7-11 show how a double-layered frond 9a may be formed and connected via crenated strips 6 to the first restraining component 10.

In double-layered frond 9a implementations where the flexible ribbons 2 are connected to each other via two crenated strips 6 to the first restraining components 10, the two crenated strips may be separated from each other in a manner that matches the separation of the two flexible ribbons 2 and therefore make contact with each other as the two flexible ribbons 2 make contact, and separate as the two flexible ribbons 2 separate, being fixed to the two flexible ribbons 2 along their undulating longitudinal edges. Along their other, non-undulating edges the crenated strips 6 make contact with one another at their place of contact with the first restraining component 10, or come close together so that the interstitial space between the crenated strips 6 is narrowest along their straight edges.

Figure 12A:
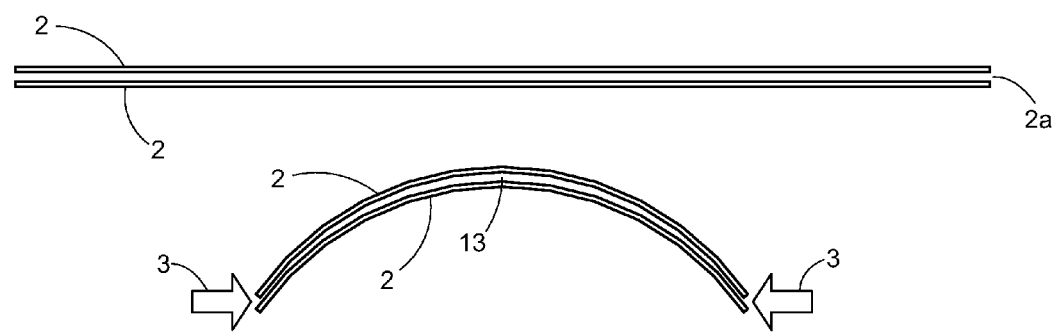
Figure 13A:
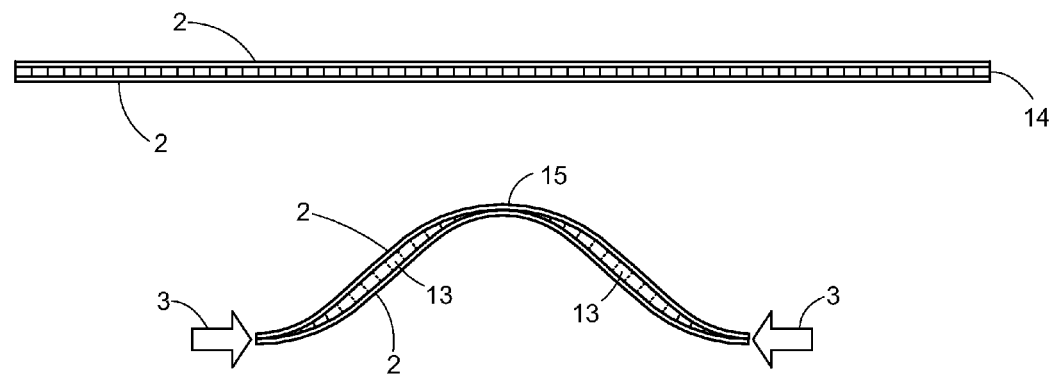

FIGS. 12A and 13A illustrate aspects of how pockets 13 may be created in the interstitial space 2a between the ribbons 2 of the double-layered frond 9a implementations. In FIG. 12A a first force 3 is applied to two ribbons 2 of a flexible sheet-like material separated from each other by a small interstitial space 2a causing them to bend and deform to accommodate this force 3. The radius of the two curves formed by the two ribbons 2 are equal and one curve lies above the other, therefore the distance between the two ribbon 2 layers is greatest at the peak of the curve. Therefore, a pocket 13 is created in the interstitial space 2a between the two ribbons 2.

In FIG. 13A the interstitial space between the two ribbons 2 is occupied by an interstitial material or structure 14 fixed to the inside faces of both ribbons 2 and which can be readily compressed or stretched on the axis perpendicular to the plane of the ribbons 2. This configuration can be thought of as analogous to a three-layered laminated material in which the two outer layers are flexible perpendicular to the plane of the material but which can be stretched or compressed only minimally in the longitudinal direction parallel to the plane. In this analogy, the third, inner layer connecting the two outer layers could be a material like soft foam rubber. In this analogous configuration, the two outer layers, being bound to one another and unable to shift substantially in the longitudinal direction, will press closer together at the greatest peak of the curve 15, and separate from one another one half way up the peak, creating pockets 13 at those locations. FIGS. 12B and 13B are three dimensional representations of FIGS. 12A and 13A.

FIG. 14 illustrates a longitudinal cross-section through a double-layered frond 9a configured with a series of undulations with interstitial pockets 13 at the peak amplitude of the bulge deformations either side of the wave undulation's neutral axis, in accordance with the characteristics illustrated in FIGS. 12A and 12B. When secured in place, the current of water 11 passing across the double-layered ribbons 2 causes the bulge undulations to travel down along the double-layered ribbons 2 in the direction of the current, and therefore the positions of the interstitial pockets 13 will travel along the frond 9a with the bulge undulations. If the interstitial space between the double-layered ribbons 2 at the upstream end of the frond is open to the water of the flowing current 11, ambient water 16 may enter the interstitial space at the maximum wave amplitude during which the interstitial 2a space is at its greatest. This water will become enclosed in an interstitial pocket 13 which will travel along the frond in the direction of the moving water current, and exit 17 at the downstream end of the double-layered frond 9a.

FIG. 15 shows a longitudinal cross-section through a double-layered frond 9a configured with a series of undulations with interstitial pockets 13 that occur at the neutral axis respectively, in accordance with the characteristics described above and illustrated in FIGS. 13A and 13B. (The interstitial structure 14, which allows the passage of water is not shown in FIG. 15 for purposes of graphic clarity, but will be described subsequently and is illustrated in FIGS. 25A-C and FIGS. 30A-C). The forces of water in the moving current 11 move the interstitial pockets 13 along the frond as described above for the implementation illustrated in FIG. 14, so the action of the implementations illustrated in FIG. 14 and FIG. 15 are similar. A difference occurs in where during the cycle of wave undulations the pockets are created.

As above, each ribbon 2 of the double-layered frond 9a may be attached directly along both longitudinal edges to crenated strips 6, which themselves are attached to the first restraining component 10. Such an arrangement is utilized in the double-layered frond 9a implementation with pockets at maximum amplitude as illustrated in FIG. 14. A cross-section of this arrangement is shown in FIG. 16. Alternatively, the longitudinal edge of each ribbon 2 of the double-layered frond 9a may be connected to one another via intermediate flexible connections 12, each of which is connect to a single crenated strip 6 which in turn connects to the first restraining component 10 as shown in FIG. 17.

FIGS. 16, 17 also illustrate how cross section cuts through double-layered frond implementations may take the form of elongate hexagons: In FIG. 16 the sides of the hexagon are comprised of two ribbons 2 and four crenated strips 6. In FIG. 17 the sides of the hexagon are comprised of two ribbons 2 and intermediate flexible connections 12.

The behavior of the frond 9 or double-layered frond 9a under operation is subtle and will vary depending on a number of factors including the relative elasticity of ribbons 2, crenated strips 6 and, where present, the intermediate flexible connections 12 among other factors. FIGS. 18A-E and FIGS. 19A-E are schematic diagrams showing five cross-section cuts viewed from a certain direction 2201 and 2301 respectively, of two slightly different frond 9 configurations during one half a cycle of operation, starting at maximum amplitude of the wave bulge, decreasing to zero amplitude, and increasing again to maximum amplitude on the opposite side of the neutral axis. FIG. 21 illustrates where in the wave cycle, or bulge deformation cycle, these corresponding section cuts were taken for the two respective figures above. Dotted lines have been added to FIGS. 18A-E and 19A-E connecting the same points in the successive section cuts to show how the locations of these points change during operation.

The summed cross-sectional dimension, which is the width of a ribbon 2 plus the width of two fronds 6, varies during operation, being at its maximum at the maximum amplitude of deformation, and being at its minimum at the neutral axis of the wave, at which point the ribbons 2 and crenated strips 6 approximate a straight line in cross-section. (FIGS. 18C and 19C). Several implementations are described herein which facilitate or accommodate this behavior.

FIGS. 18A-E illustrate an implementation with crenated strips 6 that are substantially fixed in their cross-sectional dimension 18. Therefore, the cross-sectional dimension 19 of the ribbon 2 in this implementation must change during operation, and therefore must be substantially elastic in cross-sectional dimension. In double-layered frond 9a implementations incorporating intermediate flexible connections 12, the summed cross-sectional dimension 19 of the ribbons 2 plus intermediate flexible connections 12 must change during operation, being maximum in FIG. 18A, E and minimum in FIG. 18C.

FIGS. 19A-E show an implementation in which it is the crenated strips 6 that are substantially elastic in their cross-sectional dimension 18, whereas the ribbons 2 are substantially fixed in their cross-sectional dimension 19. Therefore the cross-sectional dimension 18 of the crenated strips 6 must change during operation. In double-layered frond 9a implementations incorporating intermediate flexible connection 12 the cross-sectional dimension 18 of the fronds 6, or the summed cross-sectional dimension of the fronds 6 plus intermediate flexible connections 12, must change during operation, being maximum in FIG. 19A, E and minimum in FIG. 19C.

FIGS. 20A-E illustrate yet another configuration, whereby the cross-sectional dimensions 19 of the ribbon 2 and the cross-sectional dimension 18 of the crenated strips 6 both vary under operation, because both the ribbon 2 and crenated strip 6 are substantially elastic in their cross-sectional dimension. Therefore, both the cross-sectional dimension 19 of the ribbon 2 and cross-sectional dimensions 18 of the crenated strips 6 are at their shortest at the neutral axis of the wave deformations (FIG. 20C). FIG. 21 illustrates positions within the cycle of operation that the section cuts of FIGS. 18A-E, FIGS. 19A-E and FIGS. 20A-E are taken in one implementation.

The morphology taken by the implementation shown in FIGS. 18A-E is illustrated as an elevation in FIG. 22A. The morphology of the implementation shown in FIGS. 19A-E is illustrated as an elevation in FIG. 23A. A perspective view of the implementation illustrated in FIG. 22A is shown in FIG. 22B, and a perspective view of the implementation illustrated in FIG. 23A is shown in FIG. 23B.

FIGS. 24A-C shows a cross-section through a double-layered frond 9a implementation during one quarter of a cycle of operation, during which the bulge deformation changes from maximum to minimum amplitude of the wave bulge cycle, and the interstitial pocket 13 changes from maximum volume at maximum amplitude, to minimum volume at minimum amplitude. In the implementation shown in this illustration, both the ribbons 2 and crenated strips 6 are substantially elastic in their cross-sectional dimensions. (FIGS. 20A-E). The cross-sectional dimensions 18 of the crenated strips 6 and the cross-sectional dimensions 19 of the ribbons 2 decrease steadily between position of operation as shown in FIG. 24A and position of operation as shown in FIG. 24C.

Figure 24D:
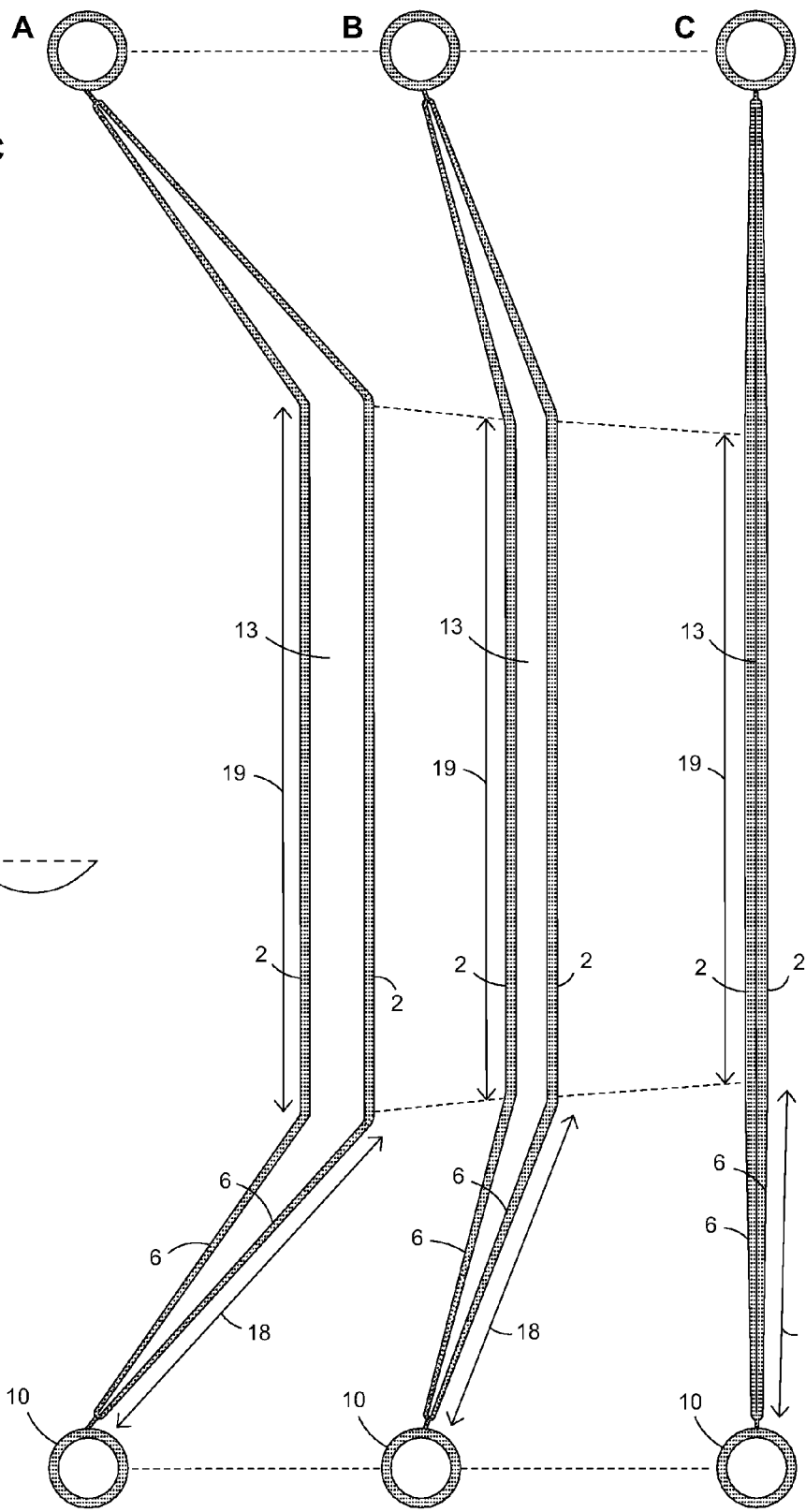
FIG. 24D illustrates the locations within the wave bulge undulation cycle at which the section cuts of FIGS. 24A-C were taken.

FIG. 24D indicates the locations within the wave bulge undulation cycle at which the section cuts of FIGS. 24A-C are taken.

FIGS. 25A-C show yet another double-layered frond 9a implementation during one quarter of a cycle of operation, in which the interstitial space 2a is occupied by an interstitial structure 14. FIG. 26 indicates the locations within the wave bulge undulation cycle at which the section cuts of FIGS. 25A-C are taken.

The components 22 of this interstitial structure 14 are comprised of a material enabling the components 22 to flex at their joints, allowing the interstitial structure as a whole to expand or contract perpendicular to the plane of the longitudinal axis of the frond 9a. The material comprising the components 22 is highly-elastic perpendicular to the longitudinal axis of the frond 9a. The components 22 of this interstitial structure 14 are fixed to the internal faces of the crenated strips 6 and ribbons 2 and take the form of continuous extrusions, or channels 23, running parallel to the longitudinal axis of the double-layered frond 9a. Water 16 entering the upstream end of the double-layered frond 9a passes along the channels 23 created by these extruded components 22. Under operation, the cross-sectional dimension of these channels 23 expands and contracts perpendicular to the planes of the crenated strips 6 and ribbons 2. The positions of the regions of expansion and contraction in the double-layered frond 9a move parallel to the flow of the water current 11, pushing water in the channels 23 down along the frond, where the water exits 17 the double-layered frond 9a as shown in FIG. 14.

The action of the double-layered frond 9a described above and illustrated in FIGS. 25A-C are facilitated in one implementation by utilizing characteristics of auxetic structures. Auxetic materials are materials with a negative Poisson's ratio, which is to say that when the material is stretched in one direction, it does not shrink in the other direction but instead expands in this other direction also. The term "auxetic" is applied to materials but can also apply to structures, one variation of which is the so-called Hoberman Sphere. The auxetic structures as employed in this implementation and shown in FIGS. 25A-C may utilize the inverted hexagon 24, also referred to as the auxetic hexagon FIG. 27. When multiple auxetic hexagons 24 are configured in a manner as shown in FIG. 28, the resulting auxetic structure 25, when stretched by a force 26 in one dimension will also stretch in another dimension 27, FIG. 29.

The components 22 of the interstitial structure 14, in combination with the fronds 6 and ribbons 2, comprise the auxetic structures 25 of this implementation. These components 22 take on the form of auxetic structures 25 in cross section, whereby these structures are extruded longitudinally along the length of the double frond 9a forming channels 23 down which water may flow. The inclusion of auxetic structures occupying the interstitial space 2a facilitates the expansion and contraction of the interstitial pockets 13, and thus the channels 23, in the following manner: When the crenated strips 6 and double-layered ribbons 2 increase in cross-sectional dimension, their action will cause the auxetic structures 25, which they are a part of, to increase in dimension perpendicular to the axis of the double-layered frond, thus expanding the space between the two ribbon 2 layers and two crenated strip 6 layers, and thus further facilitating the expansion of the pockets 13 of the interstitial space 2a.

Figure 30:
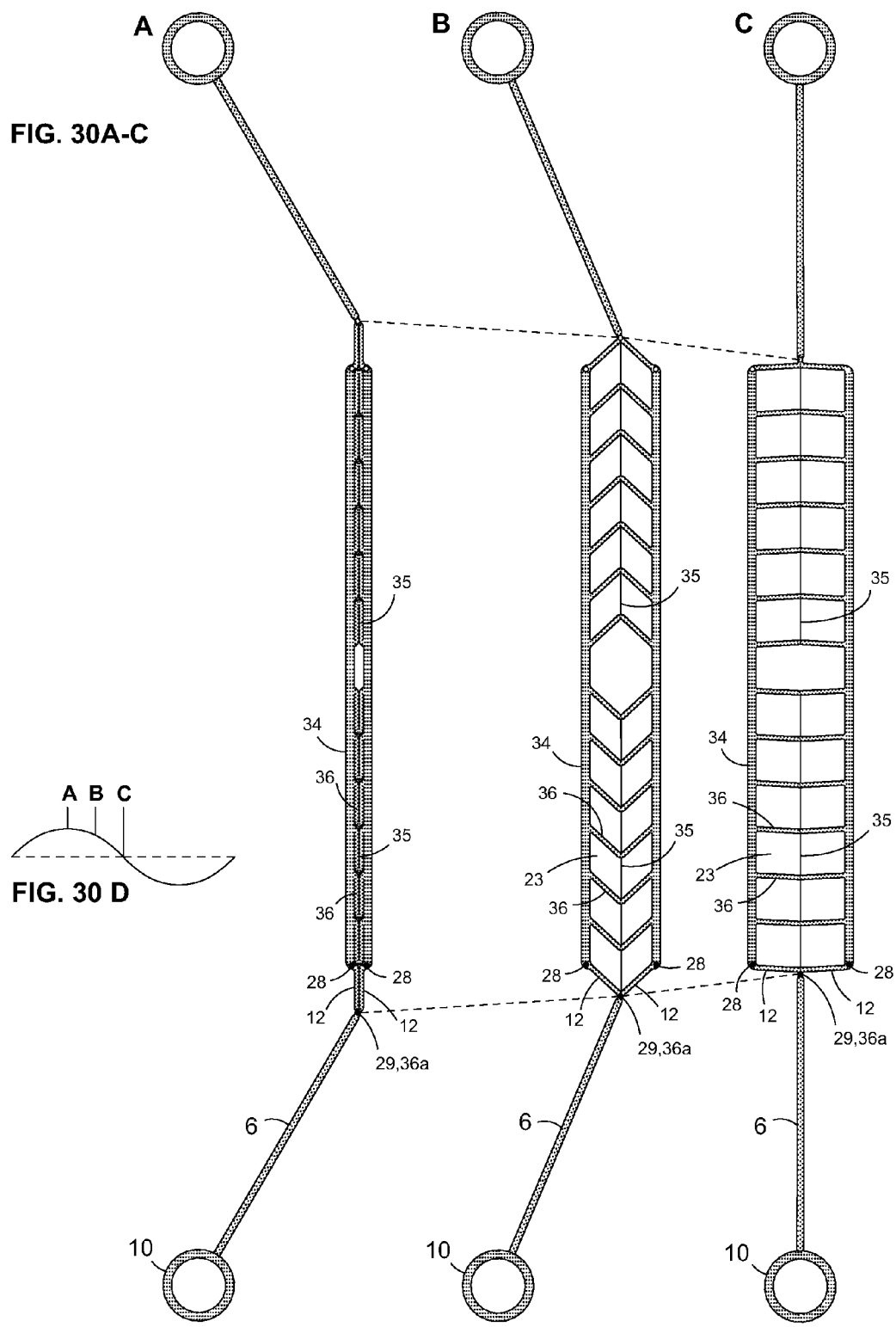
FIG. 30 D illustrates the locations within the wave undulation cycle at which the section cuts of FIGS. 30 A-C are taken.

FIGS. 30A-C illustrates an implementation which combines characteristics of auxetic structures as illustrated in FIGS. 25A-C and FIG. 28 with the configuration illustrated in FIG. 19A-E in which the ribbons 2 are substantially non-elastic in cross-sectional dimension and remain constant in cross-sectional dimension under operation. In this implementation, the interstitial space 2a between the double-ribbons 2 is at its minimum where the bulge deformation reaches its maximum amplitude under operation, and the interstitial space 2a between the double-ribbons 2 is at its maximum where the bulge deformation is at zero amplitude at the neutral axis of the bulge undulations under operation, as shown in FIG. 15. The double ribbons 2 are of a flexible material but are minimally elastic in their cross-sectional dimension, which is to say that the material they are comprised of cannot be substantially stretched in plane, so that the ribbons 2 remain essentially constant in width as they flex and undulate perpendicular to their planes under operation. The crenated strips 6 are also minimally elastic, or non-stretchable, in their cross-sectional dimension.

For this implementation illustrated in FIGS. 30A-C the changes is summed cross-sectional dimension of the frond 9 under operation may be accommodated entirely by the intermediate flexible connections 12. These intermediate flexible connections may be secured to the crenated strips 6 and ribbons 2 via rotational or flexible hinged joints 28, 29. (Some implementations may incorporate flexible joints instead of or in addition to articulated joints throughout.) As the double ribbons 2 move further apart under operation, the ends of the intermediate flexible connections 12 which are attached 28 to the ribbons 2, move apart also, rotating about the axis of the point 28 where they attach to the ribbons 2. Simultaneously the ends of the intermediate flexible connection 12 that attach to the crenated strip 6 rotate about the axis of their point of attachment 29 to the crenated strip 6.

FIG. 30D indicates the locations within the wave undulation cycle at which the section cuts of FIGS. 30A-C are taken.

In addition to being connected to each other via the intermediate flexible connections 12, the double ribbons 2 may also be connected to each other via a second interstitial structure 14a taking the form of an extrusion that is connected longitudinally along the length of the double frond 9a, and which takes the form in cross-section of an articulated structure that mimics the profile of the intermediate flexible connections 12.

FIGS. 31A-D illustrate aspects of an implementation whereby the second interstitial structure will decrease in one direction when forces are exerted upon it in another direction: When a row of parallelograms 30 are connected to one another and held in tension along one edge 31 and a tensile force 32 is applied along the opposite edge in the opposite direction, they will collapse together and the space 33 defined by the enclosure of each parallelogram will decrease in volume.

FIGS. 30A-C as described above, showing a series of cross-sections through an implementation of a double-layered frond 9a, utilize a double row of parallelograms, as viewed in cross-section. These parallelograms are extruded along the length of the frond as extruded torqued parallelepipeds. One side of each parallelogram is comprised of a portion 34 of the ribbon 2, and each opposite side is comprised of a portion of one of two interstitial ribbons 35 which run through the central axis of the double-layered frond 9a. The remaining two sides of each parallelogram are comprised of tertiary components 36 which attach to the inside face of one double-layered frond ribbon 2 and to one of the interstitial ribbons 35. These interstitial ribbons 35 are connected along one edge 36a to a crenated strip 6. The crenated strips are held in maximum tension during the maximum bulge deformation under operation, and will therefore be exerting a lateral force 32 pulling the parallelograms into their collapsed position as demonstrated in FIG. 31D. The effect of the tension in the crenated strips 6 therefore is to pull the two ribbons 2 together at maximum bulge amplitude. When tension in the crenated strips 6 is at its minimum the parallelograms of the interstitial structure 14 may be in their resting state, in which the two ribbons 2 of the double-layered frond 9a are furthest apart.

FIG. 32 shows a double-layered frond pump implementation secured in a flowing stream of water 11 via a second restraining component 37, in the form of a post or rigid tube fixed to the bed of a river, tidal basin, or other immovable object 38. The second restraining component 37 may be hinged about its longitudinal axis allowing it to swivel in the current so that the double-layered frond 9a remains approximately aligned with the direction of the moving current. The second restraining component 37 is fixed to the first restraining components 10. Under operation the upstream end of the double-layered frond 9a is open to the ambient water 16 from the flowing stream of water when the upstream end of the double-layered frond 9a is deformed so as to create a pocket 13 or expanded channels 23 in the interstitial space 2a as described in the various implementations above. (FIGS. 14-15). As the pocket 13 moves down the length of the double-layered frond 9a, the water in the pocket is transported along the length of the double-layered frond 9a and exits the downstream-end of the double-layered frond 9a, where it enters a first reservoir 40 made of a flexible material, and then enters a first flexible tube 41, which diverts the pumped water 17 to a desired destination.

Figure 33:
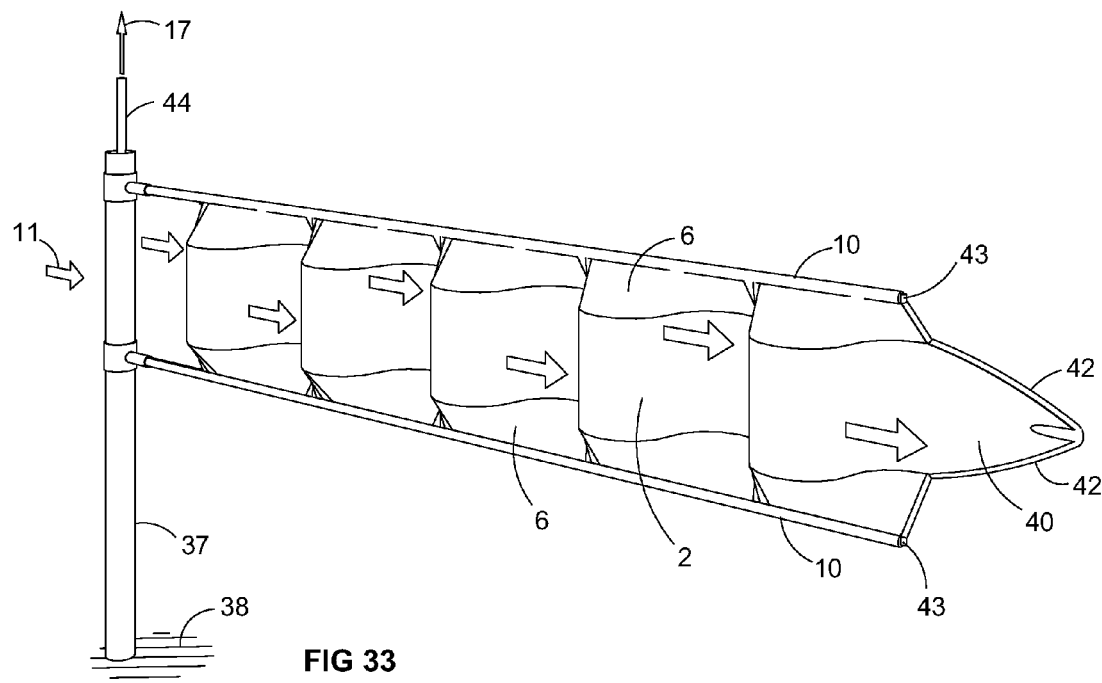
FIG. 33 illustrates a frond pump implementation, in which water is collected in a flexible reservoir.

FIG. 33 illustrates yet another implementation, in which water collected in the flexible first reservoir 40 at the downstream end of the double-layered frond 9a is transported along at least one first flexible conduit 42 to another second flexible conduit 43 that runs along the interior of one or both first restraining components 10, where said first restraining components 10 are hollow. The water traveling along the second flexible conduit 43 connects to a second flexible tube 44 which diverts the water 17 to a desired destination.

Figure 34:
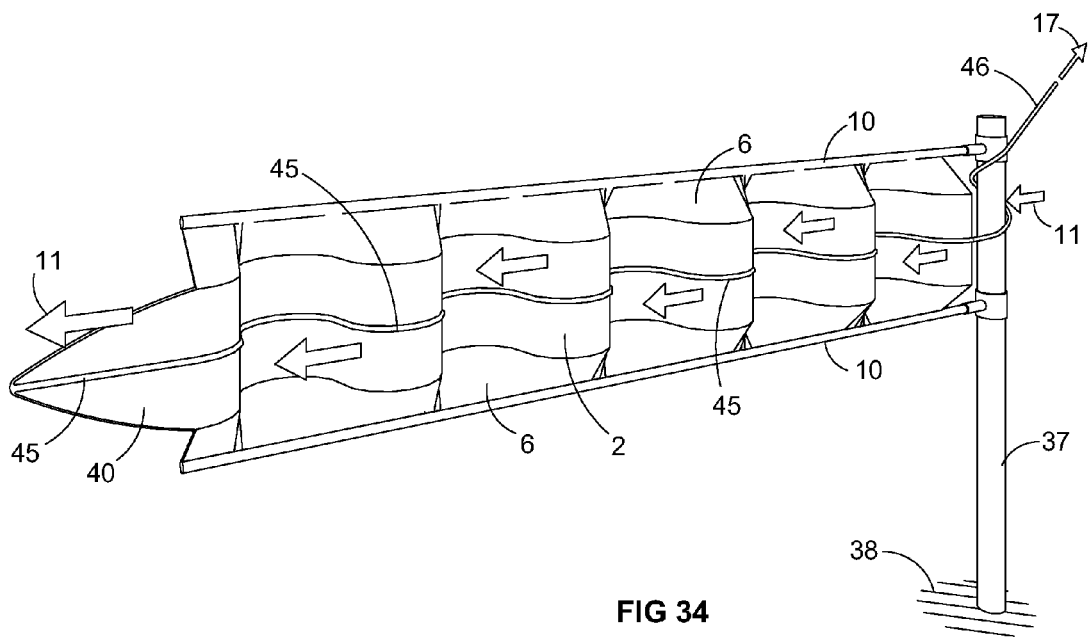
FIG. 34 illustrates a frond pump implementation in which water collected is pumped along a flexible tube.

FIG. 34 illustrates yet another implementation in which water collected in the flexible first reservoir 40 is pumped along at least one fourth flexible tube 45 which is affixed to the surface of at least one of the flexible ribbons 2 and which passed along the surface of the ribbon 2 in the opposite direction to the flow of ambient water 11, until it reaches the second restraining component 37, which the fourth flexible tube 45 attaches to or penetrates into, after which it joins at least one fifth flexible tube 46, through which exiting water 17 is transported to a desired destination.

FIG. 35 illustrates two methods for assembling and implementing the double-layered frond mechanisms in some implementations. In one implementation, two ribbons of flexible sheet-like material 3501 have forces applied to create undulating deformations 3502. The two ribbons are connected to four crenated strips 3504. The mechanism is anchored in a moving fluid 3507 and energy is extracted or work performed by the mechanisms 3508. In another implementation, two ribbons of a flexible sheet-like material 3501 have forces applied to create undulating deformations 3502. The two ribbons are connected to two intermediate flexible connections 3505. The intermediate flexible connections are connected to two crenated strips 3506. The mechanism is anchored in a moving fluid 3507 and energy is extracted or work performed by the mechanisms 3508.

In another implementation, electrical energy extraction from the deformed dynamic undulations in the ribbons, and other elements of the above mechanisms which flex in a periodic manner under operation, is with the utilization of an electroactive material which exhibits an electrical response to deformation. In such implementations of the mechanisms described, two or more electrodes may be utilized to extract electricity from the mechanisms.

Single-Layered-Frond Mechanisms.

By way of example only, a second embodiment of mechanisms may utilize single-layered fronds 9. Each frond 9 is comprised of a strained flexible ribbon 2 and strained crenated strips 6. However, while in the double-layered frond implementations described above each ribbon is connected to at least two crenated strips 6, one along each longitudinal edge of the ribbon 2, in the single-layered frond implementations each ribbon 2 may be fixed to only one crenated strip 6 along one longitudinal edge of each ribbon 2.

The crenated strip 6 attached to this one edge of the ribbon 2 is fixed to the first restraining component, or deformation-retention component 10. The opposite edge of the ribbon 2 is fixed to a connecting strip 47 comprised of a sheet-like flexible material. In the process of fixing this flexible sheet to the ribbon 2 the flexible sheet is deformed subject to the first applied force 3 that is held as potential energy in the ribbon 2 and thereby takes on an undulating hyperbolic geometry similar to that of the crenated strip 6. The ribbon 2, crenated strip 6 and connecting strip 47 together comprise an asymmetric frond 48, FIG. 36A.

At least three asymmetric fronds 48 may attached to one another along the respective longitudinal edges of each other's connecting strips 47, so that the connecting strips 47 of the three asymmetric fronds 48 take the form of a triangle in cross section where three asymmetric fronds 48 are utilized. The three asymmetric fronds 48 plus three first restraining components 10 together comprise an asymmetric frond unit 49, FIGS. 36B-C. The three asymmetric fronds 48 share a common axis which runs substantially parallel to the direction of flowing water 11. When the asymmetric frond unit 49 is secured in place in that flowing water 11 so as not to be carried away in the current, the positions of the undulations within the ribbons 2 will travel down along the lengths of the ribbons 2, as described above (e.g. FIG. 6.)

The asymmetric frond unit 49 is configured so that each of its asymmetric fronds 48 has the same number of wave undulations of equal amplitude. In addition, under operation the relative wave positions of one asymmetric frond 48 are in-phase with the wave positions of the other two asymmetric fronds 48 in relation to the central axis of the frond unit 49.

The asymmetric fronds 48 of the asymmetric frond unit 49 may be held together additionally by at least one peripheral connecting structure 50 which is affixed to all three asymmetric frond units 49 via the three first restraining components 10.

In one implementation the crenated strip 6 and ribbon 2 of the asymmetric frond 48 may be composed of a flexible sheet-like material which allows deformation perpendicular to the plane of the sheet-like material. However, this material may also be substantially non-elastic in the direction parallel to the plane of this sheet-like material, just as a thin stainless steel ruler will readily flex perpendicular to its plane, but resist substantial stretching when either end is pulled in opposite directions. By contrast, the connecting strips 47 in this implementation are comprised of a material that is highly elastic in the direction parallel to the plane of the material.

FIGS. 37A-E schematically show a sequence of end-on views of an asymmetric frond unit during one half of a cycle of operation. The view is taken from a position downstream of the asymmetric frond unit 49 looking upstream at the end of the asymmetric frond unit 49. As the wave undulations move either to one side or the other of their neutral wave amplitudes, the triangle formed by the three joined connecting strips 47 rotates partially clockwise or counter-clockwise about the longitudinal central axis of the asymmetric frond unit 49. Because the sheet-like material comprising the crenated strips 6 and ribbons 2 is substantially non-elastic in the direction parallel to the plane of the material, and because the sheet-like material comprising the connecting strips 47 is highly elastic in the direction parallel to the plane of the material, under operation the diameter of this triangle expands and contracts in a periodic manner. This occurs because the summed length of crenated strip 6 plus ribbon 2 plus connecting strip 47 of each asymmetric frond 48 varies under operation, but only the highly elastic connecting strip 47 is able to change substantially in cross-sectional dimension. FIGS. 38A-E illustrate the sequence illustrated in FIGS. 37A-E but from a perspective view showing the entire asymmetric frond unit 49.

FIG. 39 illustrates the positions that the downstream-ends of the asymmetric fronds 48 take within the wave bulge undulation cycle as shown in FIGS. 37A-E and FIGS. 38A-E.

Figure 40:
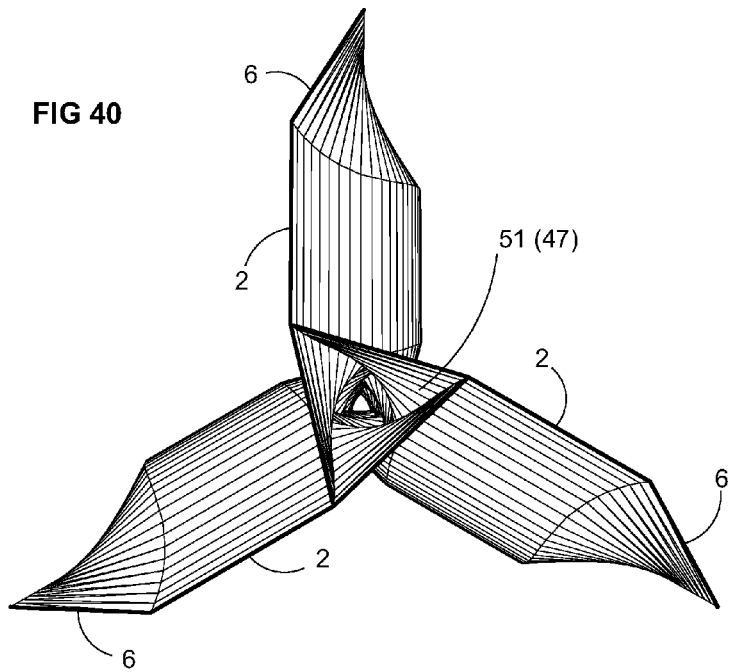
FIGS. 40-41 illustrate the first triangular core in some single-layered frond implementations.
Figure 41:
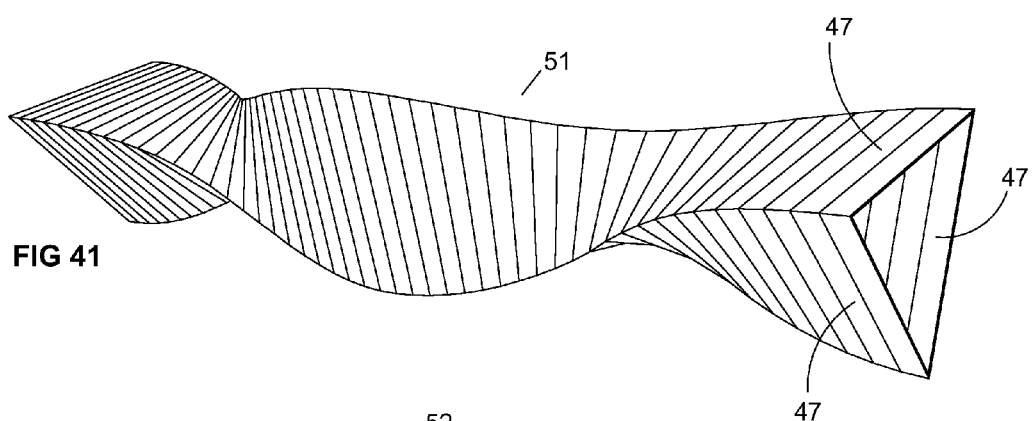

FIGS. 37A-E can also be regarded as being illustrative of a cross-sectional cut through a single point in the asymmetric frond unit 49 as viewed during one half cycle of operation, and correlating with moments in the wave cycle as illustrated in FIG. 39: The cross-sectional lengths of the crenated strips 6 and ribbons 2 remain constant under operation, while the cross-section lengths of the connecting strips 47 vary under operation. The three connecting strips 47, each attached along one longitudinal edge to both of the other two connecting strips 47, together constitute a first triangular core 51 which takes on the form of an extruded hollow triangle which twists clockwise and counter-clockwise and which becomes narrower and wider in circumference FIGS. 40-41. The effect of wave undulations passing down the length of the asymmetric fronds 48 under operation is translated into a twisting peristaltic motion down the length of the first triangular core 51, which is where the pumping action of the single-layered frond implementations take place.

Figure 42:
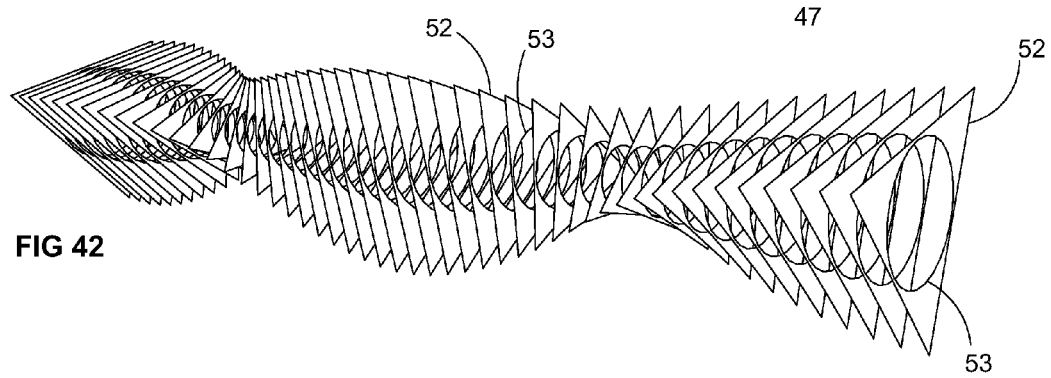
FIG. 42 illustrates a series of elastic triangular membranes along a triangular core in one single-layered frond implementation.

FIG. 42 illustrates a series of highly elastic triangular membranes 52 which may be secured to the inside faces of the connecting strips 47 comprising the first triangular core 51. Within each of the elastic triangular membranes 52 is a circular opening 53. Under operation, as the first triangular core 51 twists, expands, and contract with the passing of undulations along the asymmetric fronds 48, the elastic triangular membranes 52 expand and contract, and the circular openings 53 within these elastic triangular membranes 52 increase and decrease in radius.

Figure 43:
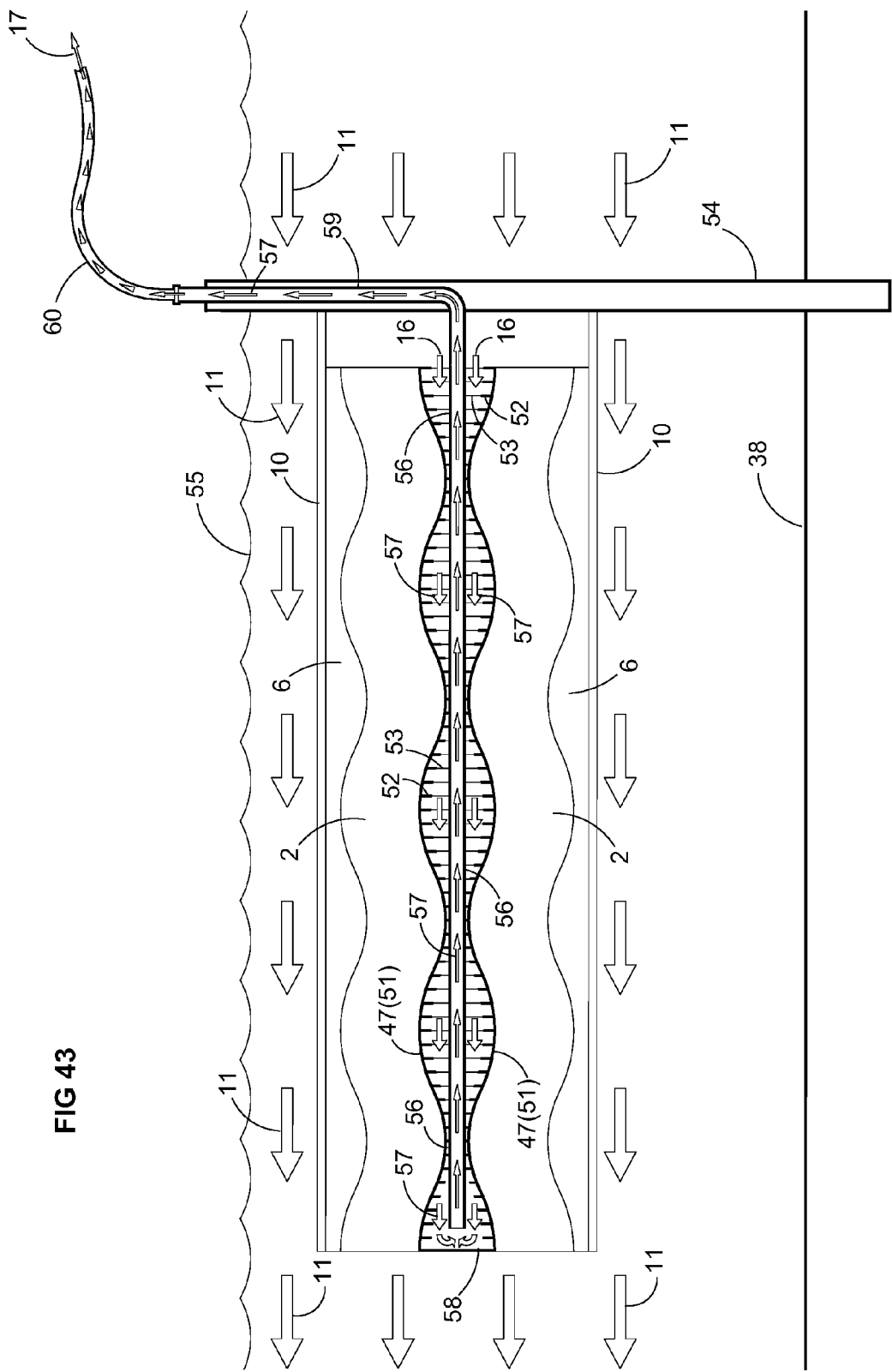
FIG. 43 illustrates a schematic section through one pump implementation of one single-layered frond mechanism.

FIG. 43 illustrates a schematic section through the first pump implementation of the single-layered frond mechanisms. An asymmetric frond unit 49 is secured via its first restraining components 10 to a third restraining component 54 which takes the form of a hollow rigid post or rigid tube which itself is fixed to the bed of a river, tidal basin, or other immovable object 38. The third restraining component 54 may be hinged about its longitudinal axis allowing the asymmetric frond unit 49 to swivel in the moving current so as to maintain a longitudinal axis parallel to the moving current. The third restraining component 54 is shown as protruding above the surface of the flowing water 55 for graphic clarity. The asymmetric frond unit 49 is secured to the third restraining component 54 via the first restraining components 10. A fifth hollow tube 56 passes along the length of the interior of the first triangular core 51 and penetrates and is secured to the third restraining component 54. Where the diameter of the circular openings 53 in the elastic triangular membranes 52 are at their minimum state, the inside edges of the circular openings 53 make contact with and apply pressure to the surface of the fifth hollow tube 56. Ambient water 16 from the flowing current of water 11 is able to enter at the upstream-end of the asymmetric frond unit through the space between the first triangular core 51 and the fifth hollow tube 56, when the diameter of the circular openings 53 in the elastic triangular membranes 52 are greater than their minimum dimension.

As the undulations in the triangular core 51 are moved along the asymmetric frond unit 49 under the forces of the flowing water 11, a series of pockets containing collected ambient water 57 will also pass along the length of the interior of the triangular core. The circular openings 53, after allowing the ambient water 16 to enter at the upstream end of the first triangular core 51 during their phase of greater diameter, will contract and eventually make contact with the fifth hollow tube 56, creating a series of valves that direct water through the first triangular core 51 in the direction of the flowing current of water 11.

FIGS. 44A-C further illustrate the behavior of the elastic triangular membranes 52 along the inside of a length of first triangular core 51 at three moments of time, correlating to three positions within one quarter of a wave bulge cycle of operation as defined in FIG. 45. A cross-section view looking down the longitudinal axis of the first triangular core 51 is illustrated in FIGS. 46A-D, showing how the circular openings 53 in the triangular membranes 52 are offset-from, or dilated away from, and incrementally contract to make contact with, the fifth hollow tube 56 under operation. The corresponding positions within one quarter of a wave undulation cycle are illustrated in FIG. 47.

When collected water 57 reaches the downstream end of the first triangular core 51, it is prevented from traveling further in the same direction by a flexible cap 58 that closes-off the end of the first triangular core 51. (FIG. 43). There is a space between the flexible cap 58 and the downstream-end of the fifth hollow tube 56, and the fifth hollow tube 56 is open at its downstream-end. Therefore, captured water 57 that has reached the downstream end of the first triangular core 51 will enter the downstream-end of the fifth hollow tube 56 and will travel back along the inside of the fifth hollow tube 56 in a direction opposite to the ambient flowing water 11. Because the fifth hollow tube 56 attaches to and enters into the third restraining component 54, collected water 57 will pass into the third restraining component 54 and into a sixth hollow tube 59 or seventh hollow tube 60 inside the third restraining component 54 after which the water will exit 17 to be transported to a desired destination.

The relatively large volume of flowing water 11 passing over the asymmetric fronds 48 is able to harness kinetic energy which the asymmetric frond unit 49 concentrates onto a relatively small volume of collected water 57 within the triangular core 51, creating significant water pressure within the first triangular core 51, pumping water at a relatively low volume but at a relatively high pressure.

Figure 48:
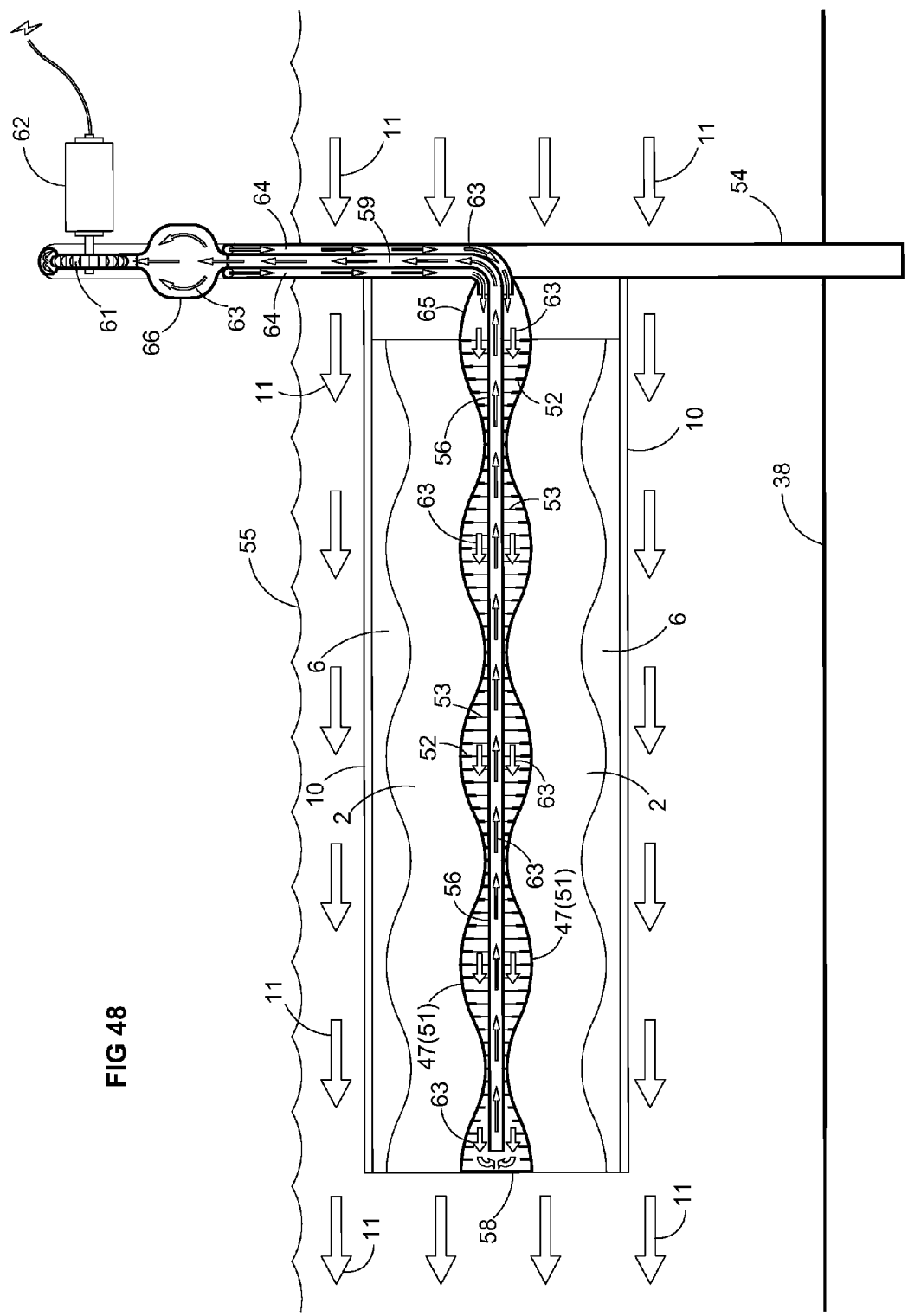
FIG. 48 schematically illustrates a single-layered frond implementation in operation in which the pumping action of an asymmetric frond unit powers a turbine in one implementation.

FIG. 48 schematically illustrates another implementation in which the pumping action of the asymmetric frond unit 49 is utilized to generate electricity by powering a conventional turbine 61. This first generator implementation is configured similar to the pump implementation as illustrated in FIG. 43. This first generator implementation however, is not open at the upstream-end to ambient water, but incorporates a closed-loop system of circulating water 63, with a turbine introduced into the loop to harness the kinetic energy of the water 63 moving through the closed-loop system.

In this first generator implementation, water 63 of the closed-loop system travels along the interior space of the first triangular core 51, and then back along the fifth hollow tube 56, and then into a sixth hollow tube 59, from where it is forced through a turbine 61 which powers an electromagnetic generator 62. Upon exiting the turbine 61, the water 63 passes into at least one eighth hollow tube 64 which feeds into a second flexible reservoir 65 which adjoins the upstream-end of the triangular core 51, whereupon the water 63 is passed once again along the first triangular core 51 and the process repeats. A pressure-equalization device 66 may be inserted into the closed loop system immediately preceding the turbine 61 in order to convert the pulsing nature of the pumping action into a more constant flow. Another implementation utilizes a holding tank up into which water is pumped after which it falls via gravity in an even flow, powering a generator as it flows. In a closed-loop implementation, fluids other than water may be enclosed and circulated.

Figure 49:
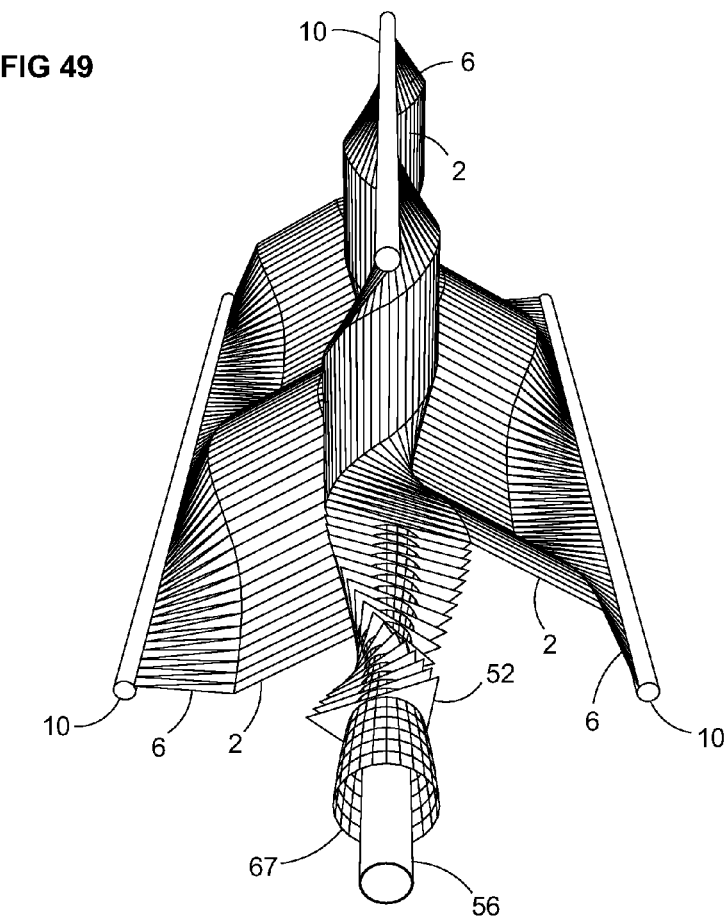
FIGS. 49-50 illustrate exploded three dimensional views of another single-layered frond pump implementation utilizing an elastic core tube.
Figure 50:
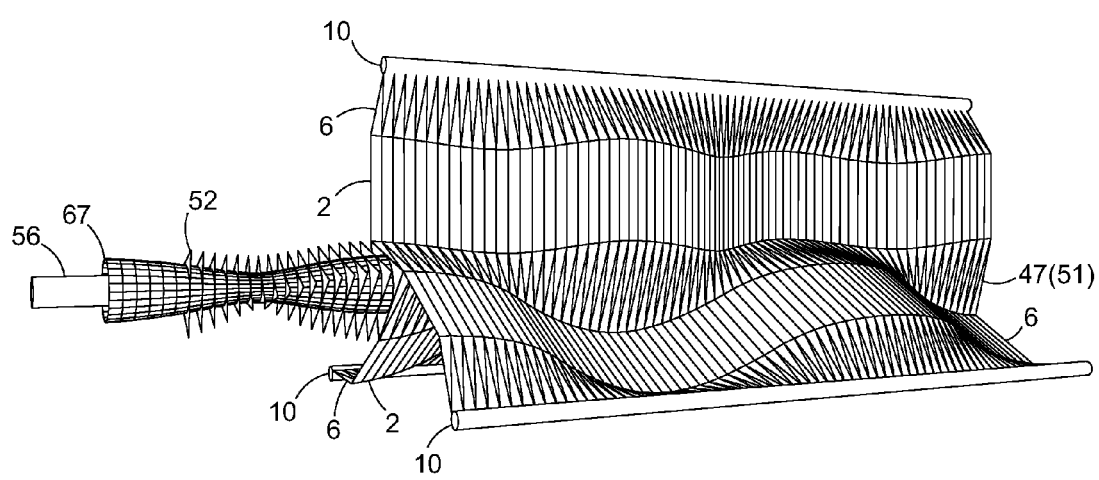
Figure 51:
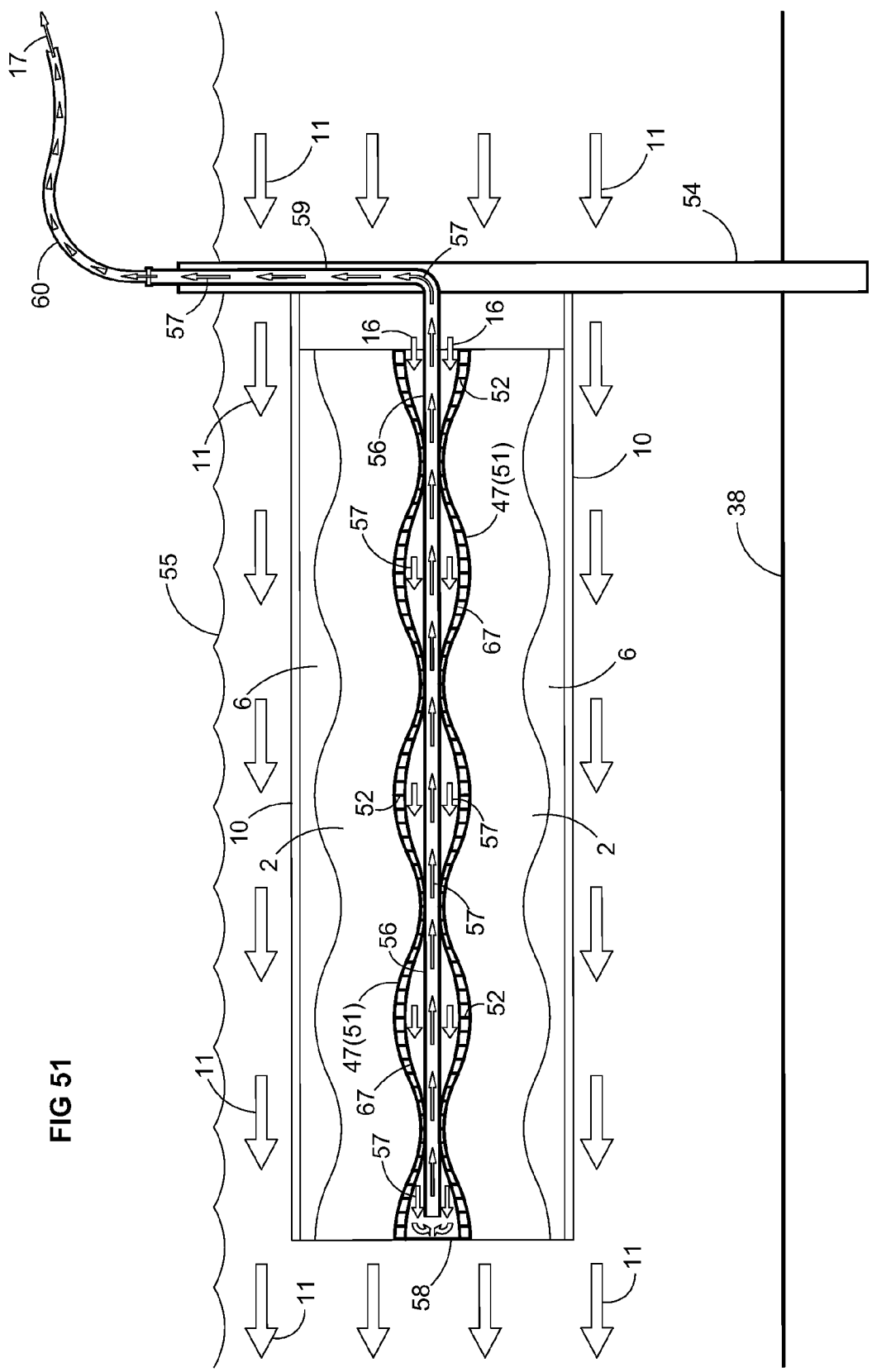
FIG. 51 is a schematic illustration of a pump implementation in operation utilizing an elastic core tube.

The second single-layered-frond pump implementation is similar in design and operation to the first single-layered-frond pump implementation, but with the addition of an elastic core tube 67 which runs continuously through the circular openings 53 of the elastic triangular membranes 52 and which is bonded circumferentially about each circular opening 53 of each elastic triangular membrane 52, as shown in the exploded perspective views of FIGS. 49-50. As the triangular membranes 52 expand and contract in diameter under operation, the diameter of the elastic core tube 67, being bonded to the circular openings 53, also expands and contracts. When a triangular membrane 52 is at its minimum diameter, the elastic core tube 67 is "pinched" against the fifth hollow tube 56. When a triangular membrane 52 is at its maximum diameter there is an interstitial space between the fifth hollow tube 56 and the elastic core tube 67. Under operation, pockets of collected water 57 between the fifth hollow tube 56 and elastic core tube 67 are pushed along inside the triangular core 51, as illustrated schematically in FIG. 51.

Figure 52:
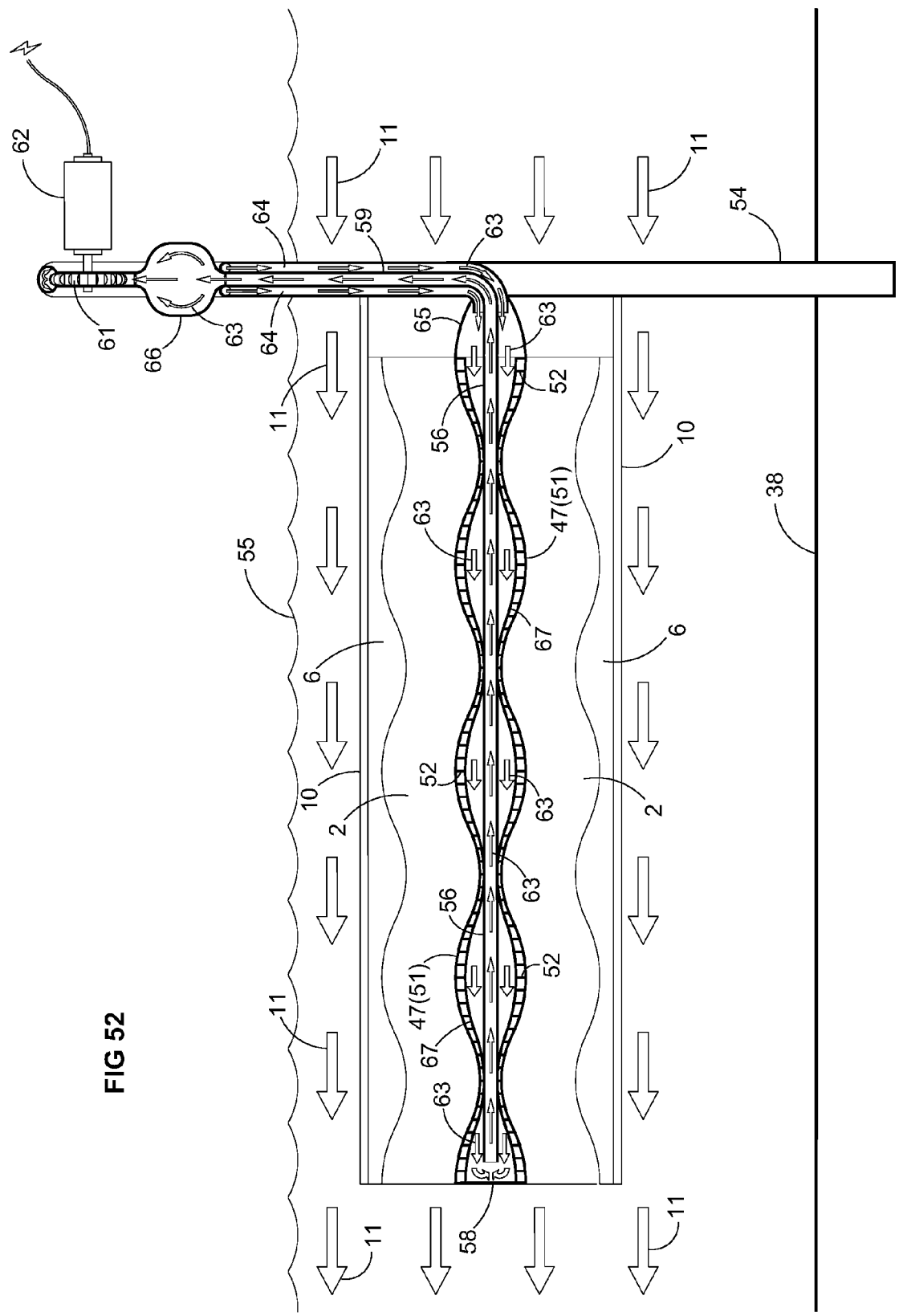
FIG. 52 is a schematic illustration of a generator implementation in operation utilizing an elastic core tube.

FIG. 52 is a schematic illustration of a second generator implementation. This implementation is identical to the first generator implementation as illustrated in FIG. 48 with the notable additional element of the elastic core tube 67 which is described above and illustrated in FIGS. 49-50.

FIGS. 53A-C illustrate a first triangular core 51 which incorporates a series of triangular plates 68 which create a triangular valve mechanism for directing the flow of water pumped through the first triangular core 51. In both pumping and generating implementations utilizing these triangular plates 68, the fifth hollow tube 56 directing pumped water back in the direction opposite to the flow of ambient water 11 is absent. FIG. 56. Pumped water reaching the downstream-end of the first triangular core 51 instead enters a third flexible reservoir 69 and at least one fifth flexible tube 70 that runs across the edge of the end of at least one ribbon 2 and then enters at least one of the first restraining components, where said restraining component is a hollow rigid tube 10*a*. Water passes along this rigid hollow tube 10*a* which connects to and penetrates the third restraining component 54, whereupon the rigid hollow tube 10*a* joins a ninth hollow tube 73 through which water passes and exits the mechanism 17 to a desired destination.

FIG. 56 schematically illustrates this third single-layered-frond pump implementation, utilizing the triangular plate 68 valve mechanism as described above and in more detail below:

This triangular plate valve mechanism is comprised of triangular plates 68, each of which takes the form of an isosceles triangle. FIGS. 54A-D and FIGS. 55A-D. The two equal edges 71 of each triangular plate 68 are reinforced with a rigid member or material which keeps the lengths of these two equal edges 71 constant under operation. The third edge 72 of the triangular plate 68 is elastic and fixed to the plane of one flexible connecting strip 47 in a line that runs perpendicular to the longitudinal axis of the plane of the flexible strip 47. As described above, the cross-sectional dimension of the flexible strip increases and decreases as the triangle defined by a cross-section through the first triangular core 51 expands and contracts under operation. The third edge 72 of the triangular plate 68 must therefore become longer or shorter under operation. Because one end of each of the two equal edges 71 is fixed to either end of the third edge 72, the angle formed by the juncture of the two equal edges 71 changes under operation, growing more acute as the third edge 72 shrinks. The angle of the triangular plates 68 relative to the flexible strips 47 to which they are attached, and the fixed lengths of the two equal edges 71 are calibrated so that when the first triangular core 51 is at its smallest diameter, the equal edges 71 of three triangular plates 68 meet each other, and therefore form a closed valve.

FIGS. 54A-D show the configuration of three triangular plates viewed facing down the longitudinal axis of the first triangular core 51, as the diameter of the triangular core 51 goes from greatest to smallest, illustrating how the two equal edges 71 of each of the triangular plates 68 come together under operation. FIGS. 55A-D show the same sequence but viewed perpendicular to the longitudinal axis of the first triangular core 51.

Figure 57:
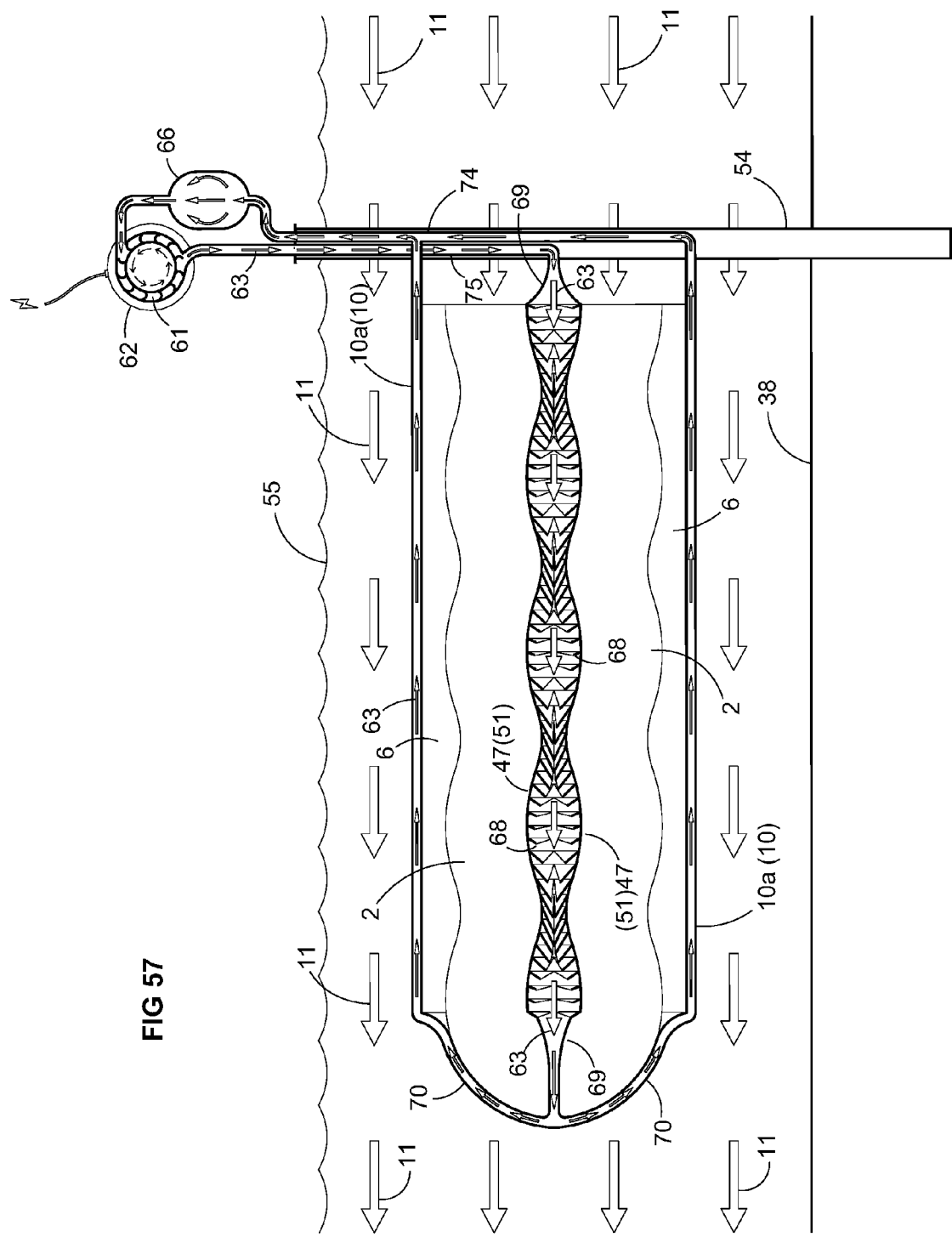
FIG. 57 schematically illustrates a single-layered frond implementation similar to the pump implementation illustrated in FIG. 56 but powering a turbine in one embodiment.

FIG. 57 schematically illustrates the third single-layered frond generator implementation which is similar in design and operation to the third single-layered-frond pump implementation illustrated in FIG. 56. In this third generator implementation however, the upstream-end of the triangular core is not open to ambient water: Instead, water circulates through the mechanism in a closed-loop system, with a turbine introduced into the loop to harness the kinetic energy of the circulating water of the closed-loop system. Enclosed water 63 pumped along the interior of the first triangular core 51 exits at the down-stream end into a third flexible reservoir 69 from where it is diverted along at least one at least one fifth flexible tube 70 that runs across the edge of the end of at least one ribbon 2 and then enters at least one of the first restraining components, where said restraining component is a hollow rigid tube 10*a*. Water passes along this rigid hollow tube 10*a* which connects to and penetrates the third restraining component 54, whereupon the rigid hollow tube 10*a* joins a tenth hollow tube 74. The pumped water 63 is then pushed through a turbine 61 powering an electromagnetic generator 62. Water exiting the turbine passes along an eleventh hollow tube 75 which empties into a fourth flexible reservoir 76 which in turn empties into the first triangular core 51 and the cycle is repeated indefinitely. A pressure-equalization device 66 may be inserted into the closed loop system immediately preceding the turbine 61 in order to convert the pulsing pumping action into a more constant flow.

FIG. 58A illustrates a fourth single-layered-frond pump implementation, which is similar in design and operation to the third single-layered-frond pump implementation illustrated in FIG. 56. However, the fourth single-layered-frond pump implementation differs with the introduction of inner connecting strips 77 which run parallel to the longitudinal axis of the first triangular core 51. The equal edges 71 of the elastic triangular plates 68 are each connected to one of the inner connecting strips 77. The inner connecting strips 77, being themselves connected to each other along their longitudinal lengths, form a tube taking the cross-sectional form of a rotationally-symmetrical inverted hexagon. FIG. 58B is a view of the first triangular core 51 looking down its longitudinal axis, illustrating how the inner connecting strips 77 form an inverted hexagonal tube affixed to the triangular plates 68.

Figure 59A:
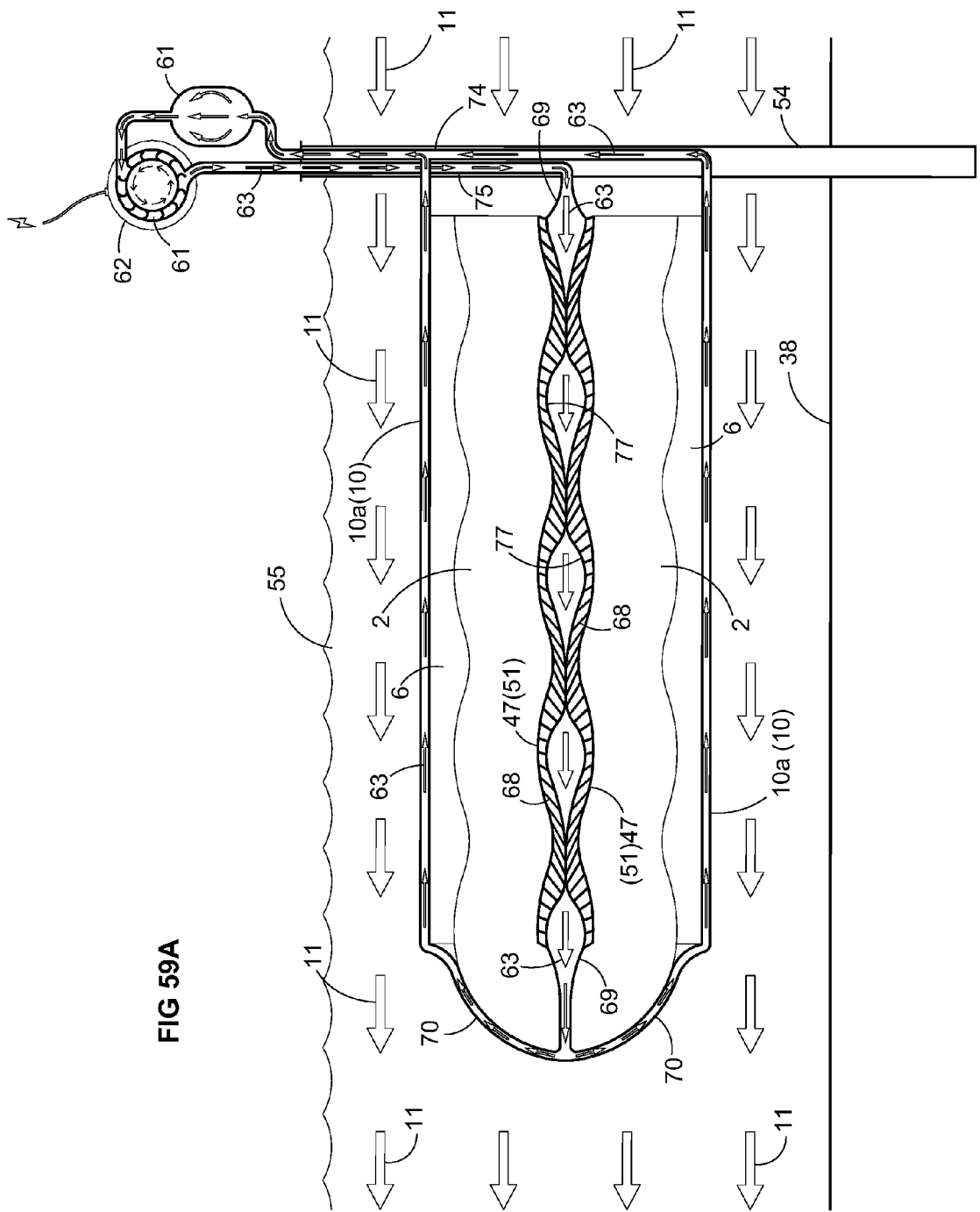
FIG. 59A illustrates another single-layered frond generator implementation with the addition of inner connecting strips and tube in one embodiment.

FIG. 59A illustrates a fourth single-layered frond generator implementation, which is similar to the third generator implementation illustrated in FIG. 57, except for the addition in this fourth generator implementation of the inner connecting strips 77 and tube as described above.

Figure 59B:
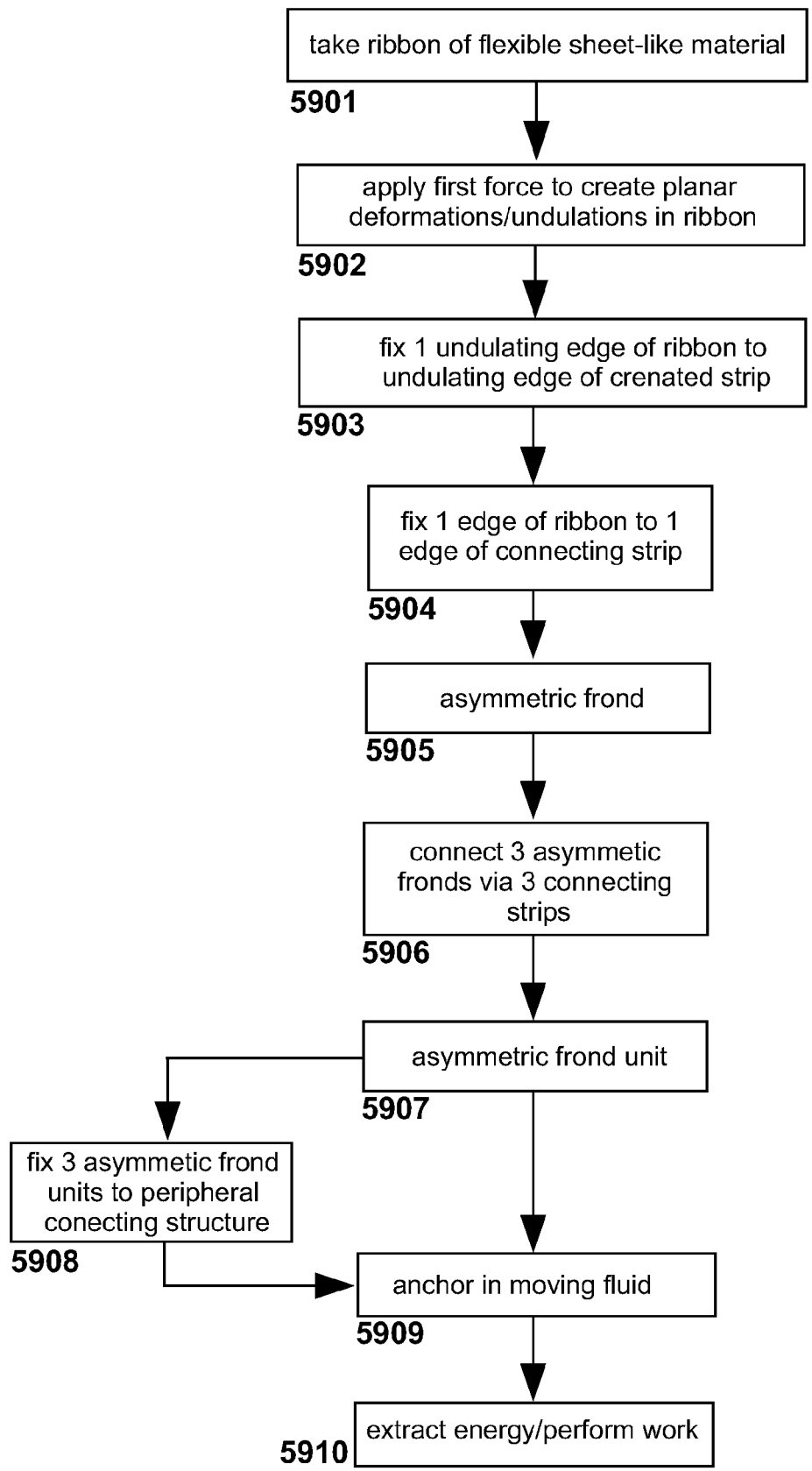
FIG. 59B illustrates a method for assembling and implementing single-layered frond mechanisms in one embodiment.

FIG. 59B illustrates a method for assembling and implementing single-layered frond mechanisms in one embodiment. A ribbon of flexible sheet-like material 5901 has forces applied to create one or more planar deformations/undulations in the ribbon 5902. One undulating edge of the ribbon is fixed to the undulating edge of a crenated strip 5903. One edge of the ribbon is fixed to one edge of the connecting strip 5904, creating an asymmetric frond 5905. Three asymmetric fronds may be adjoined via three connecting strips 5906, creating an asymmetric frond unit 5907. The asymmetric frond unit may be connected to peripheral connecting structure 5908. The asymmetric frond unit may be anchored in a moving fluid 5909, energy is extracted from, or work is performed by, the asymmetric frond unit 5910.

In another implementation, electrical energy extraction from the deformed dynamic undulations in the ribbons and other elements of the above mechanisms which flex in a periodic manner under operation, is with the utilization of an electroactive material or a material which exhibits an electrical response to material strain. In such implementations of the mechanisms described, two or more electrodes may be utilized to extract electricity from the electroactive material utilized in the mechanisms.

Spiral Valve Mechanisms

Implementations of a third category may be characterized as spiral valve mechanisms. Like the first two categories described above, the spiral valve implementations utilize flexible ribbons 2. However, they do not utilize single-layered fronds 9 or double-layered fronds 9a as discussed above. Like the first two categories, the spiral valve mechanisms are comprised primarily of flexible or elastic components to which forces are applied during the fabrication so as to deform these components, after which restraining components, or deformation-retention components are utilized to maintain these components in their deformed, strained states. The internal energy states of the materials from which the components are fabricated are therefore held in strained, non-relaxed states in which they hold the forces applied during fabrication as potential energy. The potential-energy-holding components of the first two categories are primarily the flexible ribbons 2 and crenated strips 6 and elastic connecting strips 47. The potential-energy-holding components of the spiral valve mechanisms are primarily flexible ribbons 2 and spirals or coils 78, the latter comprised of a flexible material such as hardened steel, rubber, plastic or any other suitable elastic material with very low plasticity.

Figure 60A:
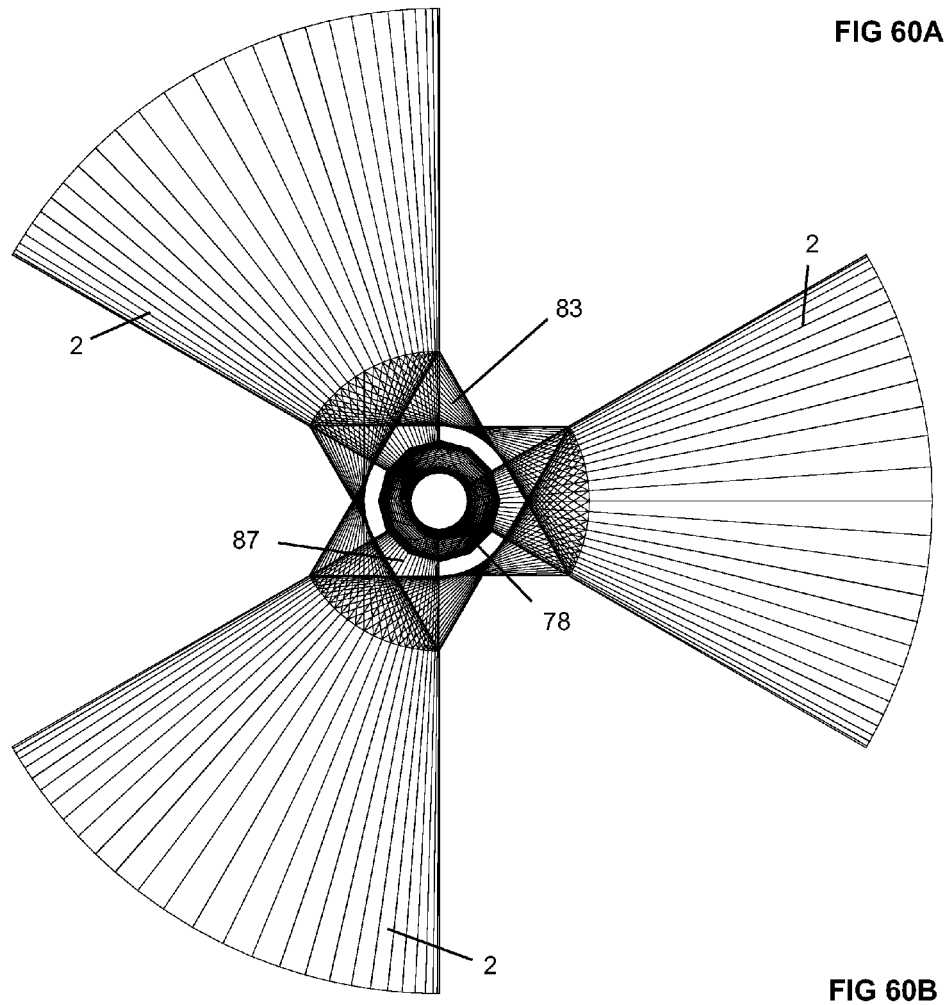
FIG. 60A is a wire-frame illustration of a spiral valve embodiments utilizing three connected flexible ribbons, as viewed down the longitudinal axis of the mechanism in one implementation.
Figure 60B:
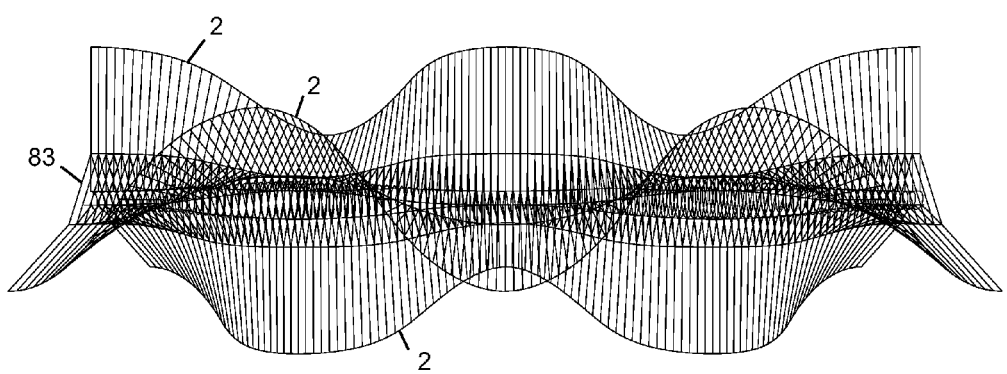
FIG. 60B is a wire-frame illustration of a spiral valve embodiments utilizing three connected flexible ribbons, as viewed in elevation in one implementation.

For the purpose of clarity, the spiral valve implementation described in detail within the disclosures of this patent utilize three connected flexible ribbons 2, FIGS. 60A-B. However, spiral valve implementations utilizing fewer or more connected ribbons are all incorporated into this invention. The utilization of three connected flexible ribbons 2 leads to the use of the world "triangle" when describing components of the implementation but in implementations utilizing, for example, four connected flexible ribbons 2, the word "square" would substitutes the word "triangle" and in an implementation utilizing six connected flexible ribbons 2, the word "hexagon" would substitute the word "triangle" and so on.

A spiral or coil winds either clockwise or counterclockwise, depending on viewpoint. An elastic coil may be stretched along its axis by a force exerted along that axis. An elastic coil may also be made to increase in diameter by securing one end of the coil and twisting it in one direction and it may be made to decrease in radius by securing the same end and twisting in the opposite direction, respectively tightening (winding) or loosening (unwinding) the coil.

In the spiral valve implementation, one or more undulating ribbons 2 as described above are secured in multiple locations along a coil 78 perpendicular to the circumference of the coil 78. Applying a third force 79 to the connected flexible ribbon 2 perpendicular to the radius of the coil 78 will cause the coil to tighten or loosen, and therefore to increase or decrease in radius, at the location of the applied third force 79, so long as the ends of the coil 78 are themselves prevented from rotating FIG. 62. In the spiral valve implementation, the sequential and coordinated tightening (winding) of the coil 78, or loosening (unwinding) of the coil directed by the movement of undulations along the connected flexible ribbons 2 produces pumping action as described and explained below.

There are a variety of different methods for the fabrication of the spiral valve in different implementations FIG. 61, whereby potential energy is locked into components of the mechanism so that said components maintain a strained, deformed state prior to operation, and maintain permutations of this strained, deformed state under operation. In a first such method a first force is applied to a flexible ribbon 6101 so as to create a series of undulations in said ribbon 6102 as described above and illustrated previously in FIG. 1. The flexible ribbon 2 is then held in its deformed state 6103 and attached along one of its longitudinal edges along the length of an elastic coil 78 while said elastic coil 78 with uniform diameter is in a relaxed resting state, 6104, 6105. Upon removal of the first force 3 the flexible ribbon 2 will "want" to return to its straight, un-strained state and in so doing will exert forces upon the elastic coil 6106, 6107. With correct calibration of the relative stiffness and elasticity of the ribbon 2 and coil 78 respectively, some of the potential energy of the stressed flexible ribbon 2 will be transferred into the elastic coil 78. As a consequence, the flexible ribbon 2 will straighten partially, 6108 and the elastic coil 78 will become tightened (wound) and loosen (unwound) along its length in a pattern that corresponds to areas of the flexible ribbon 6109 whose wave bulge amplitude falls above or below its neutral axis. The mechanism is now "charged", maintaining all of the potential energy from the first applied force but in a balanced state, whereby wound and unwound portions of the elastic coil 78 and strains within the flexible 2 ribbon are in balance, 6110. FIG. 63. Illustrates that the elastic coil 78 may be wound or un-wound by applied forces 79.

In the second of at least two methods for the fabrication of the spiral valve implementations, (FIG. 61) a series of third forces 79 are applied perpendicular to the radius of the elastic coil 6111 in alternating rotational directions, causing portions of the coil to rotate partially clockwise or counter-clockwise, and therefore causing portions of the coil to tighten (wind) or loosen (unwind) away from their relaxed state 6112. With the coil held in this state 6113 at least one flexible ribbon 6114 is attached along one of its longitudinal edges to the coil the coil 6115. Upon removal of the third force 6116 the coil will "want" to return to its pre-strained state and will therefore transfer some of its potential energy into the attached flexible ribbon 6117, deforming the ribbon which will take on an undulating appearance 6119 in a pattern corresponding to regions of the elastic coil that have been wound or unwound 6118 by the application of the third force. With correct calibration of the relative stiffness and elasticity of the ribbon 2 and coil 78 respectively, the elastic coil's 78 "desire" to return to a uniform diameter is balanced by the flexible ribbon's 2 "desire" to be in its straight and unstrained state. The mechanism is now "charged" with the third force 79 maintained as internal potential energy within the mechanism 6120. This internal energy is expressed as a series of wave undulations within the flexible ribbon 2 corresponding to a series of bulges along the elastic coil 78, where said bulges are demonstrations of regions of the coil 78 that are wound or unwound, which is to say of regions of greater or lesser elastic coil 78 diameter.

When such a mechanism is secured within a stream of moving water 11 or other fluid so that the longitudinal axis of the mechanism is parallel to the direction of the stream of water 11, forces acting upon the ribbons 2 (FIG. 6) will cause the positions of maximum and minimum wave bulge amplitude to move along the ribbon 2 in the direction of the moving fluid 11. Because the wave undulations in the ribbon 2 correspond with bulges in the diameter of the elastic coil 78, the bulges in the elastic coil 78 will also move along the mechanism in the direction of the moving fluid 11.

A second elastic core tube 80, FIG. 68, is affixed to the inside or outside of the elastic coil 78 continuously along the length of the coil 78 so that the diameter of this second elastic core tube 80 increases and decreases with the varying diameter of the elastic coil 78. An eleventh hollow tube 81, FIG. 66, runs continuously within the second elastic core tube 80 so that pockets are formed between the second elastic core tube 80 and the eleventh hollow tube 81 when the diameter of the second elastic core tube 80 is greater than its minimum. Where the elastic coil 78 and second elastic core tube 80 are at their minimum diameter, they form a seal against the surface of the eleventh hollow tube 81.

Multiple flexible ribbons 2 may be incorporated, each attached directly or indirectly along one longitudinal edge to the elastic coil 78. A multiple of three are chosen and described herein to demonstrate and illustrate a method by which multiply-attached ribbon implementations are constructed and how they operate.

FIG. 64 illustrates a schematic cross-section through a spiral valve mechanism utilizing three ribbons 2 connected as above and each 120 rotational degrees apart. The ribbons 2 are connected to each other continuously via second flexible connecting strips 82, which together constitute the second triangular core 83. The second triangular core 83 is similar to the first triangular core 51 of the single-layered frond implementations described above. However, in spiral valve implementations, the connections between the ribbons 2 and corners of the second triangular core 83 are rigid moment connections 83a. This is different from the attachment of ribbons 2 to the first triangular core 51 where the connection is highly flexible or articulated. Therefore. the intersecting angles 84 of the ribbons 2 and second triangular cores 83 remain constant under operation in the spiral valve implementations FIG. 65A-E, whereas the intersecting angle of the ribbons 2 and first triangular cores 51 vary under operation in the single-layered frond implementations as illustrated in FIG. 37A-E.

Another spiral valve mechanism implementation utilizes stiffening members 85 affixed to or incorporated into the material comprising the ribbons 2 and second flexible connecting strips 82, FIGS. 69, 70, 71, 74. etc. These stiffening members limit the materials ability to bend in one direction, namely in the direction perpendicular to a cross-section through the material, but do not limit the material's ability to bend perpendicular to a longitudinal-section through the material.

The stiffening members 85 of the ribbons 2 and second flexible connecting strips 82 are connected to each other, taking on an arrangement identical to a cross-section cut through the spiral vale mechanism as shown in FIG. 64. Internal radial fins or arms 86 connect the second triangular core 83 to the elastic coil 78 and second elastic core tube 80. Therefore the forces in the moving water 11 acting on the ribbons 2 and on the second triangular core 83 are transferred onto the elastic coil 78 via these internal radial fins or arms 86. The terms internal radial fins OR arms 86 are used because these components may be continuous strips multiply connecting the second triangular core 83 and elastic coil 78, or they may be a series of arms multiply connected the second triangular core 83 and elastic coil 78.

FIGS. 66, 67, 68, 69,70 illustrate together aspects of the eleventh hollow tube 81, elastic coil 78, second elastic core tube 80, internal radial fins or arms 86, and second triangular core 83 respectively. FIG. 71 illustrates these five components assembled together along with the ribbons 2. This assembly corresponds to a section of spiral valve mechanism during one cycle of a wave bulge operation.

There are various arrangements and configurations for attaching the internal radial fins or arms 86 to the elastic coil 78.

One implementation is illustrated in FIGS. 72A-C whereby the internal radial fins or arms 86 are attached to the elastic coil 78 at points tangent to the circumference of the elastic coil 78. As the second triangular core 83 rotates it exerts a force through the internal radial fins or arms 86 which tightens, or winds-up the elastic coil 78, reducing its diameter and closing the space between the second elastic core tube 80 and the eleventh hollow tube 81, expelling any collected water within that space. In this arrangement, the points of attachment between the second triangular core 83 and the internal radial fins or arms 86 are flexible or articulated.

Another implementation is illustrated in FIGS. 73A-C whereby rigid radial arms 87 are secured via rigid connections to the stiffening members 85 of the second triangular core 83. These rigid radial arms 87 are inserted into rigid radial tubes 88 which are in turn secured via rigid connections to the elastic coil 78 at points perpendicular to the circumference of the elastic coil 78. As the second triangular core 83 rotates it exerts a force through the rigid radial arms 87 to the rigid radial tubes 88 which tighten, or wind-up the elastic coil 78, reducing its diameter and closing the space between the second elastic core tube 80 and the eleventh hollow tube 81, expelling any collected water within that space. The rigid radial arms 87 slide within the rigid radial tubes 88 under operation. To reduce total friction in the mechanism caused by the rigid radial arms 87 sliding within the rigid radial tubes 88, FIGS. 73A-C show only one rigid radial arm 87 per section of second triangular core 83 reinforced with stiffening members 85, but any number can be incorporated. In some implementations, there may also be less than one rigid radial 87 arm per wind of the coil 78 so that the rigid radial arm 87 attaches to the coil 78 every two or more winds of the coil 78.

FIG. 74 is a wire-frame illustration of a portion of second triangular core 83 utilizing radial fins or arms 86 to connect the second triangular core 83 to the elastic coil 78. For graphic clarity, only one radial fin or arm 86 is shown connecting to the elastic coil 78 from one corner of the second triangular core 83, but more may be connected. In some implementations, there may also be less than one radial 86 arm per wind of the coil 78 so that the radial arm 86 attaches to the coil 78 every two or more winds of the coil 78.

FIG. 75 is a wire-frame illustration looking down the center of the longitudinal axis of a length of second triangular core 83 utilizing radial fins or arms 86 connecting the second triangular core 83 to the elastic coil 78.

Figure 76:
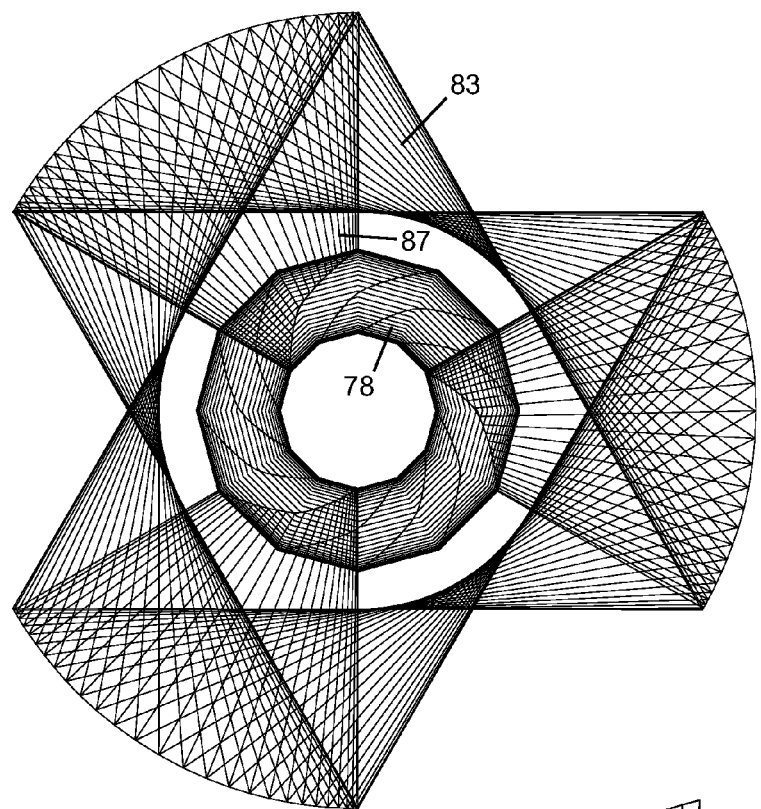
FIG. 76 is a wire-frame illustration of a component of a spiral valve implementation looking down the center of the longitudinal axis of a length of second triangular core utilizing rigid radial arms.

FIG. 76 is a wire-frame illustration looking down the center of the longitudinal axis of a length of second triangular core utilizing rigid radial arms 87.

Figure 77:
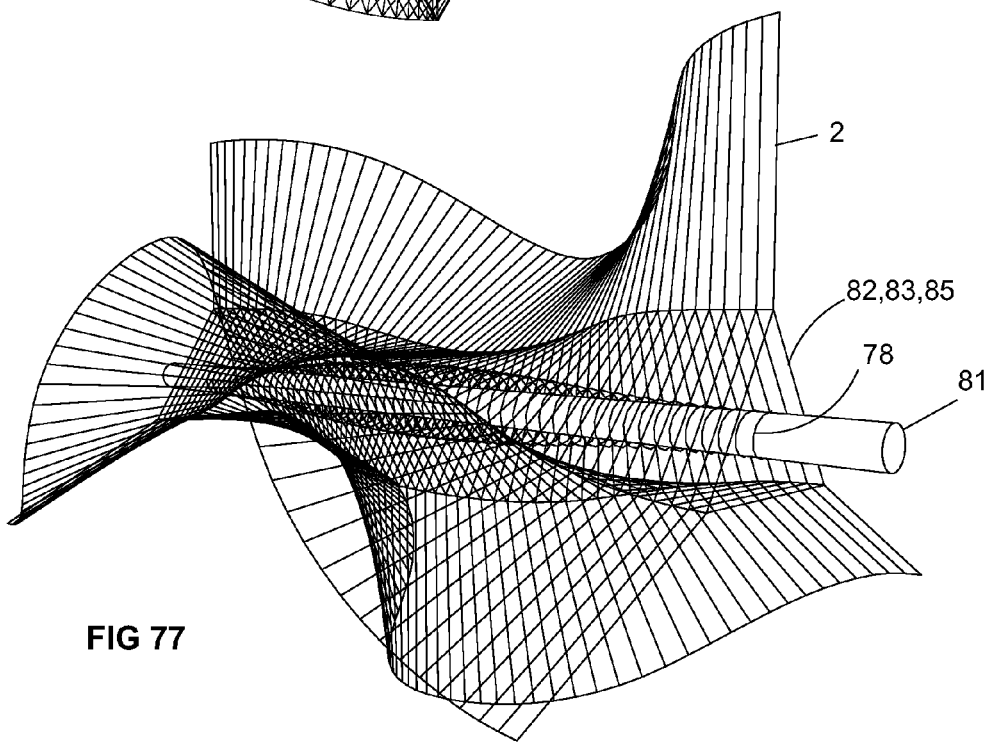
FIG. 77 illustrates a wire-frame perspective of assembled components of a spiral valve implementation showing a section equivalent to one wave bulge undulation.
Figure 78:
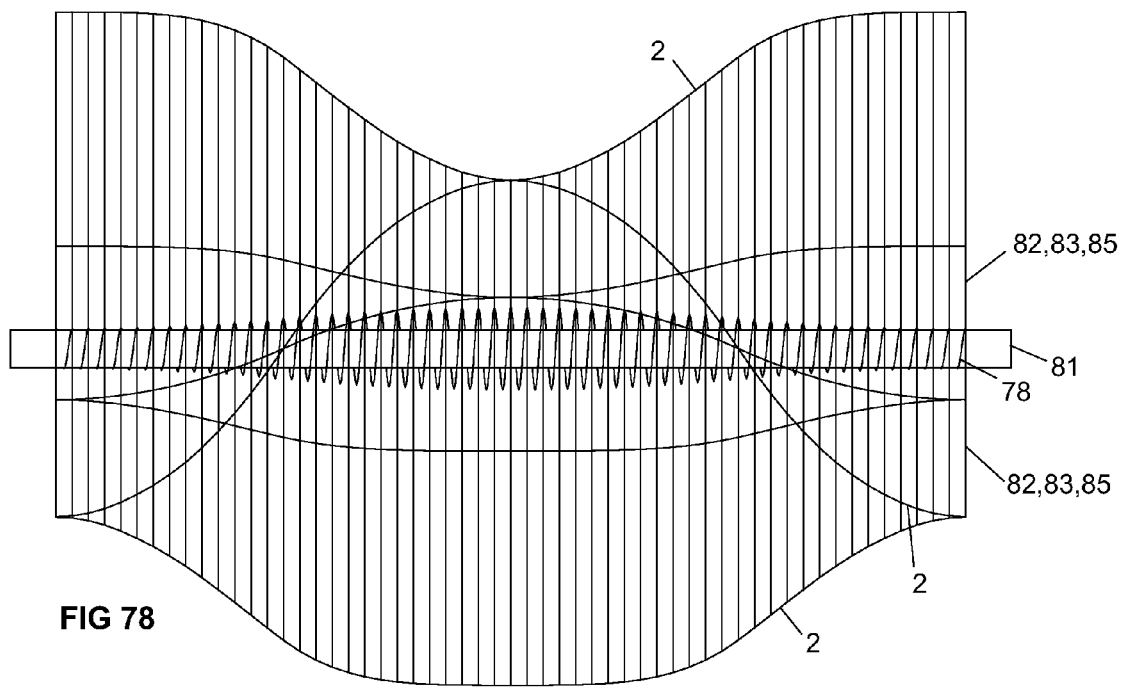
FIG. 78 is a wire frame elevation of the same portion of spiral valve mechanism shown in FIG. 77 viewed perpendicular to the longitudinal axis of the mechanism, showing certain elements of the mechanism in one implementation.
Figure 79:
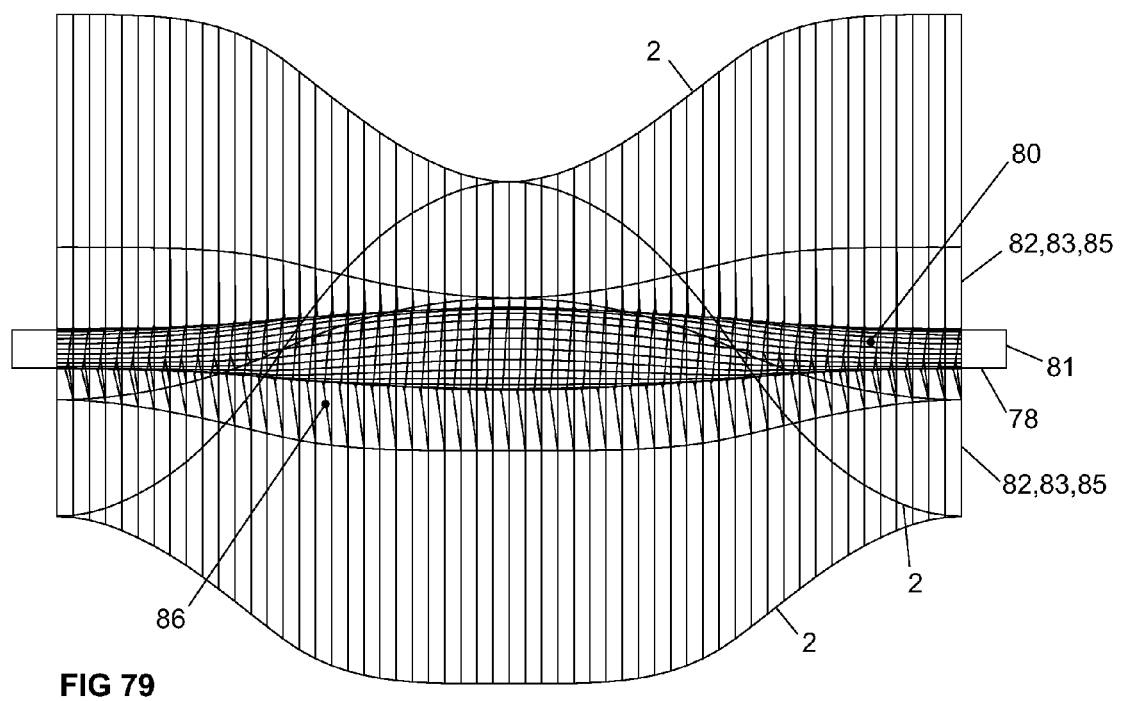
FIG. 79 illustrates the elevation of FIG. 78 with additional components in one implementation.

FIG. 77 is a wire-frame perspective showing a section of a spiral valve mechanism equivalent to one wave bulge undulation, showing the arrangements and relative positions of the components described above, but omitting certain elements for graphic clarity. FIG. 78 is a wire frame elevation of the same portion of spiral valve mechanism viewed perpendicular to the longitudinal axis of the mechanism, showing certain elements of the mechanism. FIG. 79 is the same elevation as FIG. 78 but with the inclusion of additional elements.

Figure 80:
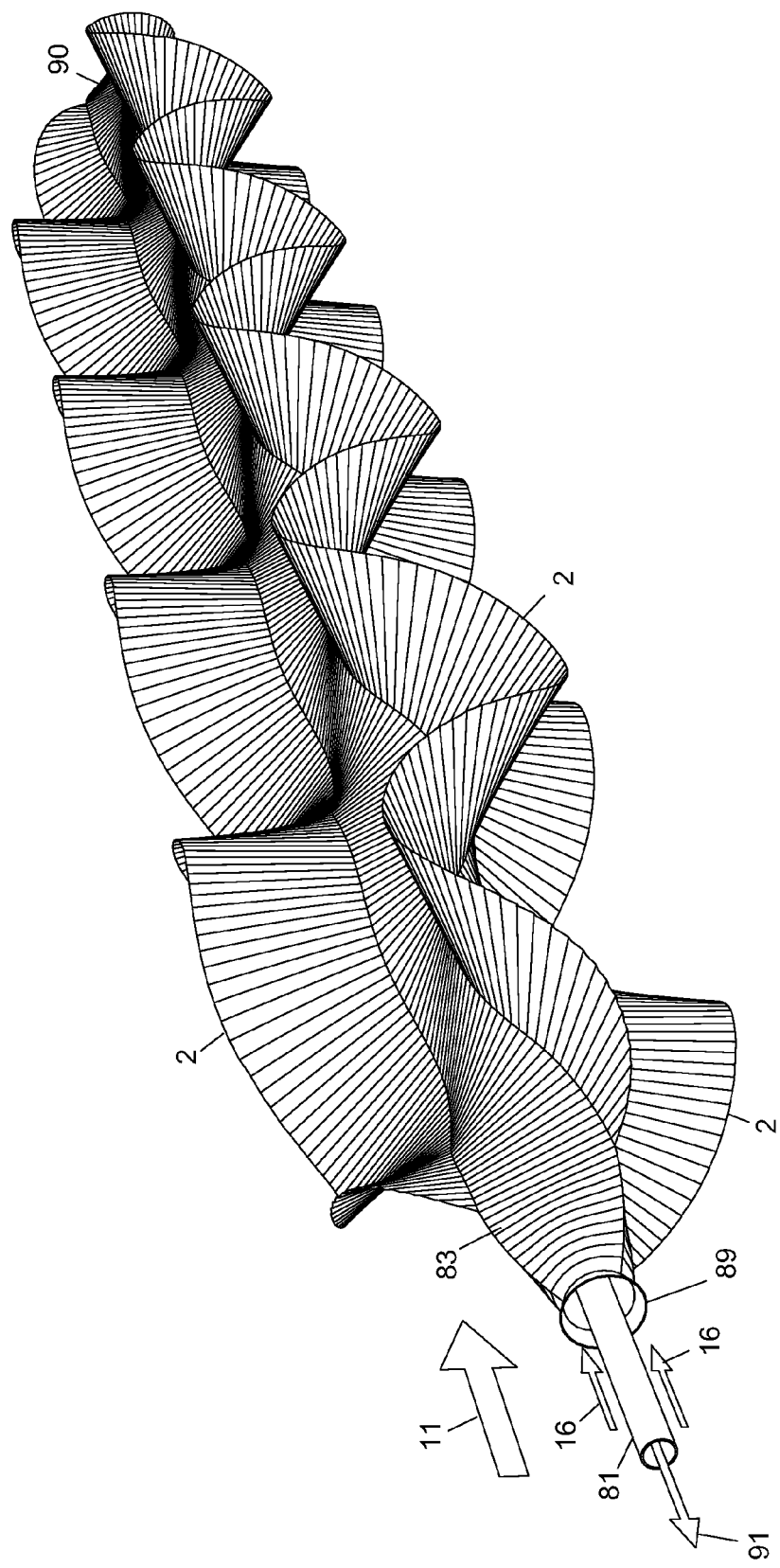
FIG. 80 illustrates a spiral valve implementation mechanism in a position it may assume when secured in a stream of fluid in one embodiment.

FIG. 80 shows a spiral valve mechanism in the position it assumes when secured in a stream of water 11. The upstream end of the second triangular core 83 has an open flange or collar 89 allowing ambient water to enter 16. This water is enclosed in a series of pockets that travel down along the inside of the second elastic core tube 80, under forces exerted upon the ribbons 2 from the stream of water 11, which in turn act upon the elastic coil 78 and second elastic core tube 80 as described above. Water reaching the end of the second elastic core tube 80 enters a fifth elastic reservoir 90, after which it is forced back up the eleventh hollow tube 81 in the direction opposite to the flowing water 11.

Figure 81:
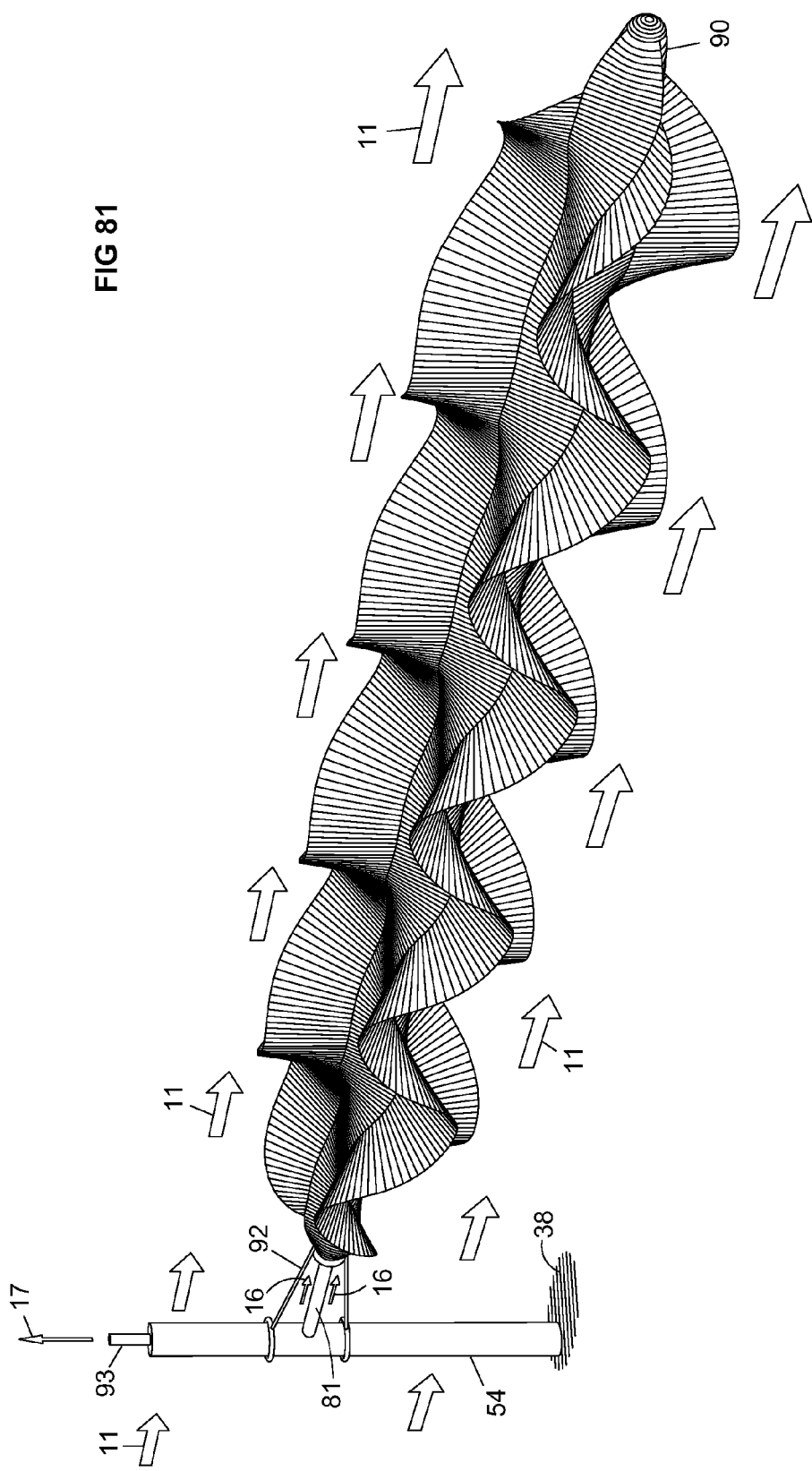
FIG. 81 illustrates a spiral valve implementation mechanism secured in a stream of moving fluid in one embodiment.
Figure 82:
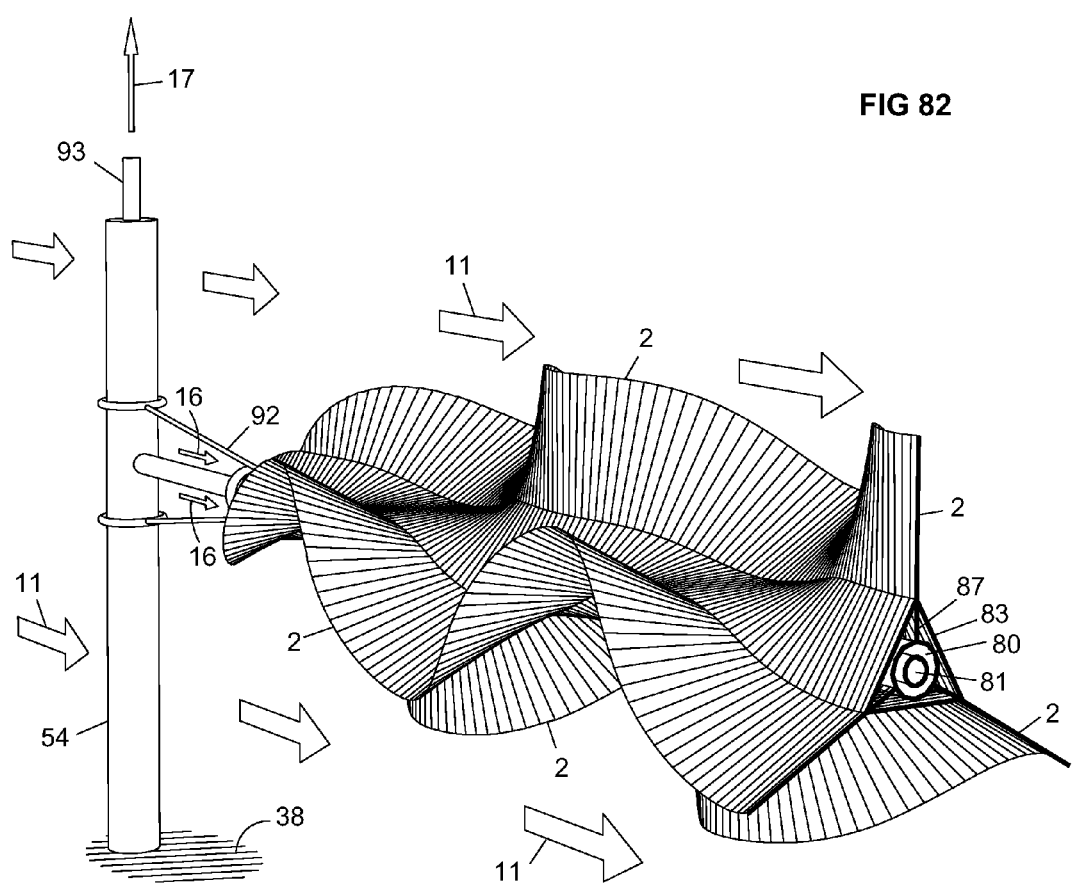
FIG. 82 illustrates a cross-section cut through a spiral valve implementation mechanism secured in a flowing stream of fluid in one embodiment.

FIG. 81 illustrates how a spiral valve mechanism is secured in a stream of moving water 11 via a third restraining component 54 which is secured to the bed of a river, tidal basin or other stationary object 38. The third restraining component 54 may be hinged about its longitudinal axis allowing the spiral coil mechanism to swivel in the moving current so as to maintain a longitudinal axis parallel to the moving current. The second triangular core 83 is fastened via cables 92 or other members to the third restraining component 54 and the eleventh hollow tube 81 is fastened to the third restraining component 54. Water pumped along the eleventh hollow tube 81 enters the third restraining component 54 whereupon it connects to a terminating tube 93 and exiting water 17 is diverted to a desired destination. FIG. 82 shows a cross-section cut through a spiral coil implementation secured in a flowing stream of water 17.

Figure 83:
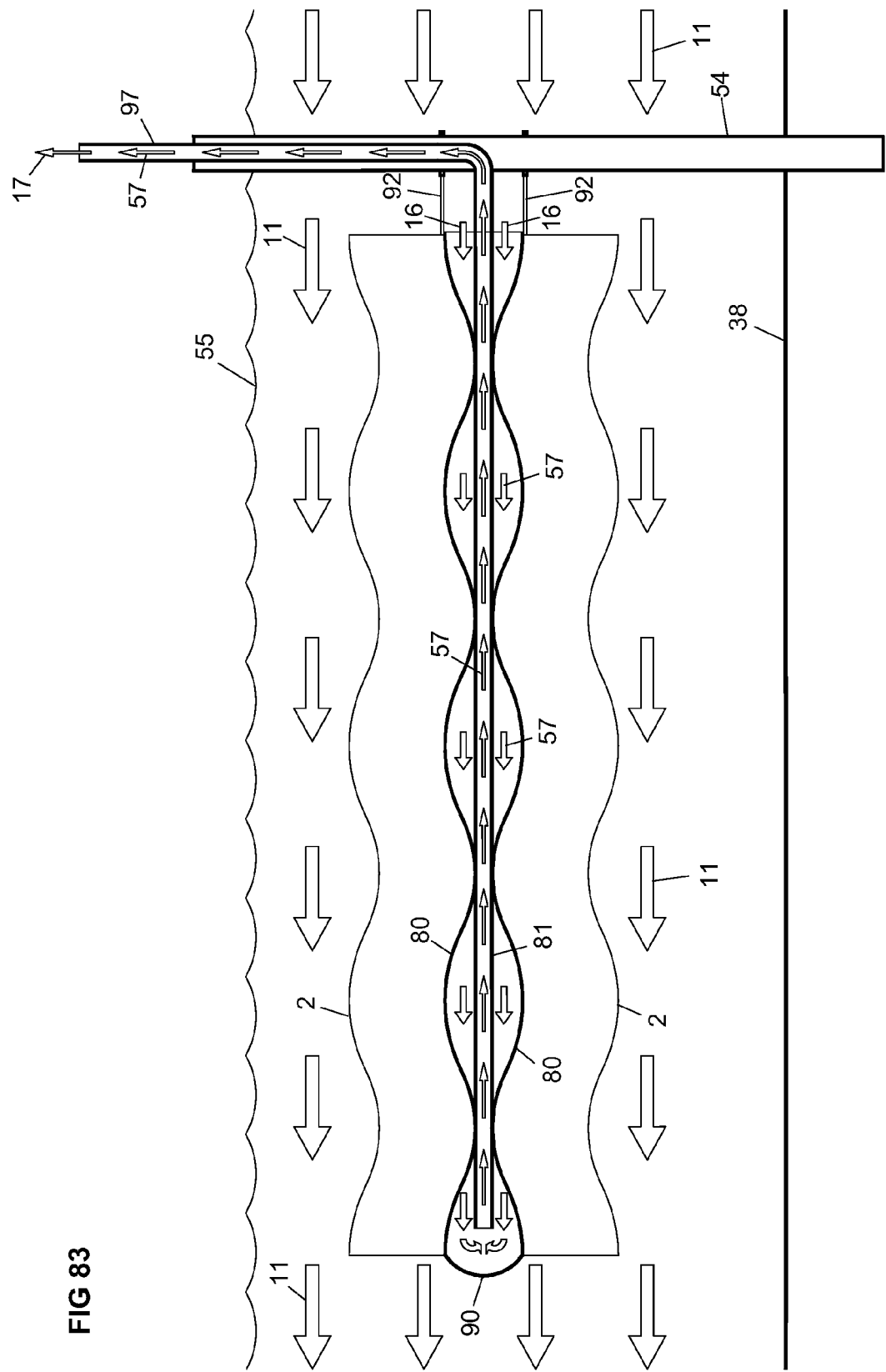
FIG. 83 is a schematic illustration of a spiral valve implementation mechanism utilized as a pump showing the circulation of pumped water or fluid through the mechanism in one embodiment.

FIG. 83 is a schematic illustration of a spiral valve implementation utilized as a pump showing the circulation of pumped water 57 through the mechanism.

Figure 84:
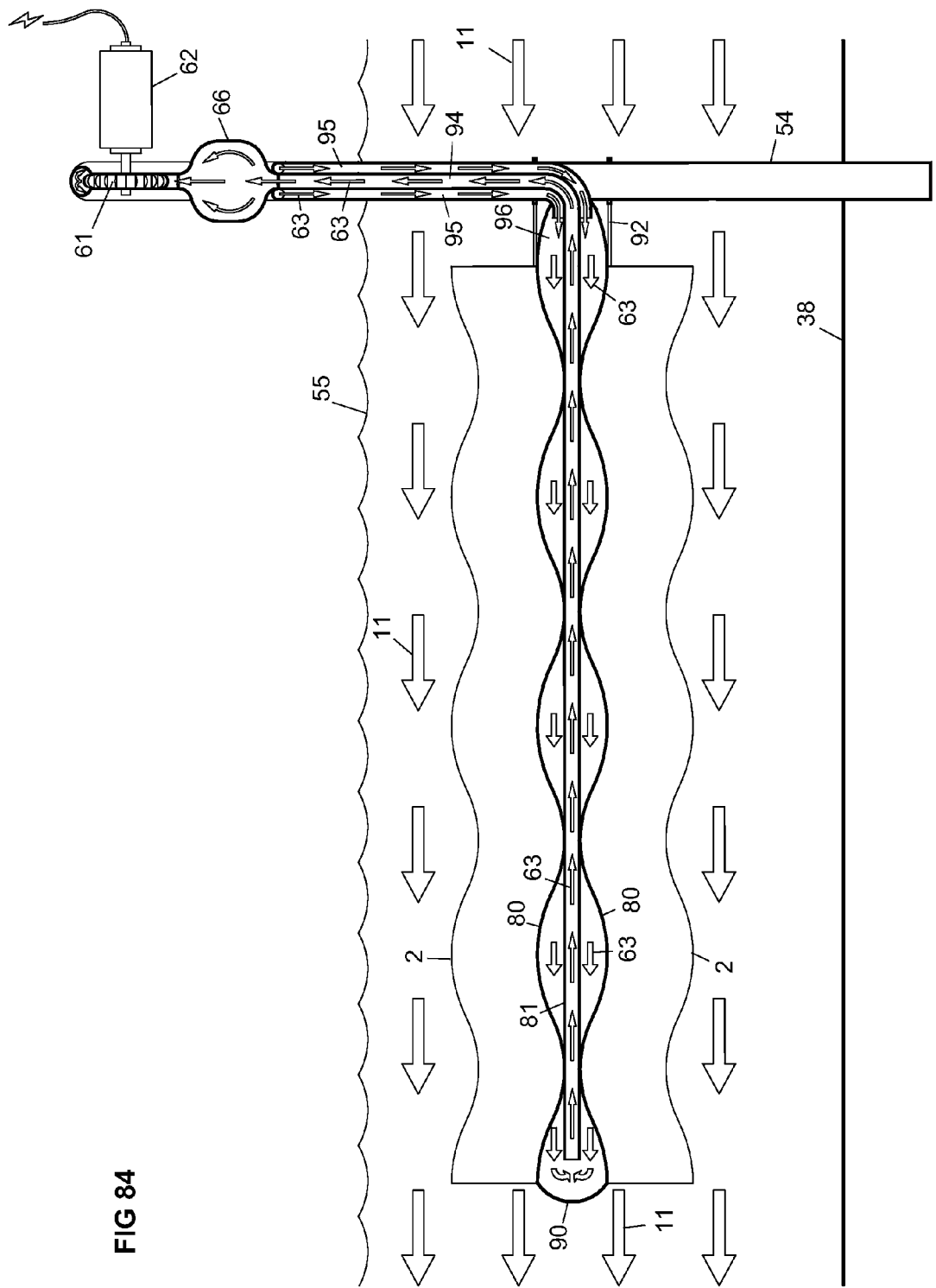
FIG. 84 is a schematic illustration of a spiral valve implementation mechanism utilized as a generator showing the circulation of water or fluid in one embodiment.

FIG. 84 is a schematic illustration of a spiral valve implementation utilized as a generator showing the circulation of water. In the generator implementation, the pumped water is held within a closed-loop system within the mechanism. The pumped water 63 in the eleventh hollow 81 tube travels upstream relative to the flowing ambient water 11, then into a twelfth hollow tube 94, from where it is forced through a turbine 61 which powers an electromagnetic generator 62. Upon exiting the turbine 61, the water 63 passes into at least one thirteenth hollow tube 95 which feeds into a sixth flexible reservoir 96 which opens into the second elastic core tube 80 whereupon the water 63 is pumped in pockets down along the space between the second elastic core tube 80 and the eleventh hollow tube 81, into the fifth flexible reservoir 90 and then back up interior of the eleventh hollow tube 81 and the process repeats indefinitely. A pressure-equalization device 66 may be inserted into the closed loop system immediately preceding the turbine 61 in order to convert the pulsing nature of the pumping action into a more constant flow.

Figure 85:
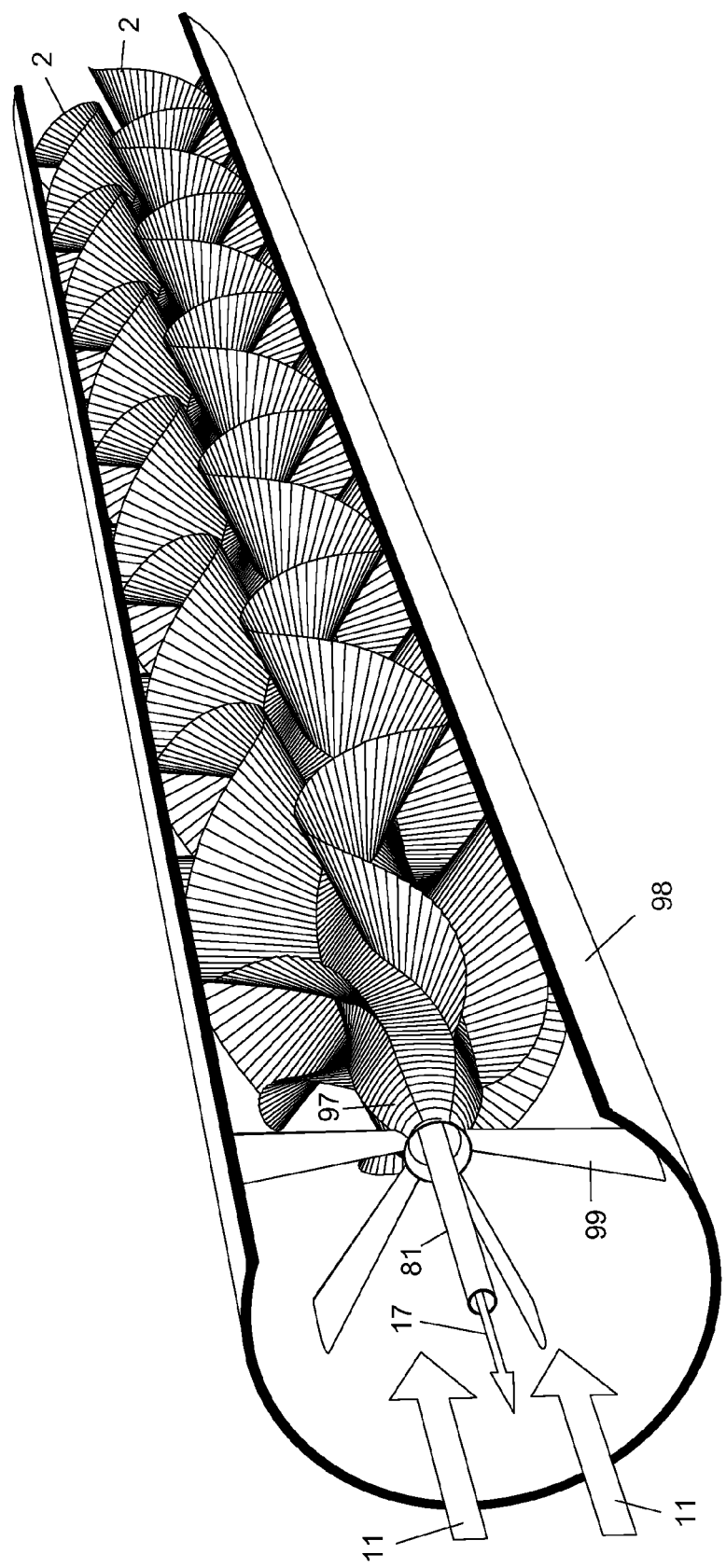
FIG. 85 illustrates a spiral valve implementation mechanism utilizing six ribbons and placed within a tube of flowing fluid in one embodiment.

As stated above, more than three or less than three flexible ribbons 2 can be utilized in the spiral valve mechanisms. One such implementation is illustrated in FIG. 85 and which utilizes six ribbons 2. In implementations utilizing six ribbons 2, the component corresponding to the second triangular core 83 above will become a first hexagonal core 97 comprised of second flexible connecting strips 82 and stiffening members 85.

FIG. 85 also illustrates an arrangement whereby the spiral valve mechanism is harnessed in a conduit or pipe 98 through which a current of water 11 flows due to a pressure differential between one end of the pipe 98 and the other. The spiral mechanism is secured to this pipe 98 via fastening blades 99 across which the current of water flows, acting upon the ribbons 2 and forcing water through the second elastic core tube 80 and back through the eleventh tube 81 where it exits the mechanism 17 as described in the implementations above.

The kinetic energy in the relatively large volume of water moving through the pipe 98 creates significant pressure on the relatively low volume of water inside the mechanism, creating a low speed, high pressure pump which can also be utilized to power an electromagnetic turbine in a similar manner as described in the implementations above. The advantage of placing the spiral valve mechanism in a pipe through which water is moving due to a pressure gradient is an enhanced interaction between the water current and the mechanism, as the water has no alternative path to travel other than through the array of ribbons 2.

In another implementation, electrical energy extraction from the deformed dynamic undulations in the ribbons and other elements of the above mechanisms which flex in a periodic manner under operation, is with the utilization of electroactive material or material which exhibits an electrical response to material strain. In such implementations of the mechanisms described, two or more electrodes may be utilized to extract electricity from electroactive elements of the mechanisms.

In implementations of the spiral valve mechanisms, the elastic coil 78 may be comprised of a helical electroactive material, or incorporate electroactive material. In such implementations the energy from the moving fluid 11 may be harnessed first by the ribbons 12 as mechanical energy and then transferred mechanically to the elastic coil 78 where the tightening and loosening of the elastic coil 78 generates electricity from the electroactive material of the coil 78. The mechanisms described above include facilities for capturing and transferring forces. For implementations utilizing electroactive materials, the mechanisms may transfer these captured forces to the electroactive material.

In yet another implementation, captured fluid may be pumped and/or may power an electromagnetic generator while at the same time the electroactive elements of the mechanisms generate electricity.

Figure 86:
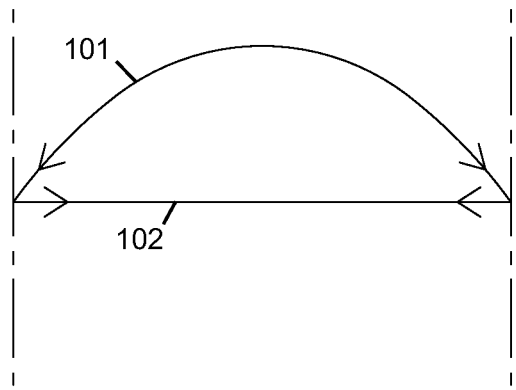
FIG. 86 is a diagrammatic representation of the internal energy state of a deformation within a flexible material and the internal energy state of a deformation-retaining component in one implementation.

FIG. 86 is a diagrammatic representation, in one implementation, of the internal energy state of a single deformation 101 within the flexible material and the internal energy state of a deformation-retaining component 102 which retains the deformation in the material. The deformation 101 in the material is in overall compression, and the deformation-retaining component 102 is in tension.

Figure 87:
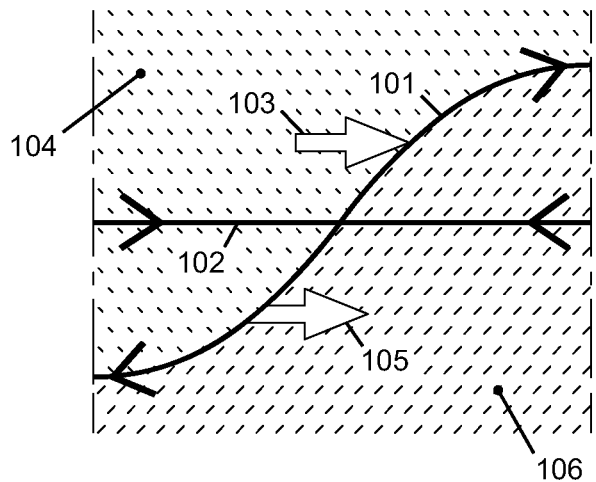
FIG. 87 is a diagrammatic representation showing an external force exerted by a moving ambient fluid upon a deformed flexible material, transferring these forces onto a second fluid in one implementation.

FIG. 87 is a diagrammatic representation, in one implementation, showing an external force 103 exerted by a moving ambient fluid 104 upon the deformed flexible material 101. The forces of the moving first fluid 104 are transferred 105 to a second fluid 106 as the position of the deformation moves.

The first fluid 104 of FIG. 87 may, in one implementation, be considered the energy-transmitting fluid and may correlate, for example, with elements in these disclosures referred to variously as flowing current 11, flowing water 11, flowing stream of water 11 and ambient water 11.

The flexible deformed material 101 of FIG. 87 may, in one implementation, be considered the energy-transferring component and may correlate, for example, with elements in these disclosures referred to variously as flexible ribbons 2, crenated strips 6, channels 23, connecting strips 47, triangular core 51, elastic core 67, elastic core tube 80, flexible connecting strips 82 and second triangular core 93. While in some implementations, the first fluid 104 may not make direct contact with this partial list of energy-transferring components, the forces of the first fluid 103 may be transferred 105 directly and/or indirectly to the second fluid 106 by one or more of these energy-transferring components.

The second fluid 106 of FIG. 87 may, in one implementation, be considered the energy-receiving fluid and may correlate, for example, with elements in these disclosures referred to variously as water in pockets 13, collected water 57, collected ambient water 57, circulating water 63, enclosed water 63 and pumped water 63, for example. The energy-receiving fluid 106 is transported to a desired location in some implementations. In other implementations electrical energy may be harnessed from the energy of the energy-receiving fluid 106 by an electromagnetic generator or other output device, as described previously herein.

Figure 88:
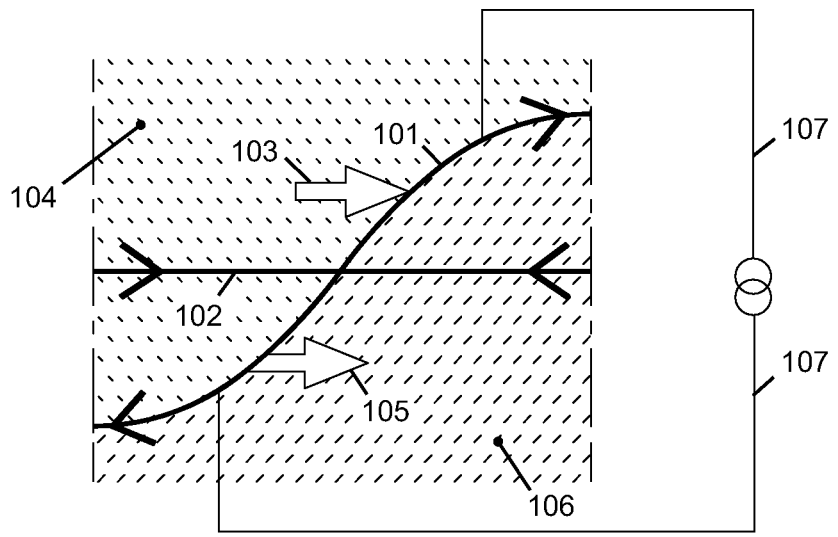
FIG. 88 illustrates how two or more electrodes may be connected to a deformed electroactive material in an implementation in which material strain is converted into electrical energy.

Another way to harness electrical energy from components of the mechanisms described herein is through the utilization of a flexible material which exhibits an electrical response to a material strain. Such a material would comprise or be incorporated into flexible elements which undergo dynamic deformation (e.g., periodically) in the mechanisms described. FIG. 88 illustrates how, in one implementation, two or more electrodes 107 may be connected to the deformed flexible material 101, where this material exhibits an electrical response to material strain caused by the forces 103 in the first fluid 104 or forces 105 in second fluid 106. Examples of such materials include, but are not limited to: electroactive polymers (EAPs) which may exhibit electrostrostrictive, electrostatic, piezoelectric, and/or pyroelectric responses to electrical or mechanical fields, as well as ionic EAPs, shape memory alloys, nano-wires, and/or the like.

FIGS. 89-93 diagrammatically illustrate several ways that the energy of a moving fluid may be harnessed via flexible components of mechanisms described in this invention.

Figure 89:
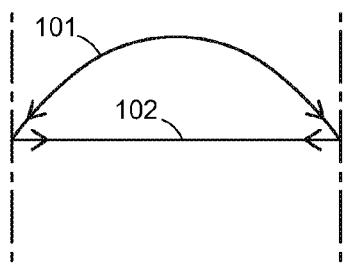
FIGS. 89-93 diagrammatically illustrate several ways that the energy of a moving fluid may be harnessed via flexible components of mechanisms in various implementations.

FIG. 89 is a diagrammatic representation, in one implementation, of the internal energy state of a single deformation 101 within the flexible material and the internal energy state of a deformation-retaining component 102 which retains the deformation in the material. The deformation 101 in the material is in overall compression, and the deformation-retaining component 102 is in tension.

Figure 90:
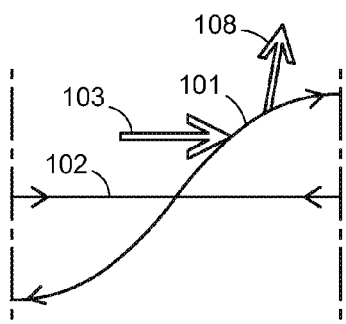

FIG. 90 illustrates one method of energy extraction whereby the force 103 in a first fluid acting upon a deformed material 101 causes the deformation to move and transfer energy via mechanical action 108 to a mechanical mechanism to which the deformed material 101 is coupled. An example of such a mechanical mechanism may be, but is not limited to, an axle coupled to an electromagnetic generator or other output device.

Figure 91:
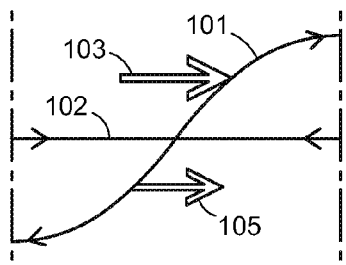

FIG. 91 illustrates another method of energy extraction whereby the force 103 in a first fluid acting upon the deformed material 101 is transferred 105 to a second flowing fluid. The energy of the first fluid 103 may be utilized to pump the second fluid, or the energy of the second fluid 105 may be used to power an electromagnetic generator.

Figure 92:
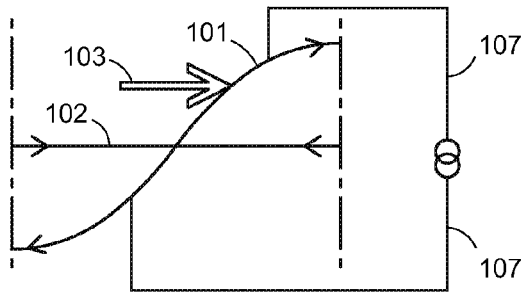

FIG. 92 illustrates another method of energy extraction whereby the force 103 in a first fluid acting upon a deformed material 101 causes the deformation to move thereby creating strains within the deformed material, where said material exhibits an electrical response to a material strain. Two or more electrodes 107 may extract electricity from the mechanism generated by strains within said material.

Figure 93:
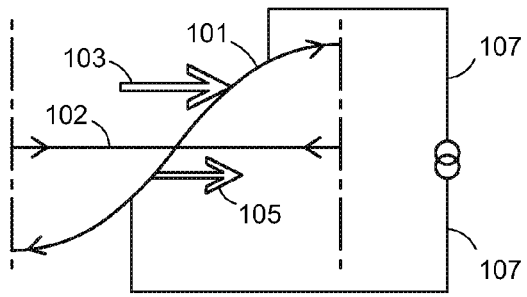

FIG. 93 illustrates another possible method of energy extraction whereby the force 103 in a first fluid acting upon the deformed material 101 is transferred 105 to a second flowing fluid. The energy of the first fluid 103 may be utilized to pump the second fluid, or the energy of the second fluid 105 may be used to power an electromagnetic generator. In addition, the force 103 in the first fluid and second fluid 105 acting upon the deformed material 101 creates strains within the deformed material, where said material exhibits an electrical response to a material strain. Two or more electrodes 107 may extract additional electricity from the mechanism. In this method of energy extraction, energy is extracted both from strains created in a deformed electroactive material 101 as described above, as well as from energy 105 of the second flowing fluid. Such a dual-energy-harnessing mechanism anticipates novel materials in which elastic deformation does not create heat within the material but instead creates electrical energy, so that the energy lost to heat in the arrangement illustrated in FIG. 91 is instead converted to electrical energy.

It is to be understood that the implementations described herein facilitate significant flexibility and that many changes, modifications, variations and other uses and applications of the described implementations are possible. All such changes, modifications, variations and other uses and applications which do not depart from the spirit and scope of the invention are deemed to be covered by the implementations described herein and variants thereof.

What is claimed is:

1. A fluid transporting apparatus for transporting a first fluid, comprising:
   a polygonal tube comprised of flexible walls enclosing a first fluid passage and having a polygonal cross-section, with a plurality of tube edges corresponding to corners of the polygonal cross-section;
   a plurality of flexible ribbons, each having a first longitudinal edge, a second longitudinal edge, and a contact surface,
      wherein each of the plurality of flexible ribbons is connected along the first longitudinal edge to one of the plurality of tube edges, and
      wherein the contact surface projects transverse to a longitudinal axis of each of the plurality of flexible ribbons, the longitudinal axis being oriented substantially parallel to a primary flow direction of a flowing second fluid, and the contact surface being disposed in contact with the flowing second fluid;
   at least one deformation retaining component connected to one of the first longitudinal edge and the second longitudinal edge of at least one of the plurality of flexible ribbons;
   at least one base member fixed with respect to the flowing second fluid and connected to the at least one deformation retaining component; and
   wherein dynamic undulations of the plurality of flexible ribbons caused by the flowing second fluid impart forces via the flexible walls of the polygonal tube to a first fluid inside the first fluid passage to transport the first fluid along a longitudinal axis of the first fluid passage.

2. The apparatus of claim 1, wherein
   a volume defined by the flexible walls of the polygonal tube comprises the first fluid passage;
   the at least one deformation retaining component comprises a plurality of crenated strips, each having a straight longitudinal edge and an undulating longitudinal edge, wherein each of the plurality of crenated strips is connected along the undulating longitudinal edge to the second longitudinal edge of one of the plurality of flexible ribbons; and
   the at least one base member comprises a plurality of base members fixed with respect to the flowing second fluid and connected to the straight longitudinal edge of each of the plurality of crenated strips.

3. The apparatus of claim 2, wherein the first fluid passage is in operative communication with a space containing the flowing second fluid, and wherein the first fluid and the second fluid are the same.

4. The apparatus of claim 2, wherein the polygonal cross-section is a triangle.

5. The apparatus of claim 2, further comprising:
a plurality of flexible membranes situated within the polygonal tube and connected to the flexible walls of the polygonal tube,
wherein each of the plurality of flexible membranes has an opening, and
wherein each of the plurality of flexible membranes and each opening expand and contract in response to the forces imparted by the dynamic undulations of the plurality of flexible ribbons.

6. The apparatus of claim 5, further comprising:
an elastic core tube bonded to openings of the plurality of flexible membranes.

7. The apparatus of claim 2, further comprising:
at least one interior tube situated within and substantially concentric with the polygonal tube.

8. The apparatus of claim 7, wherein
the first fluid passage is closed to a space containing the second fluid at a closed end in the downstream direction of the flowing second fluid,
the at least one interior tube is at least one hollow interior tube,
the at least one hollow interior tube is open to the first fluid passage at an open end of the hollow interior tube in the downstream direction of the flowing second fluid, and
wherein the first fluid enters the hollow interior tube from the first fluid passage at the open end and is transported through the hollow interior tube in a direction opposite to the primary flow direction of the flowing second fluid.

9. The apparatus of claim 2, further comprising:
a turbine, disposed in operative communication with the first fluid passage; and
an electromagnetic generator operatively connected to the turbine;
wherein transport of the first fluid excites the turbine to generate electricity via the electromagnetic generator.

10. The apparatus of claim 2, further comprising:
at least one directional valve situated within the polygonal tube and connected to the flexible walls of the polygonal tube, wherein the directional valve directs the transport of the first fluid in a preferred direction along the first fluid passage.

11. The apparatus of claim 1, further comprising:
an elastic core tube enclosed by the polygonal tube and defining by its internal volume a first fluid passage;
wherein the at least one deformation retaining component comprises an elastic coil connected by at least two points along its length to the elastic core tube, connected by at least two points along its length to the polygonal tube, and having sequential alternating tightening and loosening to impart to the elastic core tube a longitudinally variable cross-sectional area;
wherein each of the plurality of flexible ribbons have persistent undulations therein that correlates with the sequential alternating tightening and loosening of the elastic coil; and
wherein dynamic undulations of the plurality of flexible ribbons caused by the flowing second fluid impart forces via the elastic coil and elastic core tube to a first fluid inside the first fluid passage within the elastic core tube to transport the first fluid along a longitudinal axis of the first fluid passage.

12. The apparatus of claim 11, wherein the first fluid passage is operatively connected to a space occupied by the flowing second fluid, and wherein the first fluid and the second fluid are the same.

13. The apparatus of claim 11, wherein at least one point of an inner surface of at least one of the flexible walls of the polygonal tube is connected to the elastic coil.

14. The apparatus of claim 13, wherein the flexible walls have substantially fixed widths in a direction perpendicular to a longitudinal axis of the polygonal tube.

15. The apparatus of claim 14, further comprising:
a plurality of stiffening members affixed to the flexible walls to maintain the substantially fixed widths.

16. The apparatus of claim 13, wherein all of the plurality of flexible ribbons have the same fixed angles with adjacent flexible walls as each other.

17. The apparatus of claim 13, wherein at least one point of an inner surface of at least one of the flexible walls of the polygonal tube is connected to the elastic coil via an arm rotatably connected to the at least one point.

18. The apparatus of claim 13, wherein an inner side of the flexible walls of the polygonal tube is connected to the elastic coil via an arm connected with a first fixed angle to the at least one point.

19. The apparatus of claim 11, further comprising:
at least one interior tube situated within and substantially concentric with the elastic core tube.

20. The apparatus of claim 19, wherein
the elastic core tube is closed to a space occupied by the flowing second fluid at a closed end downstream of the flowing second fluid,
the at least one interior tube is at least one hollow interior tube,
the at least one hollow interior tube is open to the first fluid passage at an open end of the hollow interior tube downstream of the flowing second fluid, and
wherein the first fluid enters the hollow interior tube from the first fluid passage at the open end and is transported through the hollow interior tube in a direction opposite to the primary flow direction of the flowing second fluid.

21. The apparatus of claim 11, further comprising:
a turbine, disposed in operative communication with the first fluid passage; and
an electromagnetic generator operatively connected to the turbine;
wherein transport of the first fluid excites the turbine to generate electricity via the electromagnetic generator.

22. The apparatus of claim 11, wherein the elastic core tube, elastic coil, and the plurality of flexible ribbons are substantially enclosed in a pipe connected to the elastic coil.

23. The apparatus of claim 11, wherein the elastic coil is comprised of an electroactive material.

24. The apparatus of claim 1, wherein at least one of the plurality of flexible ribbons is comprised of an electroactive material.

25. The apparatus of claim 1, wherein the at least one deformation retaining component is comprised of an electroactive material.

26. A fluid transporting apparatus for transporting a first fluid, comprising:
a first flexible ribbon having a first longitudinal edge, a second longitudinal edge, and a first undulating outer contact surface,
wherein the first undulating outer contact surface projects transverse to a first longitudinal axis of the first flexible ribbon, the first longitudinal axis being oriented substantially parallel to a primary flow direction of a flowing second fluid, and the first undulating outer contact surface being disposed in contact with the flowing second fluid;

a second flexible ribbon having a third longitudinal edge, a fourth longitudinal edge, and a second undulating outer contact surface,
wherein the second undulating outer contact surface projects transverse to a second longitudinal axis of the second flexible ribbon, the second longitudinal axis being oriented substantially parallel to the primary flow direction of the flowing second fluid, and the second undulating outer contact surface being disposed in contact with the flowing second fluid;

a first crenated strip having a fifth straight longitudinal edge and a sixth undulating longitudinal edge,
wherein the sixth undulating longitudinal edge is connected to the first longitudinal edge of the first flexible ribbon;

a second crenated strip having a seventh straight longitudinal edge and an eighth undulating longitudinal edge,
wherein the eighth undulating edge is connected to the third longitudinal edge of the second flexible ribbon, and
wherein the seventh straight longitudinal edge is connected to the fifth straight longitudinal edge of the first crenated strip;

a third crenated strip having a ninth straight longitudinal edge and a tenth undulating longitudinal edge,
wherein the tenth undulating longitudinal edge is connected to the second longitudinal edge of the first flexible ribbon;

a fourth crenated strip having an eleventh straight longitudinal edge and a twelfth undulating longitudinal edge,
wherein the twelfth undulating edge is connected to the fourth longitudinal edge of the second flexible ribbon, and
wherein the eleventh straight longitudinal edge is connected to the ninth straight longitudinal edge of the first crenated strip;

a base member fixed with respect to the flowing second fluid and connected to the first crenated strip;

wherein the first flexible ribbon, the second flexible ribbon, the first crenated strip, the second crenated strip, the third crenated strip, and the fourth crenated strip define a first fluid passage, and wherein dynamic undulations of the first flexible ribbon and the second flexible ribbon caused by action of the flowing second fluid on the first undulating outer contact surface and on the second undulating outer contact surface impart forces to a first fluid in the first fluid passage to transport the first fluid along a direction substantially parallel to the first longitudinal axis of the first flexible ribbon.

27. The apparatus of claim 26, wherein the first flexible ribbon and the second flexible ribbon have substantially fixed widths in a direction substantially perpendicular to the first longitudinal axis and the second longitudinal axis.

28. The apparatus of claim 26, wherein the first crenated strip, the second crenated strip, the third crenated strip, and the fourth crenated strip have substantially fixed widths in a direction substantially perpendicular to the fifth straight longitudinal edge, the seventh straight longitudinal edge, the ninth straight longitudinal edge, and the eleventh straight longitudinal edge.

29. The apparatus of claim 26, further comprising:
a plurality of continuous elastic extrusions connected to a first undulating inner contact surface of the first flexible ribbon opposite the first undulating outer contact surface and connected to a second undulating inner contact surface of the second flexible ribbon opposite the second undulating outer contact surface, and defining a plurality of channels occupied by the first fluid.

30. The apparatus of claim 29, wherein at least one of the plurality of channels forms a torqued parallelepiped.

31. The apparatus of claim 29, wherein a cross-section of at least one of the plurality of channels is auxetic.

32. The apparatus of claim 26, further comprising:
at least one flexible tube connected at an end of the first flexible ribbon and the second flexible ribbon downstream of the flowing second fluid, wherein the first fluid exiting the inner volume enters the at least one flexible tube.

33. The apparatus of claim 32, wherein the at least one flexible tube is connected to the fifth straight longitudinal edge of the first crenated strip.

34. The apparatus of claim 32, wherein the at least one flexible tube is connected to the first undulating outer contact surface of the first flexible ribbon.

35. The apparatus of claim 26, further comprising:
a turbine, disposed in operative communication with the first fluid passage; and
an electromagnetic generator operatively connected to the turbine;
wherein transport of the first fluid excites the turbine to generate electricity via the electromagnetic generator.

36. The apparatus of claim 26, wherein the base member further comprises:
an elongated support member connected to the straight longitudinal edge of the first crenated strip, wherein the elongated support member exhibits at least one of rigidity and tensility.

37. An apparatus for transporting fluids, comprising:
a first flexible ribbon having a first longitudinal edge, a second longitudinal edge, and a first undulating outer contact surface,
wherein the first undulating outer contact surface projects transverse to a first longitudinal axis of the first flexible ribbon, the first longitudinal axis being oriented substantially parallel to a primary flow direction of a flowing second fluid, and the first undulating outer contact surface being disposed in contact with the flowing second fluid;

a second flexible ribbon having a third longitudinal edge, a fourth longitudinal edge, and a second undulating outer contact surface,
wherein the second undulating outer contact surface projects transverse to a second longitudinal axis of the second flexible ribbon, the second longitudinal axis being oriented substantially parallel to the primary flow direction of the flowing second fluid, and the second undulating outer contact surface being disposed in contact with the flowing second fluid;

a first flexible strip having a first strip edge and a second strip edge,
wherein the first strip edge is connected to the first longitudinal edge of the first flexible ribbon;

a second flexible strip having a third strip edge and a fourth strip edge,
wherein the third strip edge is connected to the third longitudinal edge of the second flexible ribbon, and
wherein the fourth strip edge is connected to the second strip edge of the first flexible strip;

a third flexible strip having a fifth strip edge and a sixth strip edge, wherein the third strip edge is connected to the second longitudinal edge of the first flexible ribbon;

a fourth flexible strip having a seventh strip edge and an eighth strip edge,
   wherein the seventh strip edge is connected to the fourth longitudinal edge of the second flexible ribbon, and
   wherein the eighth strip edge is connected to the sixth strip edge of the second flexible strip;

a first crenated strip having a fifth straight longitudinal edge and a sixth undulating longitudinal edge,
   wherein the sixth undulating longitudinal edge is connected to the second strip edge of the first flexible strip and the fourth strip edge of the second flexible strip;

a second crenated strip having a seventh straight longitudinal edge and an eighth undulating longitudinal edge,
   wherein the eighth undulating edge is connected to the sixth strip edge of the third flexible strip and the eighth strip edge of the fourth flexible strip;

a base member fixed with respect to the flowing second fluid and connected to the first crenated strip;

wherein the first flexible ribbon, the second flexible ribbon, the first flexible strip, the second flexible strip, the third flexible strip, and the fourth flexible strip define a first fluid passage, and wherein dynamic undulations of the first flexible ribbon and the second flexible ribbon caused by action of the flowing second fluid on the first undulating outer contact surface and on the second undulating outer contact surface impart forces to a first fluid in the first fluid passage to transport the first fluid along a direction substantially parallel to the first longitudinal axis of the first flexible ribbon.

38. A fluid transporting apparatus for transporting a first fluid, comprising:
   a polygonal tube having flexible walls with adjacent pairs of the flexible walls rotatably connected to each other, wherein the polygonal tube defines a first fluid passage with an elongate hexagonal cross section and has two wider walls opposite from each other and four remaining narrower walls than the two wider walls,
   wherein each of the two wider walls have external contact surfaces disposed in contact with a flowing second fluid and formed with persistent spatial undulations in a direction parallel to a longitudinal axis of the polygonal tube, which is oriented substantially parallel to a primary flow direction of the second flowing fluid, the persistent spatial undulations having substantially similar undulatory periods and phases and having a projection transverse to the longitudinal axis of the polygonal tube;
   at least one deformation retaining component connected to the wider walls to maintain the persistent spatial undulations therein;
   at least one base member fixed with respect to the flowing second fluid and connected to the at least one deformation retaining component; and
   wherein dynamic undulations of the two wider walls caused by action of the flowing second fluid on the external contact surfaces impart forces to a first fluid in the first fluid passage to transport the first fluid along a direction substantially parallel to the first longitudinal axis of the polygonal tube.

39. The apparatus of claim 38, wherein the at least one deformation retaining component comprises the remaining narrower walls, and wherein each of the remaining narrower walls further comprises:
   a crenated strip having a straight longitudinal edge connected to another crenated strip straight longitudinal edge and an undulating longitudinal edge connected to an undulating longitudinal edge of one of the wider walls.

40. The apparatus of claim 38, wherein the at least one deformation retaining component further comprises:
   at least two crenated strips, each having a straight longitudinal edge connected by at least two points to the at least one base member and having an undulating longitudinal edge connected by at least two points to a junction line of a pair of narrower walls from the four remaining narrower walls.

* * * * *